United States Patent
Takahashi

(10) Patent No.: US 11,597,299 B2
(45) Date of Patent: Mar. 7, 2023

(54) FACING SEATS-TYPE AUTOMATED DRIVING VEHICLE;

(71) Applicant: YAMAHA HATSUDOKI KABUSHIKI KAISHA, Iwata (JP)

(72) Inventor: Arato Takahashi, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 17 days.

(21) Appl. No.: 16/878,439

(22) Filed: May 19, 2020

(65) Prior Publication Data

US 2020/0276913 A1    Sep. 3, 2020

Related U.S. Application Data

(63) Continuation-in-part of application No. PCT/JP2018/042746, filed on Nov. 20, 2018.

(30) Foreign Application Priority Data

Nov. 20, 2017 (JP) .............................. JP2017-223153
Nov. 20, 2017 (JP) .............................. JP2017-223154

(51) Int. Cl.
*B60N 2/005* (2006.01)
*B60N 2/36* (2006.01)
(Continued)

(52) U.S. Cl.
CPC .............. *B60N 2/005* (2013.01); *B60N 2/36* (2013.01); *B62D 25/20* (2013.01); *B62D 63/025* (2013.01)

(58) Field of Classification Search
CPC . B60N 2/01; B60N 2/005; B60N 2/36; B60N 2/3047; B62D 31/003; B62D 25/087; B60R 5/00; B60R 2011/0036
(Continued)

(56) References Cited

U.S. PATENT DOCUMENTS 1,350,601 A    8/1920    Fuller
1,710,616 A    4/1929    Guernsey
(Continued)

FOREIGN PATENT DOCUMENTS

AU    2792900 A    9/2000
CN    106627812 A  *  5/2017
(Continued)

OTHER PUBLICATIONS

Yamaha Motor Co., LTD, "CES 2018", [online], Jan. 9, 2018, YouTube (registered trademark), [retrieved on Oct. 19, 2018], the Internet <https://global.yamahamotor.com/jp/showroom/event/2018-ces/index.html>.

(Continued)

*Primary Examiner* — Jason S Morrow
*Assistant Examiner* — Wenwei Zhuo
(74) *Attorney, Agent, or Firm* — Rabin & Berdo, P.C.

(57) ABSTRACT

An automated driving vehicle, including facing seats, a floor deck and a luggage deck. The facing seats includes a front seat assembly having at least a front seat and a front backrest, and a rear seat assembly having at least a rear seat and a rear backrest, the front and rear seat assemblies being disposed to cause the seated passengers to respectively face rearward and forward directions of the vehicle. The floor deck is provided to allow the passengers to rest their feet, the floor deck having no level difference. The luggage deck is for at least one piece of luggage to be placed thereon, and includes a front luggage deck disposed forward of a front end of the floor deck in the forward direction of the vehicle, and a rear luggage deck disposed rearward of a rear end of the floor deck in the rearward direction of the vehicle.

22 Claims, 25 Drawing Sheets

(51) Int. Cl.
*B62D 25/20* (2006.01)
*B62D 63/02* (2006.01)

(58) Field of Classification Search
USPC .......................... 296/65.05, 65.16, 65.01, 64
See application file for complete search history.

(56) References Cited

U.S. PATENT DOCUMENTS

| | | | | |
|---|---|---|---|---|
| 2,516,237 | A | * | 7/1950 | Morse .................. B60R 3/02 |
| | | | | 280/166 |
| 3,352,597 | A | | 11/1967 | Barenyi |
| 3,504,336 | A | * | 3/1970 | Boblitz .................. B60R 22/48 |
| | | | | 340/457.1 |
| 3,759,566 | A | * | 9/1973 | Sobey .................. B61D 1/00 |
| | | | | 296/155 |
| 3,856,106 | A | | 12/1974 | Sobey et al. |
| 4,627,656 | A | * | 12/1986 | Gokimoto .............. B60N 2/10 |
| | | | | 296/65.09 |
| 6,129,405 | A | * | 10/2000 | Miyahara ............ B60N 2/3079 |
| | | | | 296/65.11 |
| 6,260,913 | B1 | | 7/2001 | Sekita et al. |
| 6,334,252 | B1 | | 1/2002 | Sato et al. |
| 7,455,490 | B1 | * | 11/2008 | Goosen ................ A61G 3/0808 |
| | | | | 410/7 |
| 9,725,064 | B1 | * | 8/2017 | Faruque ................ B60N 2/143 |
| 9,802,661 | B1 | | 10/2017 | Kentley-Klay |
| 2013/0015012 | A1 | | 1/2013 | Wu |
| 2013/0098695 | A1 | | 4/2013 | Itou et al. |
| 2015/0175040 | A1 | | 6/2015 | Meszaros et al. |
| 2016/0272141 | A1 | | 9/2016 | Ohmura |
| 2018/0065464 | A1 | | 3/2018 | Palhegyi |
| 2018/0272977 | A1 | * | 9/2018 | Szawarski .............. B60N 2/04 |
| 2019/0100247 | A1 | * | 4/2019 | Nusier .................. B60N 2/005 |
| 2019/0106017 | A1 | * | 4/2019 | Marubayashi ........... B60N 2/02 |
| 2019/0185077 | A1 | | 6/2019 | Smith et al. |
| 2019/0193666 | A1 | * | 6/2019 | Jost .................... B60R 21/2338 |
| 2019/0202391 | A1 | * | 7/2019 | Cho .................... B60R 21/233 |
| 2019/0225167 | A1 | | 7/2019 | Takamura et al. |
| 2020/0039388 | A1 | * | 2/2020 | Onoyama ................ B60N 2/01 |
| 2020/0086820 | A1 | * | 3/2020 | Gould .................... B60N 2/01 |
| 2020/0093662 | A1 | * | 3/2020 | Mori .................... B60N 2/3047 |
| 2020/0130838 | A1 | * | 4/2020 | Beaudin ................ G06F 3/017 |
| 2020/0276914 | A1 | | 9/2020 | Takahashi |
| 2021/0038447 | A1 | * | 2/2021 | Fukawatase ........... B62D 47/00 |
| 2021/0146807 | A1 | | 5/2021 | Wood |
| 2021/0179179 | A1 | * | 6/2021 | Butukuri .............. B62D 21/157 |
| 2021/0221263 | A1 | | 7/2021 | Jost et al. |
| 2021/0300212 | A1 | * | 9/2021 | Ito .............................. B60R 1/12 |
| 2021/0380023 | A1 | | 12/2021 | Kanitz |
| 2022/0024353 | A1 | | 1/2022 | Cha et al. |

FOREIGN PATENT DOCUMENTS

| | | | | |
|---|---|---|---|---|
| CN | 106627812 | A | | 5/2017 |
| DE | 1142115 | B | | 1/1963 |
| DE | 102016008800 | A1 | * | 1/2018 ............... B62D 9/02 |
| FR | 2114948 | A5 | | 6/1972 |
| FR | 2826613 | A1 | | 1/2003 |
| FR | 3046395 | A1 | * | 7/2017 ............. B62D 31/02 |
| FR | 3046395 | A1 | | 7/2017 |
| FR | 3046395 | B1 | | 5/2018 |
| JP | 2000-318501 | A | | 11/2000 |
| JP | 2000318501 | A | * | 11/2000 |
| JP | 2003-191757 | A | | 7/2003 |
| JP | 2003191757 | A | * | 7/2003 |
| JP | 2006-026303 | A | | 2/2006 |
| JP | 2007-325625 | A | | 12/2007 |
| JP | 2010120395 | A | | 6/2010 |
| JP | 2016175513 | A | | 10/2016 |
| KR | 20120009215 | A | | 2/2012 |
| WO | 0051840 | A1 | | 9/2000 |
| WO | WO-0051840 | A1 | * | 9/2000 ................ B60P 3/07 |
| WO | 2011061585 | A2 | | 5/2011 |
| WO | WO-2011098848 | A1 | * | 8/2011 ........... B62D 31/003 |
| WO | 2011154681 | A1 | | 12/2011 |
| WO | 2016161216 | A1 | | 10/2016 |
| WO | 2020162186 | A1 | | 8/2020 |

OTHER PUBLICATIONS

Zeromomentpoint, "Future Robot Commuter Hotaru", [online], Apr. 25, 2016, YouTube (registered trademark), [retrieved on Nov. 15, 2017], the Internet <https://www.youtube.com/watch?v=2XbrZ5me2E4>.

* cited by examiner

FACING SEATS-TYPE AUTOMATED DRIVING VEHICLE;

CROSS-REFERENCE TO RELATED APPLICATIONS

This application is a continuation-in-part application of International Application No. PCT/JP2018/042746, filed on Nov. 20, 2018, and claims the benefit of the earlier filing date of Japanese Patent Application Nos. 2017-223153 and 2017-223154, both filed on Nov. 20, 2017. The entire contents of each of the identified applications are incorporated herein by reference.

BACKGROUND

Technical Field

The present teaching relates to a facing seats-type automated driving vehicle which includes facing seats and is driven automatically.

Background Art

A facing seats-type automated driving vehicle described in a Non-Patent Literature 1 has been known. The facing seats-type automated driving vehicle is a vehicle which is driven automatically. The facing seats-type automated driving vehicle includes facing seats on which passengers are able to seat face to face. The facing seats-type automated driving vehicle includes a floor deck which is at a central portion of the vehicle to allow passengers to put feet thereon and a luggage deck which is provided at a front portion or a rear portion of the vehicle to allow passengers to put luggage thereon. In the facing seats-type automated driving vehicle of Non-Patent Literature 1, a luggage deck which is a luggage carrier is provided at a vehicle rear portion when the traveling direction is a forward direction in the vehicle front-rear direction. In the facing seats-type automated driving vehicle of Non-Patent Literature 1, no luggage deck is provided at a front portion of the vehicle.

CITATION LIST

Non-Patent Literature

[Non-Patent Literature 1] Yamaha Motor Co., Ltd., "CES 2018", [online], Jan. 9, 2018, Yamaha Motor Co., Ltd., [retrieved on Oct. 19, 2018], the Internet

SUMMARY OF INVENTION

Technical Problem

The facing seats-type automated driving vehicle is required to be small in size and to be a convenient vehicle which is able to accommodate both luggage and passengers. A convenient vehicle which is able to accommodate both luggage and passengers corresponds to at least one of the following three specific examples, for example. A first specific example of convenience is that the facing seats-type automated driving vehicle is able to accommodate plural passengers. A second specific example of convenience is that the facing seats-type automated driving vehicle is able to accommodate a larger amount of luggage. A third specific example of convenience is that the facing seats-type automated driving vehicle is able to accommodate variously-shaped pieces of luggage.

An object of the present teaching is to provide a facing seats-type automated driving vehicle which is small in size and is able to conveniently accommodate both passengers and luggage.

Solution to Problem (1) A facing seats-type automated driving vehicle of the present teaching includes: facing seats including: a front seat assembly which includes at least a front seat among the front seat on which a first passenger is seated and a front backrest used by the first passenger to keep posture, the front seat assembly being disposed to cause the seated first passenger to face in a vehicle rearward direction; and a rear seat assembly which includes at least a rear seat among the rear seat on which a second passenger is seated and a rear backrest used by the second passenger to keep posture, the rear seat assembly being disposed to cause the seated second passenger to face a vehicle forward direction and being disposed to cause the front backrest and the rear backrest to at least partially face each other; a floor deck which is provided to allow the passenger seated on the facing seats to put one's leg; and a luggage deck on which luggage is placed, the facing seats-type automated driving vehicle not including a driver's seat, wherein, the luggage deck includes a front luggage deck having a front end disposed forward of a front end of the floor deck in the vehicle forward direction and a rear luggage deck disposed rearward of a rear end of the floor deck in the vehicle rearward direction, the floor deck and the luggage deck are arranged so that each of the front luggage deck and the rear luggage deck is shorter than the floor deck in a vehicle front-rear direction and the floor deck and the luggage deck are disposed so that each of an upper surface of the front luggage deck and an upper surface of the rear luggage deck is higher than an upper surface of the floor deck in a vehicle up-down direction, the floor deck has no level difference on an upper surface, and the facing seats include at least one of: (a) a front seat variable structure in which a rear end of the front seat in a state of allowing a passenger to be seated is disposed rearward of the front end of the floor deck, a first front space is provided directly above a front seat facing surface which is part of the upper surface of the floor deck and faces a bottom surface of the front seat in the state of allowing a passenger to be seated, the first front space includes a space in which no structure is provided between the bottom surface of the front seat in the state of allowing a passenger to be seated and the front seat facing surface, the first front space is divided in the vehicle up-down direction by the bottom surface of the front seat in the state of allowing a passenger to be seated, and the front seat is arranged so that the area of the bottom surface of the front seat dividing the first front space when viewed in the vehicle up-down direction is changeable; (b) a rear seat variable structure in which a front end of the rear seat in a state of allowing a passenger to be seated is disposed forward of the rear end of the floor deck, a first rear space is provided directly above a rear seat facing surface which is part of the upper surface of the floor deck and faces a bottom surface of the rear seat in the state of allowing a passenger to be seated, the first rear space includes a space in which no structure is provided between the bottom surface of the rear seat in the state of allowing a passenger to be seated and the rear seat facing surface, the first rear space is divided in the vehicle up-down direction by the bottom surface of the rear seat in the state of allowing a passenger to be seated, and the rear seat is arranged so that the area of the bottom surface of the rear seat dividing the first rear space when viewed in the vehicle up-down direction is changeable; (c) a front backrest variable structure in which an upper end of the front backrest in a state of keeping posture of a passenger is provided above the upper surface of the front luggage deck, a second front space is provided directly above the front seat in the state of allowing a passenger to be seated and above the front luggage deck, the second front space includes a space which is forward of a front surface of the front backrest in the state of keeping posture of a passenger, is above the front luggage deck, and has no structure, the second front space is divided in the vehicle front-rear direction by the front surface of the front backrest in the state of keeping posture of a passenger, and the front backrest is arranged so that the area of the front surface of the front backrest dividing the second front space when viewed in the vehicle front-rear direction is changeable; (d) a rear backrest variable structure in which an upper end of the rear backrest in a state of keeping posture of a passenger is provided above the upper surface of the rear luggage deck, a second rear space is provided directly above the rear seat in the state of allowing a passenger to be seated and above the rear luggage deck, the second rear space includes a space which is rearward of a rear surface of the rear backrest in the state of keeping posture of a passenger, is above the rear luggage deck, and has no structure, the second rear space is divided in the vehicle front-rear direction by the rear surface of the rear backrest in the state of keeping posture of a passenger, and the rear backrest is arranged so that the area of the rear surface of the rear backrest dividing the second rear space when viewed in the vehicle front-rear direction is changeable; (e) a front luggage deck elongation structure in which at least one of the front seat, the front backrest, the rear seat, and the rear backrest is arranged to be movable to a position where the front luggage deck is elongated rearward; (f) a rear luggage deck elongation structure in which at least one of the front seat, the front backrest, the rear seat, and the rear backrest is arranged to be movable to a position where the rear luggage deck is elongated forward; (g) a front seat elongation structure in which at least one of the front backrest, the rear seat, and the rear backrest is arranged to be movable to a position where the front seat is elongated rearward; and (h) a rear seat elongation structure in which at least one of the front seat, the front backrest, and the rear backrest is arranged to be movable to a position where the rear seat is elongated forward.

The inventors of the subject application have conceived of arranging the lengths of the front luggage deck and the rear luggage deck in the vehicle front-rear direction to be shorter than the length of the floor deck in the vehicle front-rear direction. In addition to this, the inventors of the subject application have conceived of arranging the heights of the upper surfaces of the front luggage deck and the rear luggage deck in the vehicle up-down direction to be higher than the height of the upper surface of the floor deck in the vehicle up-down direction. With these arrangements, it is possible to downsize the facing seats-type automated driving vehicle even if plural passengers are able to ride on the vehicle.

In addition to the above, the inventors of the subject application arrange the facing seats to have at least one of the structures (a) to (h). In other words, the inventors of the subject application arrange (i) the front seat or the front backrest or (ii) the rear seat or the rear backrest to have a variable structure or an elongated structure.

For example, when the facing seats have (a) the front seat variable structure, the area of the bottom surface of the front seat dividing the first front space when viewed in the vehicle up-down direction is reduced either by moving the front seat from a position of allowing a passenger to be seated to a position where the upper surface of the front seat faces the rear surface of the front backrest or by detaching the front seat. In the first front space, most or all the space which includes no structure and is provided between the bottom surface of the front seat in the state of allowing a passenger to be seated and the front seat facing surface of the floor deck is open in the vehicle upward direction. By utilizing this open space, a piece of luggage which is long in the vehicle up-down direction can be placed on the front seat facing surface which is part of the upper surface of the floor deck facing the bottom surface of the front seat in the state of allowing a passenger to be seated. It is therefore possible to place more pieces of luggage which are long in the vehicle up-down direction on the floor deck.

In addition to the above, for example, when the facing seats have (b) the rear seat variable structure, the area of the bottom surface of the rear seat dividing the first rear space when viewed in the vehicle up-down direction is reduced either by moving the rear seat from a position where the passenger is seatable on the seat to a position where the upper surface of the rear seat faces the front surface of the rear backrest or by detaching the rear seat. In the first rear space, most or all of the space which includes no structure and is provided between the bottom surface of the rear seat in the state of allowing a passenger to be seated and the rear seat facing surface of the floor deck is open in the vehicle upward direction. By utilizing this open space, a piece of luggage which is long in the vehicle up-down direction can be placed on the rear seat facing surface which is part of the upper surface of the floor deck facing the bottom surface of the rear seat in the state of allowing a passenger to be seated. It is therefore possible to place more pieces of luggage which are long in the vehicle up-down direction on the floor deck.

In addition to the above, for example, when the facing seats have (c) the front backrest variable structure, the area of the front surface of the front backrest dividing the second front space when viewed in the vehicle front-rear direction is reduced either by moving the front backrest from a position where the passenger is able to keep the posture to a position where the rear surface of the front backrest face the upper surface of the front seat or by detaching the front backrest. In the second front space, most or all of a space which is forward of the front surface of the front backrest in the state of keeping posture of a passenger, is above the front luggage deck, and has no structure therein is open in the vehicle rearward direction. By utilizing the open space, it is possible to place a piece of luggage which is long in the vehicle front-rear direction onto the front luggage deck.

In addition to the above, for example, when the facing seats have (d) the rear backrest variable structure, the area of the rear surface of the rear backrest dividing the second rear space when viewed in the vehicle front-rear direction is reduced either by moving the rear backrest from a position where the passenger is able to keep the posture to a position where the front surface of the rear backrest faces the upper surface of the rear seat or by detaching the rear backrest. In the second rear space, most or all of a space which is rearward of the rear surface of the rear backrest in the state of keeping posture of a passenger, is above the rear luggage deck, and has no structure therein is open in the vehicle forward direction. By utilizing the open space, it is possible to place a piece of luggage which is long in the vehicle front-rear direction onto the rear luggage deck.

In addition to the above, for example, when the facing seats include (e) the front luggage deck elongation structure, the area of the front luggage deck is increased by moving at least one of the front seat, the front backrest, the rear seat, or the rear backrest to a position where the front luggage deck is elongated in the vehicle rearward direction. This makes it possible to place a larger piece of luggage or a larger number of pieces of luggage on the front luggage deck.

In addition to the above, for example, when the facing seats include (f) the rear luggage deck elongation structure, the area of the rear luggage deck is increased by moving at least one of the front seat, the front backrest, the rear seat, or the rear backrest to a position where the rear luggage deck is elongated in the vehicle forward direction. This makes it possible to place a larger piece of luggage or a larger number of pieces of luggage on the rear luggage deck.

In addition to the above, for example, when the facing seats include (g) the front seat elongation structure, the area of the front seat is increased by moving at least one of the front backrest, rear seat, or the rear backrest to a position where the front seat is elongated in the vehicle rearward direction. For example, the front backrest, the rear seat, or the rear backrest may be detached and moved. Alternatively, for example, the front backrest may be swung from a position where the passenger is able to keep the posture to a position where the rear surface of the front backrest faces the upper surface of the front seat. Because the area of the front seat is increased, it becomes possible to place a larger piece of luggage or a larger number of pieces of luggage on the front seat.

In addition to the above, for example, when the facing seats include (h) the rear seat elongation structure, the area of the rear seat is increased by moving at least one of the front backrest, the front seat, or the rear backrest to a position where the rear seat is elongated in the vehicle forward direction. For example, the front seat, the front backrest, or the rear backrest may be detached and moved. Alternatively, for example, the rear backrest may be swung from a position where the passenger is able to keep the posture to a position where the front surface of the rear backrest faces the upper surface of the rear seat. Because the area of the rear seat is increased, it becomes possible to place a larger piece of luggage or a larger number of pieces of luggage on the rear seat.

As described above, as the facing seats are arranged to have at least one of the structures (a) to (h), it is possible to secure a larger space on which luggage is accommodated in the facing seats-type automated driving vehicle. In other words, variously shaped pieces of luggage and a larger number of pieces of luggage can be accommodated in the facing seats-type automated driving vehicle.

It is therefore possible to cause the facing seats-type automated driving vehicle of the present teaching to be able to conveniently accommodate both passengers and luggage and to be small in size at the same time.

(2) According to another aspect of the present teaching, the facing seats-type automated driving vehicle of the present teaching preferably includes the following arrangement, in addition to the arrangement (1).

The facing seats are arranged so that length in the vehicle front-rear direction between the rear end of the front seat in the state of allowing a passenger to be seated and the front end of the rear seat in the state of allowing a passenger to be seated is shorter than total length in the vehicle front-rear direction of the front luggage deck and the rear luggage deck.

According to this arrangement, the length in the vehicle front-rear direction between the rear end of the front seat in the state of allowing a passenger to be seated and the front end of the rear seat in the state of allowing a passenger to be seated is shorter than total length in the vehicle front-rear direction of the front luggage deck and the rear luggage deck. In other words, the floor deck is short in the vehicle front-rear direction. For this reason, plural passengers can ride on the vehicle even if the vehicle is small in size.

(3) According to another aspect of the present teaching, the facing seats-type automated driving vehicle of the present teaching preferably includes the following arrangement, in addition to the arrangement (1) or (2).

The facing seats are arranged to include only the front seat variable structure, only the rear seat variable structure, or both the front seat variable structure and the rear seat variable structure, among the front seat variable structure and the rear seat variable structure.

According to this arrangement, the facing seats are constituted by one of or both of (a) the front seat variable structure and (b) the rear seat variable structure. It is therefore possible to cause the vehicle to be able to conveniently accommodate both passengers and luggage and to be small in size at the same time, as described above.

(4) According to another aspect of the present teaching, the facing seats-type automated driving vehicle of the present teaching preferably includes the following arrangement, in addition to the arrangement (3).

The facing seats are arranged to further include only the front backrest variable structure, only the rear backrest variable structure, or both the front backrest variable structure and the rear backrest variable structure, among the front backrest variable structure and the rear backrest variable structure.

According to this arrangement, the facing seats are constituted by one of or both of the (a) the front seat variable structure and (b) the rear seat variable structure and one of or both of (c) the front backrest variable structure and (d) the rear backrest variable structure. It is therefore possible to cause the vehicle to be able to further conveniently accommodate both passengers and luggage and to be small in size at the same time.

(5) According to another aspect of the present teaching, the facing seats-type automated driving vehicle of the present teaching preferably includes the following arrangement, in addition to the arrangement (3) or (4).

The facing seats are arranged to include only the front luggage deck elongation structure, only the rear luggage deck elongation structure, or both the front luggage deck elongation structure and the rear luggage deck elongation structure, among the front luggage deck elongation structure and the rear luggage deck elongation structure.

According to this arrangement, the facing seats are constituted by one of or both of the (a) the front seat variable structure and (b) the rear seat variable structure and one of or both of (e) the front luggage deck elongation structure and (f) the rear luggage deck elongation structure. It is therefore possible to cause the vehicle to be able to further conveniently accommodate both passengers and luggage and to be small in size at the same time.

(6) According to another aspect of the present teaching, the facing seats-type automated driving vehicle of the present teaching preferably includes the following arrangement, in addition to any one of the arrangements (3) to (5).

The facing seats are arranged to further include only the front seat elongation structure, only the rear seat elongation structure, or both the front seat elongation structure and the rear seat elongation structure, among the front seat elongation structure and the rear seat elongation structure.

According to this arrangement, the facing seats are constituted by one of or both of the (a) the front seat variable structure and (b) the rear seat variable structure and one of or both of (g) the front seat elongation structure and (h) the rear seat elongation structure. It is therefore possible to cause the vehicle to be able to further conveniently accommodate both passengers and luggage and to be small in size at the same time.

(7) According to another aspect of the present teaching, the facing seats-type automated driving vehicle of the present teaching preferably includes the following arrangement, in addition to the arrangement (1) or (2).

The facing seats are arranged to further include only the front backrest variable structure, only the rear backrest variable structure, or both the front backrest variable structure and the rear backrest variable structure, among the front backrest variable structure and the rear backrest variable structure.

According to this arrangement, the facing seats are constituted by one of or both of (c) the front backrest variable structure and (d) the rear backrest variable structure. It is therefore possible to cause the vehicle to be able to conveniently accommodate both passengers and luggage and to be small in size at the same time, as described above.

(8) According to another aspect of the present teaching, the facing seats-type automated driving vehicle of the present teaching preferably includes the following arrangement, in addition to the arrangement (7).

The facing seats are arranged to include only the front luggage deck elongation structure, only the rear luggage deck elongation structure, or both the front luggage deck elongation structure and the rear luggage deck elongation structure, among the front luggage deck elongation structure and the rear luggage deck elongation structure.

According to this arrangement, the facing seats are constituted by one of or both of (c) the front backrest variable structure and (d) the rear backrest variable structure and one of or both of (e) the front luggage deck elongation structure and (f) the rear luggage deck elongation structure. It is therefore possible to cause the vehicle to be able to further conveniently accommodate both passengers and luggage and to be small in size at the same time.

(9) According to another aspect of the present teaching, the facing seats-type automated driving vehicle of the present teaching preferably includes the following arrangement, in addition to the arrangement (7) or (8).

The facing seats are arranged to further include only the front seat elongation structure, only the rear seat elongation structure, or both the front seat elongation structure and the rear seat elongation structure, among the front seat elongation structure and the rear seat elongation structure.

According to this arrangement, the facing seats are constituted by one of or both of (c) the front backrest variable structure and (d) the rear backrest variable structure and one of or both of (g) the front seat elongation structure and (h) the rear seat elongation structure. It is therefore possible to cause the vehicle to be able to further conveniently accommodate both passengers and luggage and to be small in size at the same time.

(10) According to another aspect of the present teaching, the facing seats-type automated driving vehicle of the present teaching preferably includes the following arrangement, in addition to the arrangement (1) or (2).

The facing seats are arranged to further include only the front luggage deck elongation structure, only the rear luggage deck elongation structure, or both the front luggage deck elongation structure and the rear luggage deck elongation structure, among the front luggage deck elongation structure and the rear luggage deck elongation structure.

According to this arrangement, the facing seats are constituted by one of or both of (e) the front luggage deck elongation structure and (f) the rear luggage deck elongation structure. It is therefore possible to cause the vehicle to be able to conveniently accommodate both passengers and luggage and to be small in size at the same time, as described above.

(11) According to another aspect of the present teaching, the facing seats-type automated driving vehicle of the present teaching preferably includes the following arrangement, in addition to the arrangement (10).

The facing seats are arranged to further include only the front seat elongation structure, only the rear seat elongation structure, or both the front seat elongation structure and the rear seat elongation structure, among the front seat elongation structure and the rear seat elongation structure.

According to this arrangement, the facing seats are constituted by one of or both of (e) the front luggage deck elongation structure and (f) the rear luggage deck elongation structure and one of or both of (g) the front seat elongation structure and (h) the rear seat elongation structure. It is therefore possible to cause the vehicle to be able to further conveniently accommodate both passengers and luggage and to be small in size at the same time.

(12) According to another aspect of the present teaching, the facing seats-type automated driving vehicle of the present teaching preferably includes the following arrangement, in addition to the arrangement (1) or (2).

The facing seats are arranged to further include only the front seat elongation structure, only the rear seat elongation structure, or both the front seat elongation structure and the rear seat elongation structure, among the front seat elongation structure and the rear seat elongation structure.

According to this arrangement, the facing seats are constituted by one of or both of (g) the front seat elongation structure and (h) the rear seat elongation structure. It is therefore possible to cause the vehicle to be able to conveniently accommodate both passengers and luggage and to be small in size at the same time, as described above.

(13) According to another aspect of the present teaching, the facing seats-type automated driving vehicle of the present teaching preferably includes the following arrangement, in addition to any one of the arrangements (3) and (10) to (12).

(i) The upper surface of the front luggage deck is provided above the upper end of the front backrest in the state of keeping posture of a passenger and the upper surface of the rear luggage deck is provided at the same height as or lower than the upper end of the front backrest in the state of keeping posture of a passenger, (ii) the upper surface of the front luggage deck is provided at the same height as or below the upper end of the front backrest in the state of keeping posture of a passenger and the upper surface of the rear luggage deck is provided above the upper end of the rear backrest in the state of keeping posture of a passenger, or (iii) the upper surface of the front luggage deck is provided above the upper end of the front backrest in the state of keeping posture of a passenger and the upper surface of the rear luggage deck is provided above the upper end of the rear backrest in the state of keeping posture of a passenger.

According to this arrangement, the upper surface of the front luggage deck may be provided above the upper end of the front backrest in the state of keeping posture of a passenger. This arrangement makes it possible to enlarge the space directly below the front luggage deck. The automatic driving mechanism can be accommodated in this enlarged space directly below the front luggage deck. On this account, as compared to a case where the upper surface of the front luggage deck is provided at the same height as or below the upper end of the front backrest which is in the state of keeping posture of a passenger and the automatic driving mechanism is accommodated in a space which is identical in volume with the automatic driving mechanism and is provided directly below the front luggage deck, the front luggage deck can be shortened in the vehicle front-rear direction.

Meanwhile, the upper surface of the rear luggage deck may be provided above the upper end of the rear backrest in the state of keeping posture of a passenger. This arrangement makes it possible to enlarge the space directly below the rear luggage deck. The automatic driving mechanism can be accommodated in this enlarged space directly below the rear luggage deck. On this account, as compared to a case where the upper surface of the rear luggage deck is provided at the same height as or below the upper end of the rear backrest and the automatic driving mechanism is accommodated in a space which is identical in volume with the automatic driving mechanism and is provided directly below the rear luggage deck, the rear luggage deck can be shortened in the vehicle front-rear direction. It is therefore possible to elongate the floor deck in the vehicle front-rear direction while reducing the size of the vehicle.

(14) According to another aspect of the present teaching, the facing seats-type automated driving vehicle of the present teaching preferably includes the following arrangement, in addition to any one of the arrangements (4), (7), and (8).

(i) When the rear surface of the front backrest is arranged to face the upper surface of the front seat in the state of allowing a passenger to be seated in the vehicle up-down direction so that the area of the front surface of the front backrest dividing the second front space is minimized when viewed in the vehicle front-rear direction, the upper end of the front backrest is provided at the same height as or below the upper surface of the front luggage deck, and when the front surface of the rear backrest is arranged to face the upper surface of the rear seat in the state of allowing a passenger to be seated in the vehicle up-down direction so that the area of the rear surface of the rear backrest dividing the second rear space is minimized when viewed in the vehicle front-rear direction, the upper end of the rear backrest is provided above the upper surface of the rear luggage deck, (ii) when the rear surface of the front backrest is arranged to face the upper surface of the front seat in the state of allowing a passenger to be seated in the vehicle up-down direction so that the area of the front surface of the front backrest dividing the second front space is minimized when viewed in the vehicle front-rear direction, the upper end of the front backrest is provided above the upper surface of the front luggage deck, and when the front surface of the rear backrest is arranged to face the upper surface of the rear seat in the state of allowing a passenger to be seated in the vehicle up-down direction so that the area of the rear surface of the rear backrest dividing the second rear space is minimized when viewed in the vehicle front-rear direction, the upper end of the rear backrest is provided at the same height as or below the upper surface of the rear luggage deck, or (iii) when the rear surface of the front backrest is arranged to face the upper surface of the front seat in the state of allowing a passenger to be seated in the vehicle up-down direction so that the area of the front surface of the front backrest dividing the second front space in the vehicle front-rear direction is minimized when viewed in the front-rear direction, the upper end of the front backrest is provided at the same height as or below the upper surface of the front luggage deck, and when the front surface of the rear backrest is arranged to face the upper surface of the rear seat in the state of allowing a passenger to be seated in the vehicle up-down direction so that the area of the rear surface of the rear backrest dividing the second rear space is minimized when viewed in the vehicle front-rear direction, the upper end of the rear backrest is provided at the same height as or below the upper surface of the rear luggage deck.

According to this arrangement, the minimum area of the front surface of the front backrest dividing the second front space may become 0 when viewed in the vehicle front-rear direction. In this case, in the second front space, a space which is forward of the front surface of the front backrest in the state of keeping posture of a passenger, is above the front luggage deck, and has no structure therein is open in a wider manner in the vehicle rearward direction. By utilizing this widened space, it is possible to place a piece of luggage which is long in the vehicle front-rear direction onto the front luggage deck. Meanwhile, the minimum area of the rear surface of the rear backrest dividing the second rear space may become 0 when viewed in the vehicle front-rear direction. In this case, in the second rear space, a space which is rearward of the rear surface of the rear backrest in the state of keeping posture of a passenger, is above the rear luggage deck, and has no structure therein is open in a wider manner in the vehicle forward direction. By utilizing this widened space, it is possible to place a piece of luggage which is long in the vehicle front-rear direction onto the rear luggage deck.

(15) According to another aspect of the present teaching, the facing seats-type automated driving vehicle of the present teaching preferably includes the following arrangement, in addition to any one of the arrangements (1) to (14).

(i) The upper surface of the front luggage deck is provided above the upper end of the front seat in the state of allowing a passenger to be seated and the upper surface of the rear luggage deck is provided at the same height as or below the upper end of the rear seat in the state of allowing a passenger to be seated, (ii) the upper surface of the front luggage deck is provided at the same height as or below the upper end of the front seat in the state of allowing a passenger to be seated and the upper surface of the rear luggage deck is provided above the upper end of the rear seat in the state of allowing a passenger to be seated, or (iii) the upper surface of the front luggage deck is provided above the upper end of the front seat in the state of allowing a passenger to be seated and the upper surface of the rear luggage deck is provided above the upper end of the rear seat in the state of allowing a passenger to be seated.

According to this arrangement, the upper surface of the front luggage deck may be provided above the upper end of the front seat in the state of allowing a passenger to be seated. It is therefore possible to enlarge the space directly below the front luggage deck. The automatic driving mechanism can be accommodated in this enlarged space directly below the front luggage deck. On this account, as compared to a case where the upper surface of the front luggage deck is provided at the same height as or below the upper end of the front seat which is in the state of allowing a passenger to be seated and the automatic driving mechanism is accommodated in a space which is identical in volume with the automatic driving mechanism and is provided directly below the front luggage deck, the front luggage deck can be shortened in the vehicle front-rear direction.

Meanwhile, the upper surface of the rear luggage deck may be provided above the upper end of the rear seat in the state of allowing a passenger to be seated. It is therefore possible to enlarge the space directly below the rear luggage deck. The automatic driving mechanism can be accommodated in this enlarged space directly below the rear luggage deck. On this account, as compared to a case where the upper surface of the rear luggage deck is provided at the same height as or below the upper end of the rear seat which is in the state of allowing a passenger to be seated and the automatic driving mechanism is accommodated in a space which is identical in volume with the automatic driving mechanism and is provided directly below the rear luggage deck, the rear luggage deck can be shortened in the vehicle front-rear direction.

It is therefore possible to elongate the floor deck in the vehicle front-rear direction while reducing the size of the vehicle.

(16) According to another aspect of the present teaching, the facing seats-type automated driving vehicle of the present teaching preferably includes the following arrangement, in addition to any one of the arrangements (1) to (15).

The facing seats-type automated driving vehicle further includes four wheels including two front wheels and two rear wheels which are behind the two front wheels in the vehicle front-rear direction, wherein, (i) upper ends of the two front wheels are provided below the lower end of the front seat in the state of allowing a passenger to be seated and upper ends of the two rear wheels are provided at the same height as or above the lower end of the rear seat in the state of allowing a passenger to be seated, (ii) the upper ends of the two front wheels are provided at the same height as or above the lower end of the front seat in the state of allowing a passenger to be seated and the upper ends of the two rear wheels are provided below the lower end of the rear seat in the state of allowing a passenger to be seated, or (iii) the upper ends of the two front wheels are provided below the lower end of the front seat in the state of allowing a passenger to be seated and the upper ends of the two rear wheels are provided below the lower end of the rear seat in the state of allowing a passenger to be seated.

According to this arrangement, the upper ends of the two front wheels may be provided below the lower end of the front seat in the state of allowing a passenger to be seated. In this case, the two front wheels are provided at low positions relative to the vehicle. It is therefore possible to enlarge the space directly below the front luggage deck even when the two front wheels are provided directly above the front luggage deck. The automatic driving mechanism can be accommodated in this enlarged space directly below the front luggage deck. On this account, as compared to a case where the upper ends of the two front wheels are provided at the same height as or above the lower end of the front seat and the automatic driving mechanism is accommodated in a space which is identical in volume with the automatic driving mechanism and is provided directly below the front luggage deck, the front luggage deck can be shortened in the vehicle front-rear direction.

Meanwhile, the upper ends of the two rear wheels may be provided above the lower end of the rear seat which is in the state of allowing a passenger to be seated. In such a case, the two rear wheels are provided at low positions relative to the vehicle. It is therefore possible to enlarge the space directly below the rear luggage deck even when the two rear wheels are provided directly above the rear luggage deck. The automatic driving mechanism can be accommodated in this enlarged space directly below the rear luggage deck. On this account, as compared to a case where the upper ends of the two rear wheels are provided at the same height as or above the lower end of the rear seat and the automatic driving mechanism is accommodated in a space which is identical in volume with the automatic driving mechanism and is provided directly below the rear luggage deck, the rear luggage deck can be shortened in the vehicle front-rear direction.

It is therefore possible to elongate the floor deck in the vehicle front-rear direction while reducing the size of the vehicle.

(17) According to another aspect of the present teaching, the facing seats-type automated driving vehicle of the present teaching preferably includes the following arrangement, in addition to any one of the arrangements (1) to (16).

The total of the length of the front luggage deck in the vehicle front-rear direction and the length of the rear luggage deck in the vehicle front-rear direction is shorter than length of the floor deck in the vehicle front-rear direction.

According to this arrangement, provided that the length of the entire vehicle in the vehicle front-rear direction remains the same, a space above the upper surface of the floor deck is large as compared to a case where the length which is the total of the length of the front luggage deck in the vehicle front-rear direction and the length of the rear luggage deck in the vehicle front-rear direction is shorter than the length of the floor deck in the vehicle front-rear direction. It is therefore possible to downsize the vehicle even if plural passengers are able to ride on the vehicle.

(18) According to another aspect of the present teaching, the facing seats-type automated driving vehicle of the present teaching preferably includes the following arrangement, in addition to any one of the arrangements (1) to (17).

The upper surface of the front luggage deck is identical in height with the upper surface of the rear luggage deck in the vehicle up-down direction.

With this arrangement, there is no difference in height between the front luggage deck and the rear luggage deck in the vehicle up-down direction. For this reason, when the facing seats have at least one of (c) the front backrest variable structure or (d) the rear backrest variable structure and at least one of (e) the front luggage deck elongation structure or (f) the rear luggage deck elongation structure, it is possible to load a piece of luggage which is long in the vehicle front-rear direction, across the front luggage deck and the rear luggage deck.

(19) According to another aspect of the present teaching, the facing seats-type automated driving vehicle of the present teaching preferably includes the following arrangement, in addition to any one of the arrangements (1) to (18).

The facing seats-type automated driving vehicle further includes: four wheels including two front wheels and two rear wheels which are behind the two front wheels in a vehicle front-rear direction; and an automatic driving mechanism including: a driving source configured to apply driving force to at least one of the four wheels;

a steering mechanism which is configured to steer at least one of the four wheels; and an automatic driving controller which automatically controls the driving source and the steering mechanism, wherein, (i) the automatic driving mechanism is at least partially provided directly below the lower end of the front luggage deck and the automatic driving mechanism is not provided below the lower end of the rear luggage deck, (ii) the automatic driving mechanism is at least partially provided directly below the lower end of the rear luggage deck and the automatic driving mechanism is not provided below the lower end of the front luggage deck, or (iii) the automatic driving mechanism is at least partially provided below the lower end of the front luggage deck and the lower end of the rear luggage deck.

According to this arrangement, the facing seats-type automated driving vehicle further includes the four wheels and the automatic driving mechanism. The automatic driving mechanism further includes the driving source, the steering mechanism, and the automatic driving controller. The driving source applies driving force to at least one of the four wheels. The steering mechanism steers at least one of the four wheels. The automatic driving controller automatically controls the driving source and the steering mechanism.

The automatic driving mechanism is at least partially accommodated in a space below the lower end of the front luggage deck and/or the rear luggage deck. As compared to a case where the entirety of the automatic driving mechanism is provided directly below the floor deck, it is possible to secure a large space above the upper surface of the floor deck, while maintaining the height of the vehicle.

(20) According to another aspect of the present teaching, the facing seats-type automated driving vehicle of the present teaching preferably includes the following arrangement, in addition to the arrangement (19).

(i) The automatic driving mechanism is at least partially provided forward of the front end of the front seat in the state of allowing a passenger to be seated and the automatic driving mechanism is not provided rearward of the rear end of the rear seat in the state of allowing a passenger to be seated, (ii) the automatic driving mechanism is at least partially provided rearward of the rear end of the rear seat in the state of allowing a passenger to be seated and the automatic driving mechanism is not provided forward of the front end of the front seat in the state of allowing a passenger to be seated, or (iii) the automatic driving mechanism is at least partially provided forward of the front end of the front seat in the state of allowing a passenger to be seated and rearward of the rear end of the rear seat in the state of allowing a passenger to be seated.

According to this arrangement, the automatic driving mechanism may be provided at least partially in a space forward of the front end of the front seat. In this case, it is possible to obtain a large space in the vehicle front-rear direction of the floor deck, as compared to a case where the automatic driving mechanism is provided at least partially in a space rearward of the front end of the front seat and forward of the rear end of the rear seat.

Meanwhile, the automatic driving mechanism may be provided at least partially in a space rearward of the rear end of the rear seat. In this case, it is possible to obtain a large space in the vehicle front-rear direction of the floor deck, as compared to a case where the automatic driving mechanism is provided at least partially in a space forward of the rear end of the rear seat and rearward of the front end of the front seat.

(21) According to another aspect of the present teaching, the facing seats-type automated driving vehicle of the present teaching preferably includes the following arrangement, in addition to any one of the arrangements (1) to (20).

The maximum number of passengers seatable on the facing seats is no more than six.

In regard to the maximum number of passengers seated, each passenger is an adult of average height.

This arrangement makes it possible to reduce the capacity of the vehicle internal portion of the facing seats-type automated driving vehicle. The facing seats may be arranged so that the maximum number of passengers seatable thereon is four. The vehicle can therefore be downsized.

(22) According to another aspect of the present teaching, the facing seats-type automated driving vehicle of the present teaching preferably includes the following arrangement, in addition to any one of the arrangements (1) to (21).

The facing seats-type automated driving vehicle further includes a roof portion which is provided directly above the floor deck, wherein, the roof portion is positioned so that the height in the vehicle up-down direction between a lower surface of the roof portion and the upper surface of the floor deck is insufficient for adult passengers to stand on the floor deck in an upright state.

This arrangement makes it possible to reduce the length in the vehicle up-down direction of the facing seats-type automated driving vehicle. The vehicle can therefore be downsized.

<Definition of Facing Seats-Type Automated Driving Vehicle>

In the present teaching and the specification, a facing seats-type automated driving vehicle is an automatic driving vehicle including facing seats. The automatic driving vehicle is a vehicle which includes an automatic driving mechanism and is able to automatically run without human operation. The automatic driving mechanism includes a steering mechanism, a driving source, a brake mechanism, and an automatic driving controller. The steering mechanism is a mechanism which controls the running direction of the facing seats-type automated driving vehicle by steering a wheel of the facing seats-type automated driving vehicle. The driving source is a mechanism which runs the facing seats-type automated driving vehicle by generating power for the facing seats-type automated driving vehicle. The brake mechanism is a mechanism which applies a brake to the running facing seats-type automated driving vehicle. The driving source is a motor, an engine, etc. The steering mechanism, the driving source, and the brake mechanism are automatically controlled by the automatic driving controller. The facing seats-type automated driving vehicle may be switched between a state in which the vehicle is automatically run without human operation and a state in which the vehicle is operated by human. The facing seats-type automated driving vehicle may be individually owned or may be used publicly. The facing seats-type automated driving vehicle may run on a public road or a private road, or may run on a running path which is not a road.

<Definition of Convenience of Vehicle which can Accommodate Both Passengers and Luggage>

In the present teaching and the specification, convenience of a vehicle which is able to accommodate both luggage and passengers indicates at least one of the following cases, for example. For example, the facing seats-type automated driving vehicle is able to accommodate plural passengers. For example, the facing seats-type automated driving vehicle is able to accommodate a larger amount of luggage. For example, the facing seats-type automated driving vehicle is able to accommodate variously-shaped pieces of luggage.

<Definition of Height in Vehicle Up-Down Direction of Upper Surface of Front Luggage Deck>

In the present teaching and the specification, height in the vehicle up-down direction of an upper surface of a front luggage deck indicates the maximum height in the vehicle up-down direction from a grounding surface where the facing seats-type automated driving vehicle is grounded to the upper surface of the front luggage deck. This definition also applies to height in the vehicle up-down direction of an upper surface of a rear luggage deck and height in the vehicle up-down direction of an upper surface of a floor deck.

<Definition of Floor Deck>

In the present teaching and the specification, a floor deck is provided in a cabin space and includes a face where passengers seated on the facing seats are able to put their feet and a face which is stepped on by a foot of a passenger who gets in or out from the cabin space. An upper surface of the floor deck may further include a face which is provided in the cabin space, is on the same plane as the face where the passengers seated on the facing seats are able to put their feet, does not allow passengers seated on the facing seats to put the feet thereon, and does not allow a passenger to step on the same when getting in or out from the cabin space. The face which does not allow passengers seated on the facing seats to put the feet thereon and does not allow a passenger to step on the same when getting in or out from the cabin space is a face which is directly below a front portion of a front seat. The front end and the rear end of a seat floor deck are identical with the front end and the rear end of the upper surface of the floor deck. The floor deck may be a single independent member, part of a single independent member, a combination of plural members, or part of a combination of plural members. When there is no level difference in the upper surface of the floor deck, the upper surface of the floor deck does not have a part which protrude in a vehicle upward direction as compared to a plane which is mostly occupied by the upper surface of the floor deck. The upper surface of the floor deck free from a level difference may have a groove which is narrow enough to hardly influence on passengers getting in and out from the vehicle and on seating of passengers on the facing seats. The upper surface of the floor deck free from a level difference may have a protrusion which is low enough to hardly influence on passengers getting in and out from the vehicle and on seating of passengers on the facing seats.

<Definition of Front Luggage Deck Elongation Structure>

In the present teaching and the specification, a front luggage deck elongation structure may be arranged such that not only at least one of a front seat, a front backrest, a rear seat, or a rear backrest but also another member are arranged to be movable to a position where the front luggage deck is elongated in a vehicle rearward direction. This definition is applicable to a rear luggage deck elongation structure, a front seat elongation structure, and a rear seat elongation structure.

<Definition of Position Where Front Luggage Deck Is Elongated>

In the present teaching and the specification, a position where the front luggage deck is elongated in the vehicle rearward direction includes a position where a gap is formed between the front luggage deck and the position and a position where no gap is formed between the front luggage deck and the position. This definition is applicable to a position where the rear luggage deck is elongated in the vehicle forward direction, a position where the front seat is elongated in the vehicle rearward direction, and a position where the rear seat is elongated in the vehicle forward direction.

Other Definitions of Terms

In the present teaching and the specification, an expression "an entity A is provided forward of an entity B" indicates the following state, unless otherwise specified. The entity A is provided in front of a plane which passes through the front-most end of the entity B and is orthogonal to the front-rear direction. In this connection, the entities A and B may or may not be lined up in the front-rear direction.

When the entity B is a plane or a linear line orthogonal to the front-rear direction, a plane passing the front-most end of the entity B is a plane passing the entity B. When the entity B is a linear line or a plane with an infinite length in the front-rear direction, the front-most end of the entity B is not specified. A linear line or a plane with an infinite length in the front-rear direction is not limited to a linear line or a plane parallel to the front-rear direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a plane with an infinite length in the front-rear direction, an expression "an entity A is provided forward of the entity B" indicates the following state. Among two spaces partitioned by the entity B, the entity A exists in the front one of the spaces.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" in the same condition with regard to the entity B.

In the present teaching and the specification, when an entity B is a linear line with an infinite length in the front-rear direction when viewed in a X direction different from the front-rear direction, an expression "an entity A is provided forward of the entity B when viewed in the X direction" indicates the following state. Among two areas partitioned by the entity B, the entity A exists in the front one of the areas when viewed in the X direction. The entity B may be a plane in three dimensions, as long as the entity B is a linear line when viewed in the X direction.

The same applies to an expression "an entity A is provided rearward of an entity B" in the same condition with regard to the entity B. Furthermore, the same applies to expressions "an entity A is provided above or below an entity B", and "an entity A is provided rightward of or leftward of an entity B" when viewed in a given direction, in the same condition with regard to the entity B and the viewing direction.

In the present teaching and the specification, an expression "an entity A is provided in front of an entity B" indicates the following state, unless otherwise specified. At least part of a rear surface of the entity A opposes at least part of a front surface of the entity B in the front-rear direction. Furthermore, the frontmost end of the entity B is rearward of the front-most end of the entity A and the rearmost end of the entity B is forward of the rear-most end of the entity A. The rear surface of the entity A is a surface which is viewable when the entity A is viewed from the rear side. The rear surface of the entity A may be a single continuous surface or may be formed of plural non-continuous surfaces. The definition of the front surface of the entity B is similar to this.

The same applies to expressions "an entity A is provided behind an entity B", "an entity A is provided directly above or below an entity B", and "an entity A is provided to the right of or to the left of an entity B".

In the present teaching and the specification, an expression "an entity A is provided in front of an entity B when viewed in an X direction different from the front-rear direction" indicates the following state, unless otherwise specified. When viewed in the X direction, at least part of the rear end of the entity A opposes at least part of the front end of the entity B in the front-rear direction. Furthermore, the frontmost end of the entity B is rearward of the front-most end of the entity A and the rearmost end of the entity B is forward of the rear-most end of the entity A. When the entities A and B are viewed in a Y direction different from the X direction, at least part of the rear end of the entity A may not oppose at least part of the front end of the entity B in the front-rear direction.

The same applies to expressions "an entity A is provided behind an entity B", "an entity A is provided directly above or below an entity B", and "an entity A is provided to the right of or to the left of an entity B" when viewed in a given direction.

In the present teaching, terms "including", "comprising", "having", and derivatives thereof are used to encompass not only listed items and equivalents thereof but also additional items.

In the present teaching, the terms "mounted", "connected", "coupled", and "supported" are used in broad sense. To be more specific, the terms encompass not only directly mounting, connection, coupling, and supporting but also indirect mounting, connection, coupling, and supporting. Furthermore, the terms "connected" and "coupled" do not merely indicate physical or mechanical connection and coupling. These terms encompass direct or indirect electric connection and coupling.

Unless otherwise defined, all terms (technical and scientific terms) used in this specification indicate meanings typically understood by a person with ordinary skill in the art in the technical field to which the present teaching belongs.

Terms defined in typical dictionaries indicate meanings used in related technologies and in the context of the present disclosure. The terms are not interpreted ideally or excessively formally.

In this specification, the term "preferable" is non-exclusive. The term "preferable" means "preferable but not limited to". In this specification, an arrangement which is "preferable" exerts at least the above-described effects of the arrangement (1) above. In this specification, the term "may" is non-exclusive. The term "may" indicate "may but not must". In this specification, an arrangement which is explained by using the term "may" exerts at least the above-described effects of the arrangement (1) above.

In the claims, when the number of a constituent feature is not clearly specified and the constituent feature is expressed in a singular form in English, the number of the constituent feature may be more than one in the present teaching. In the present teaching, the number of the constituent features may be only one.

In the present teaching, the preferred arrangements of the different aspects described above may be variously combined. Before an embodiment of the present teaching is detailed, it is informed that the present teaching is not limited to the configurations and layout of elements described below and/or shown in drawings. The present teaching may be implemented as an embodiment other than the below-described embodiment. The present teaching may be implemented as an embodiment other than the below-described embodiment. Furthermore, the present teaching may be implemented by suitably combining below-described modifications.

Advantageous Effects

The facing seats-type automated driving vehicle of the present teaching is small in size and is able to conveniently accommodate both passengers and luggage.

DESCRIPTION OF EMBODIMENTS

The following will describe an embodiment of the present teaching with reference to FIG. 1 to FIG. 5. In the following description of the embodiment of the present teaching, a vehicle front-rear direction, a vehicle left-right direction, and a vehicle up-down direction are a front-rear direction of the vehicle, a left-right direction of the vehicle, and an up-down direction of the vehicle, respectively. Furthermore, in each figure, arrows F, B, U, D, L, and R indicate forward, rearward, upward, downward, leftward, and rightward, respectively.

Figure 1:
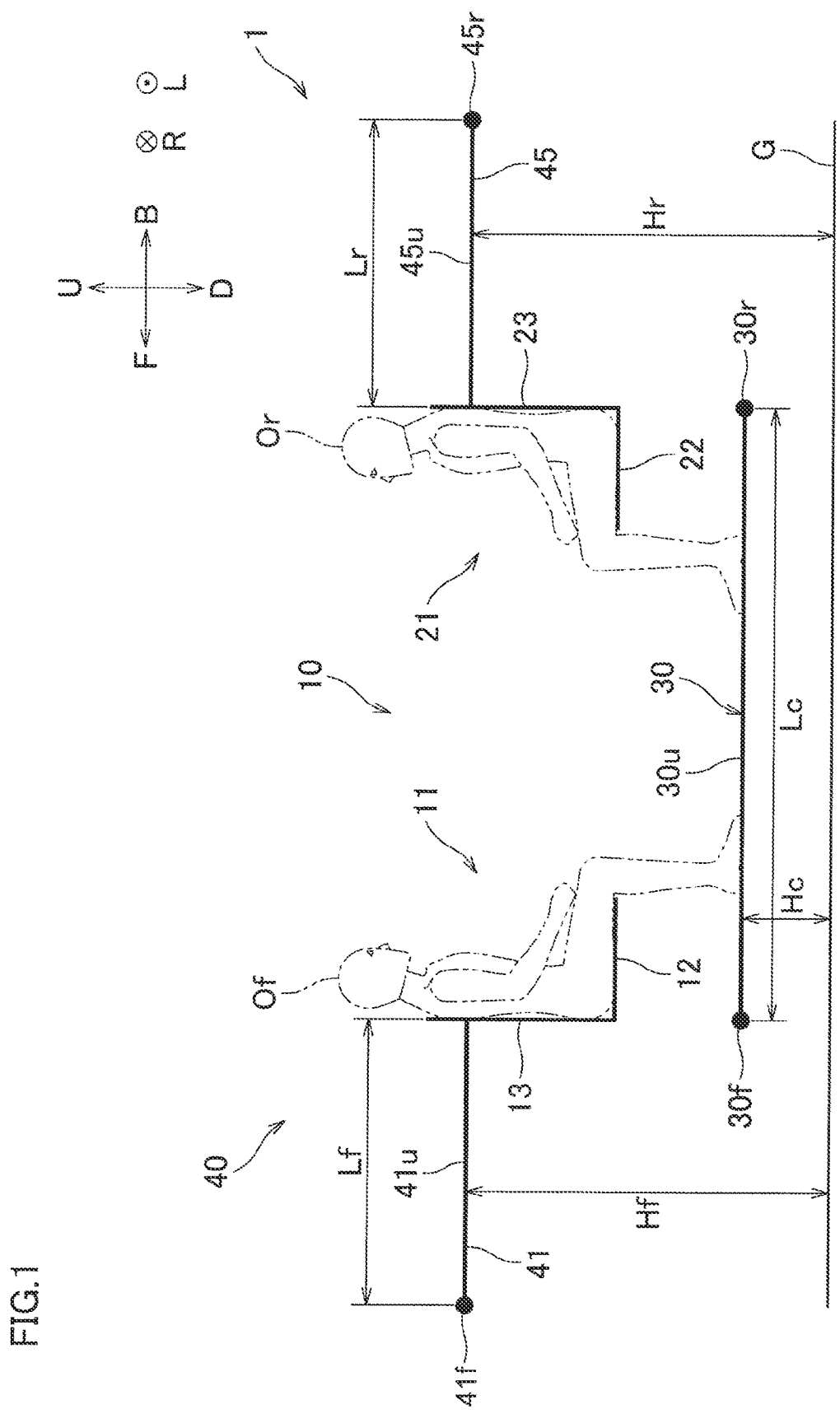
FIG. 1 is a side view which schematically shows a facing seats-type automated driving vehicle of the present teaching.

As shown in FIG. 1, a facing seats-type automated driving vehicle 1 includes facing seats 10, a floor deck 30, and a luggage deck 40. The facing seats-type automated driving vehicle 1 does not have a driver's seat. The facing seats-type automated driving vehicle 1 is grounded to a grounding surface G.

The facing seats 10 include a front seat assembly 11 and a rear seat assembly 21. The front seat assembly 11 includes at least a front seat 12 among the front seat 12 and a front backrest 13. The front seat 12 allows a passenger Of to be seated thereon. The front backrest 13 allows the passenger Of to keep the posture. The front seat assembly 11 is positioned so that the passenger Of faces a vehicle rearward direction when the passenger Of is seated. The rear seat assembly 21 includes at least a rear seat 22 among the rear seat 22 and a rear backrest 23. The rear seat 22 allows a passenger Or to be seated thereon. The rear backrest 23 allows the passenger Or to keep the posture. The rear seat assembly 21 is positioned so that the passenger Or faces a vehicle forward direction when the passenger Or is seated. The rear seat assembly 21 is positioned so that at least part of the front backrest 13 and at least part of the rear backrest 23 face each other. In other words, at least part of the front backrest 13 and at least part of the rear backrest 23 are lined up in the vehicle front-rear direction.

On the floor deck 30, the passengers Of and Or seated on the facing seats 10 put their feet. The floor deck 30 has no level difference on its upper surface.

The luggage deck 40 is provided so that luggage is placed thereon. To be more specific, the luggage deck 40 is provided so that luggage is placed on its upper surface. The luggage deck 40 includes a front luggage deck 41 and a rear luggage deck 45. A front end 41f of the front luggage deck 41 is provided forward of a front end 30f of the floor deck 30. A rear end 45r of the rear luggage deck 45 is provided rearward of a rear end 30r of the floor deck 30. The length Lf of the front luggage deck 41 in the vehicle front-rear direction is arranged to be shorter than the length of the floor deck 30 in the vehicle front-rear direction. The length Lr of the rear luggage deck 45 in the vehicle front-rear direction is arranged to be shorter than the length of the floor deck 30 in the vehicle front-rear direction. The floor deck 30 and the front luggage deck 41 are disposed so that the height Hf of an upper surface 41u of the front luggage deck 41 from the grounding surface G in the vehicle up-down direction is higher than the height Hc of an upper surface 30u of the floor deck 30 from the grounding surface G in the vehicle up-down direction. The floor deck 30 and the rear luggage deck 45 are disposed so that the height Hr of an upper surface 45u of the rear luggage deck 45 from the grounding surface G in the vehicle up-down direction is higher than the height Hc of the upper surface 30u of the floor deck 30 from the grounding surface G in the vehicle up-down direction.

The facing seats 10 are arranged so that the front seat 12, the rear seat 22, the front backrest 13, or the rear backrest 23 has a variable structure or an elongation structure described below. The facing seats 10 have at least one of (a) a front seat variable structure, (b) a rear seat variable structure, (c) a front backrest variable structure, (d) a rear backrest variable structure, (e) a front luggage deck elongation structure, (f) a rear luggage deck elongation structure, (g) a front seat elongation structure, or a (h) a rear seat elongation structure. These structures will be described below with reference to FIG. 2 to FIG. 5.

Figure 2:
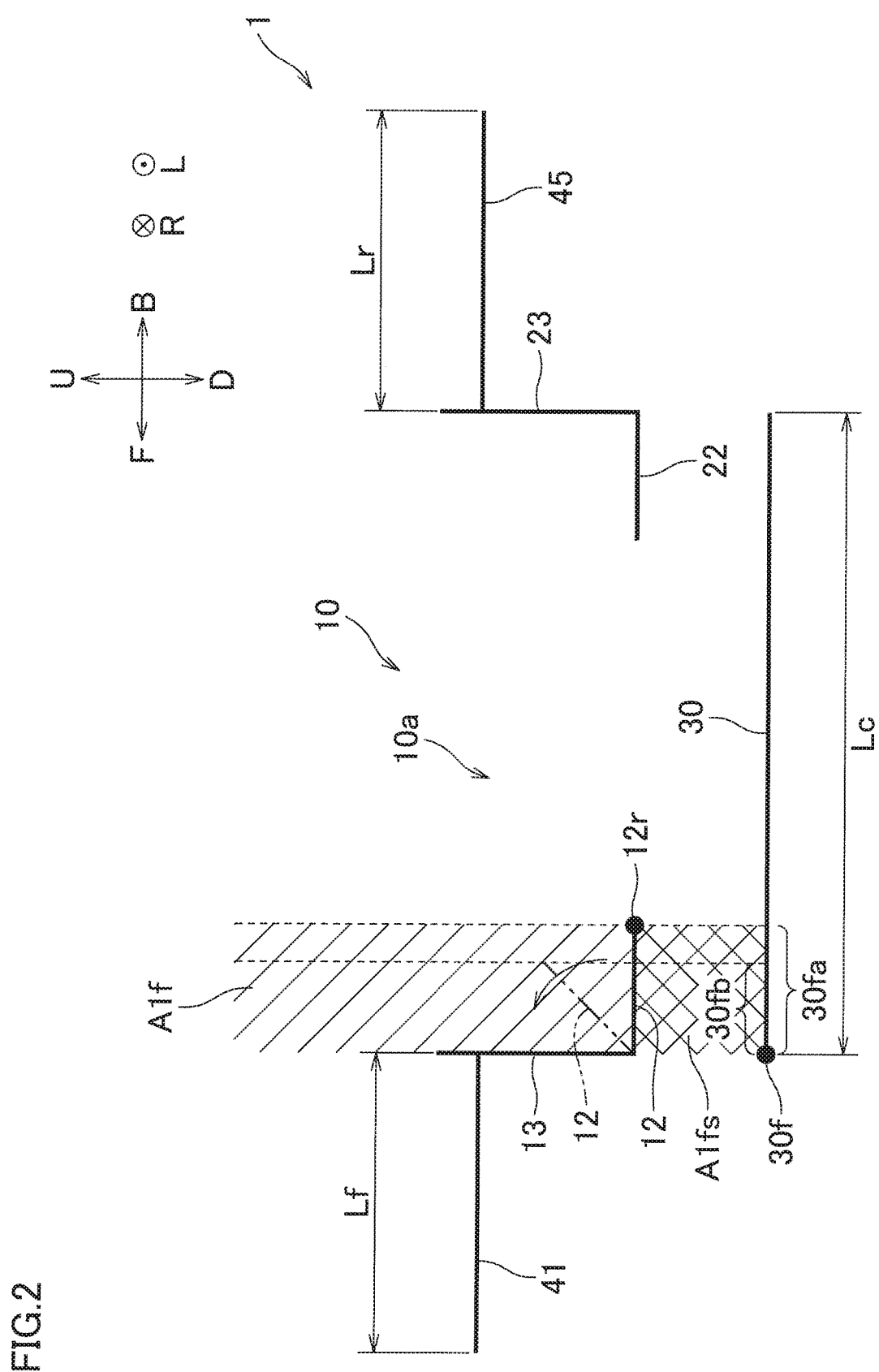
FIG. 2 is a side view which schematically shows the facing seats-type automated driving vehicle of FIG. 1, which has (a) a front seat variable structure.

As shown in FIG. 2, in (a) the front seat variable structure, a rear end 12r of the front seat 12 in a state of allowing a passenger to be seated is provided rearward of the front end 30f of the floor deck 30. In the front seat variable structure, a first front space A1f is divided in the vehicle up-down direction by a bottom surface of the front seat 12 in the state of allowing a passenger to be seated. When the first front space A1f is divided in the up-down direction, the first front space A1f is divided into an upper portion and a lower portion. The first front space A1f is a space directly above a front seat facing surface 30fa which is part of the upper surface of the floor deck 30. The front seat facing surface 30fa is part of the upper surface of the floor deck 30 and faces the bottom surface of the front seat 12 in the state in which the passenger Of is seatable thereon. The facing seats-type automated driving vehicle 1 is arranged not to have any structure in a space A1fs which is part of the first front space A1f. The space A1fs is part of the first front space A1f and is provided between the bottom surface of the front seat 12 in the state of allowing a passenger to be seated and the front seat facing surface 30fa. The first front space A1f is arranged not to have any structure in the space A1fs which is part of the first front space A1f. In the front seat variable structure, the area of the bottom surface of the front seat 12 which divides the first front space A1f when viewed in the vehicle up-down direction is changeable. For example, a two-dot chain line in FIG. 2 indicates a state in which the upper surface of the front seat 12 is moved toward a position where the upper surface faces a rear surface of the front backrest 13. As indicated by a full line in FIG. 2, when the front seat 12 is in the state of allowing a passenger to be seated, the area of the bottom surface of the front seat 12 dividing the first front space A1*f* is identical with the area of the front seat facing surface 30*fa* shown in FIG. 2 when viewed in the vehicle up-down direction. In the state in which the front seat 12 is moved as indicated by the two-dot chain line in FIG. 2, the area of the bottom surface of the front seat 12 dividing the first front space A1*f* is identical with the area of the face 30*fb* shown in FIG. 2, when viewed in the vehicle up-down direction. The face 30*fb* is part of the front seat facing surface 30*fa*. As indicated in FIG. 2, the state of allowing a passenger to be seated on the front seat 12 is different from the state in which the front seat 12 is moved, in term of the area of the bottom surface of the front seat 12 dividing the first front space A1*f* when viewed in the vehicle up-down direction.

Figure 3:
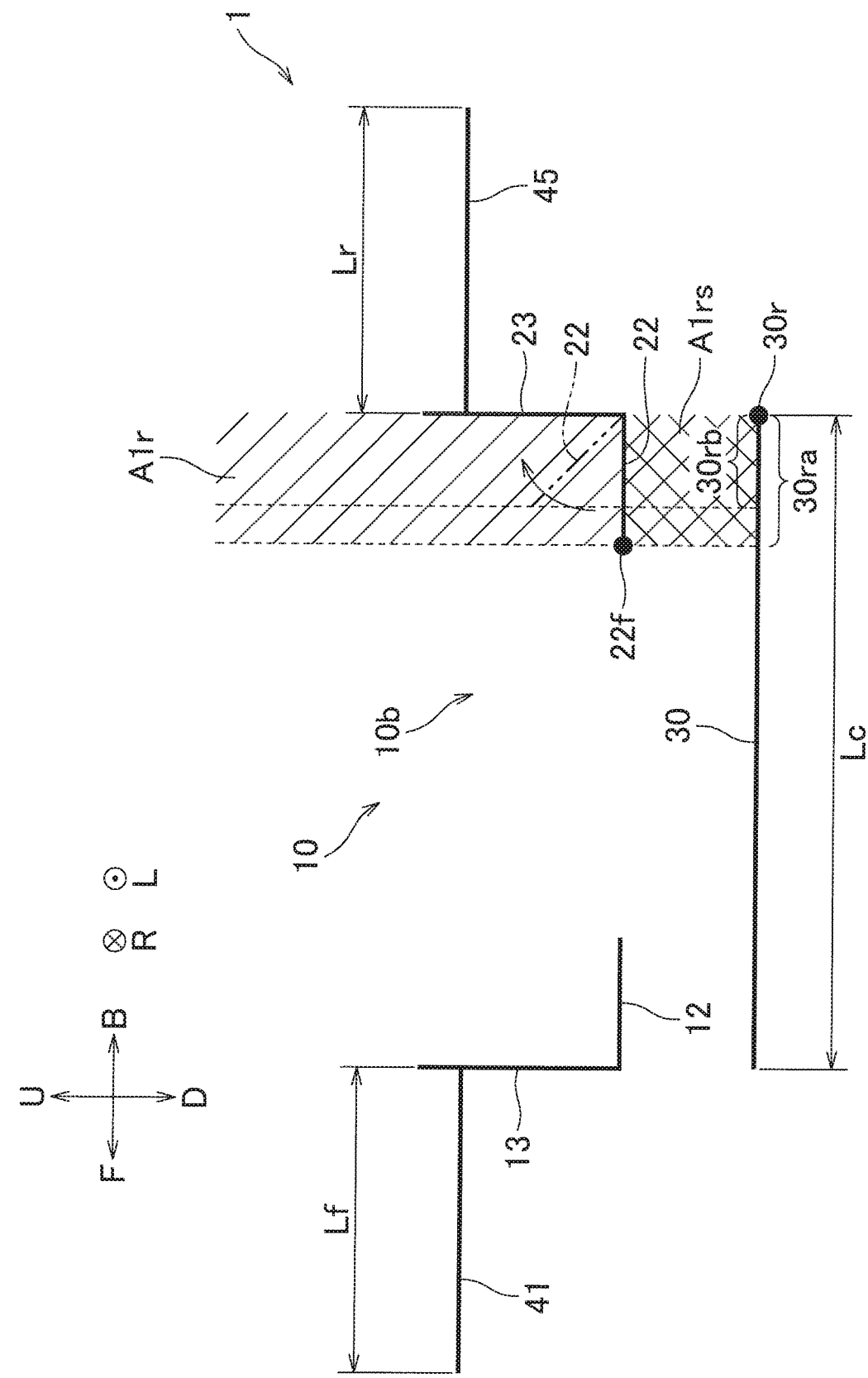
FIG. 3 is a side view which schematically shows the facing seats-type automated driving vehicle of FIG. 1, which has (b) a rear seat variable structure.

As shown in FIG. 3, in (b) the rear seat variable structure, a front end 22*f* of the rear seat 22 in a state of allowing a passenger to be seated is forward of the rear end 30*r* of the floor deck 30. In the rear seat variable structure, a first rear space A1*r* is divided in the vehicle up-down direction by the bottom surface of the rear seat 22 which is in the state of allowing a passenger to be seated. The first rear space A1*r* is a space directly above a rear seat facing surface 30*ra* which is part of the upper surface of the floor deck 30. The rear seat facing surface 30*ra* is part of the upper surface of the floor deck 30 and faces the bottom surface of the rear seat 22 in the state in which the passenger Or is seatable thereon. The facing seats-type automated driving vehicle 1 is arranged not to have any structure in a space Airs which is part of the first rear space A1*r*. The space Airs is part of the first rear space A1*r* and is provided between the bottom surface of the rear seat 22 in the state of allowing a passenger to be seated and the rear seat facing surface 30*ra*. The first rear space A1*r* is arranged not to have any structure in the space Airs which is part of the first rear space A1*r*.

In the rear seat variable structure, the area of the bottom surface of the rear seat 22 which divides the first rear space A1*r* when viewed in the vehicle up-down direction is changeable. For example, a two-dot chain line in FIG. 3 indicates a state in which the upper surface of the rear seat 22 is moved toward a position where the upper surface faces a front surface of the rear backrest 23. As indicated by a full line in FIG. 3, when the rear seat 22 is in the state of allowing a passenger to be seated, the area of the bottom surface of the rear seat 22 dividing the first rear space A1*r* is identical with the area of the rear seat facing surface 30*ra* shown in FIG. 3 when viewed in the vehicle up-down direction. In the state in which the rear seat 22 is moved as indicated by the two-dot chain line in FIG. 3, the area of the bottom surface of the rear seat 22 dividing the first rear space A1*r* is identical with the area of the face 30*rb* shown in FIG. 3 when viewed in the vehicle up-down direction. The face 30*rb* is part of the rear seat facing surface 30*ra*. As indicated in FIG. 3, the state of allowing a passenger to be seated on the rear seat 22 is different from the state in which the rear seat 22 is moved, in term of the area of the bottom surface of the rear seat 22 dividing the first rear space A1*r* when viewed in the vehicle up-down direction.

Figure 4:
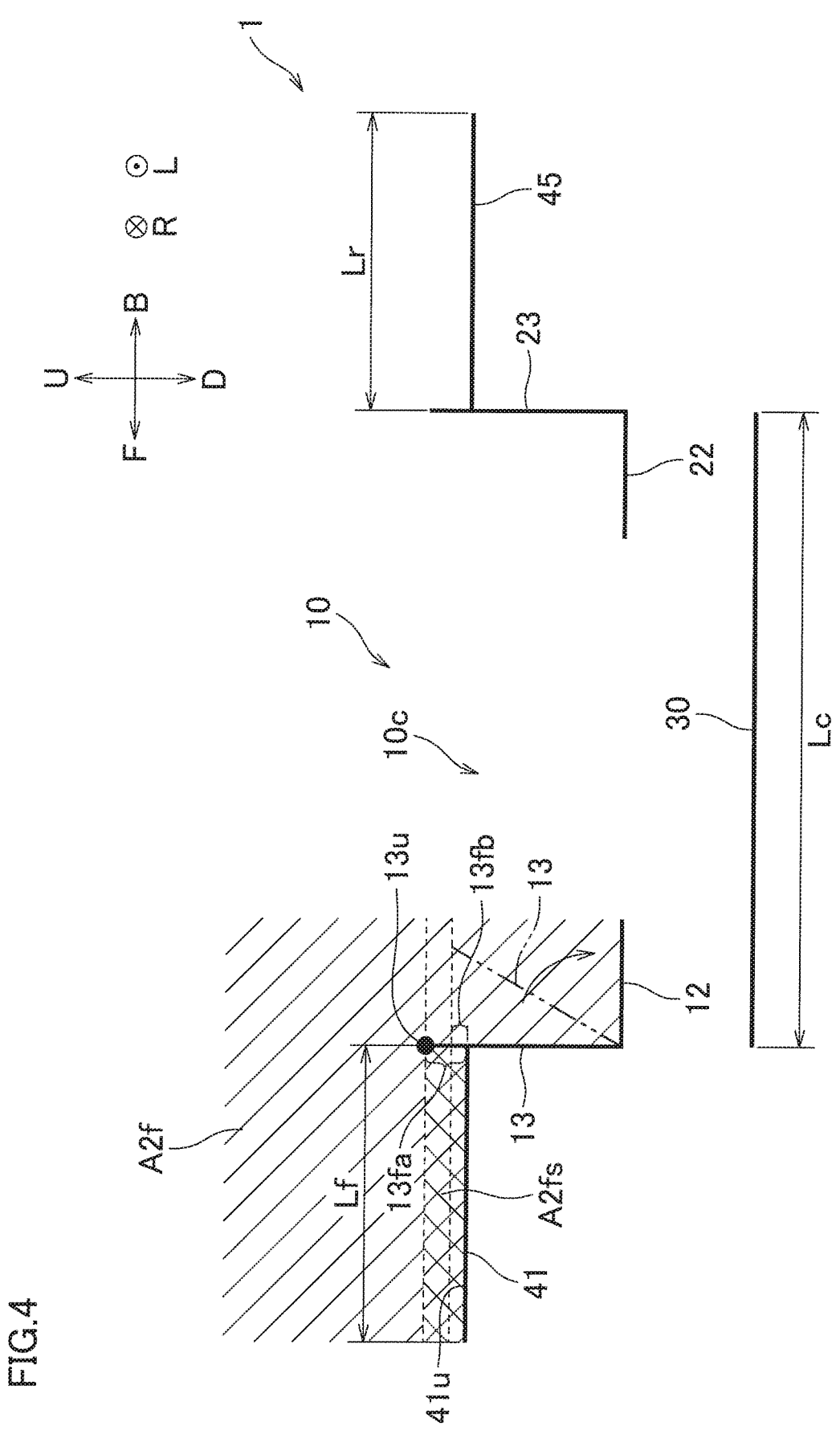
FIG. 4 is a side view which schematically shows the facing seats-type automated driving vehicle of FIG. 1, which has (c) a front backrest variable structure.

As shown in FIG. 4, in (c) the front backrest variable structure, an upper end 13*u* of the front backrest 13 in a state of keeping the posture of a passenger is provided above the upper surface 41*u* of the front luggage deck 41. In the front backrest variable structure, a second front space A2*f* is divided in the vehicle front-rear direction by a front surface of the front backrest 13 in the state of keeping the posture of a passenger. The second front space A2*f* is a space above the front seat 12 in the state of allowing a passenger to be seated and above the front luggage deck 41. To put it differently, the second front space A2*f* is a combination of a space above the front seat 12 in the state of allowing a passenger to be seated and a space above the front luggage deck 41. The facing seats-type automated driving vehicle 1 is arranged not to have any structure in a space A2*fs* which is part of the second front space A2*f*. The space A2*fs* is part of the second front space A2*f*, is forward of the front surface of the front backrest 13 in the state of keeping the posture of a passenger, and is above the front luggage deck 41. The second front space A2*f* is arranged not to have any structure in the space A2*fs* which is part of the second front space A2*f*.

In the front backrest variable structure, the area of the front surface of the front backrest 13 which divides the second front space A2*f* when viewed in the vehicle front-rear direction is changeable. For example, a two-dot chain line in FIG. 4 indicates a state in which the rear surface of the front backrest 13 is moved toward a position where the rear surface faces the upper surface of the front seat 12. As indicated by a full line in FIG. 4, when the front back rest 13 is in the state of keeping the posture of a passenger, the area of the front surface of the front backrest 13 dividing the second front space A2*f* is identical with the area of a face 13*fa* shown in FIG. 4 when viewed in the vehicle front-rear direction. When the front back rest 13 is in the state of having been moved as indicated by the two-dot chain line in FIG. 4, the area of the front surface of the front backrest 13 dividing the second front space A2*f* is identical with the area of a face 13*fb* shown in FIG. 4 when viewed in the vehicle front-rear direction. The face 13*fb* is a part of the face 13*fa*. As shown in FIG. 4, a case where the front back rest 13 is in the state of keeping the posture of a passenger is different from a case where the front backrest 13 is moved, in the area of the front surface of the front backrest 13 dividing the second front space A2*f* when viewed in the vehicle front-rear direction.

Figure 5:
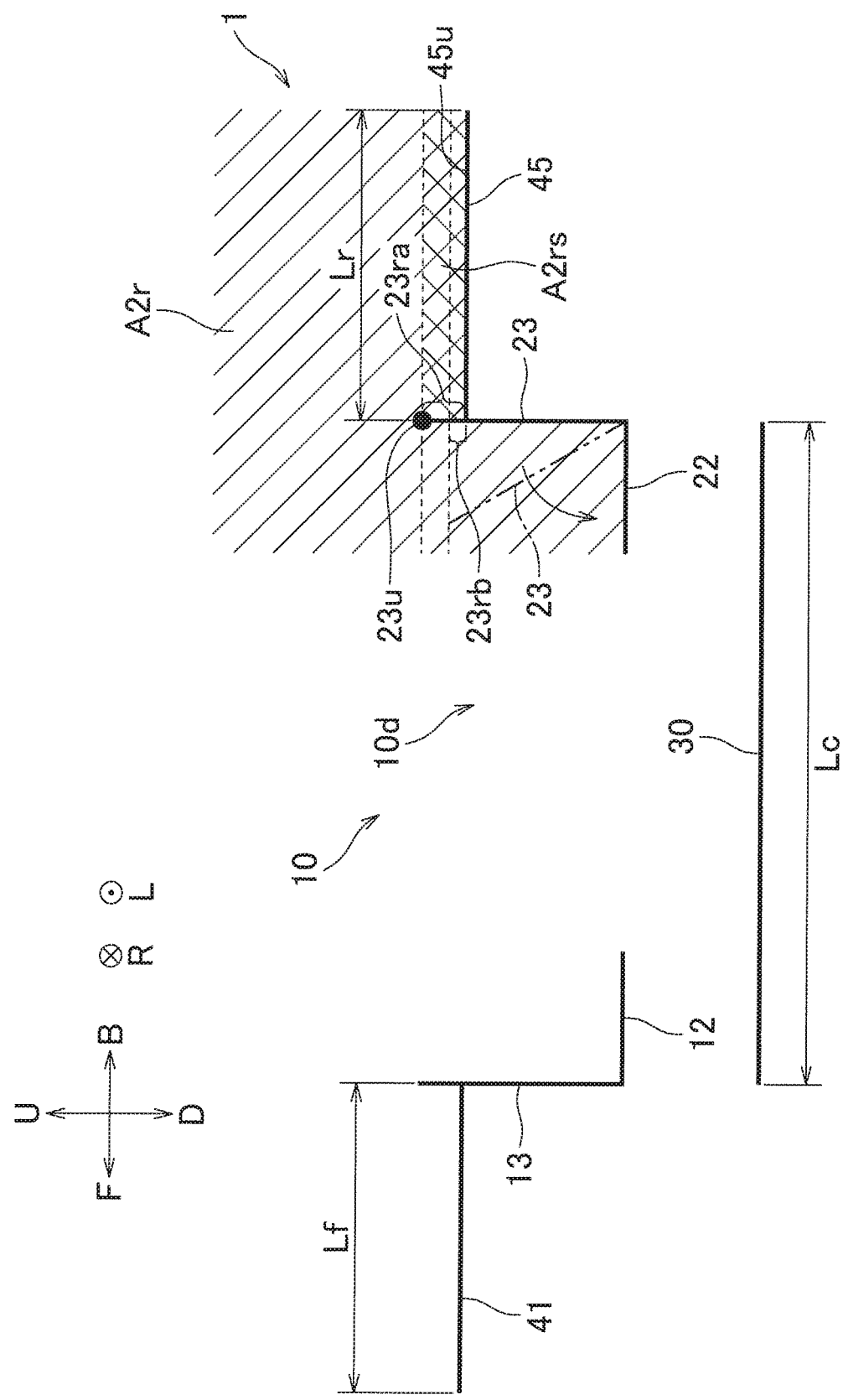
FIG. 5 is a side view which schematically shows the facing seats-type automated driving vehicle of FIG. 1, which has (d) a rear backrest variable structure.

As shown in FIG. 5, in (d) the rear backrest variable structure, an upper end 23*u* of the rear backrest 23 in a state of keeping the posture of a passenger is provided above the upper surface 45*u* of the rear luggage deck 45. In the rear backrest variable structure, a second rear space A2*r* is divided in the vehicle front-rear direction by a rear surface of the rear backrest 23 in the state of keeping the posture of a passenger. The second rear space A2*r* is a space above the rear seat 22 in the state of allowing a passenger to be seated and above the rear luggage deck 45. To put it differently, the second rear space A2*r* is a combination of a space above the rear seat 22 in the state of allowing a passenger to be seated and a space above the rear luggage deck 45. The facing seats-type automated driving vehicle 1 is arranged not to have any structure in a space A2*rs* which is part of the second rear space A2*r*. The space A2*rs* is part of the second rear space A2*r*, is rearward of the rear surface of the rear backrest 23 in the state of keeping the posture of a passenger, and is above the rear luggage deck 45. The second rear space A2*r* is arranged not to have any structure in the space A2*fs* which is part of the second rear space A2*r*.

In the rear backrest variable structure, the area of the rear surface of the rear backrest 23 which divides the second rear space A2*r* when viewed in the vehicle front-rear direction is changeable. For example, a two-dot chain line in FIG. 5 indicates a state in which a front surface of the rear backrest 23 is moved toward a position where the front surface faces the upper surface of the rear seat 22. As indicated by a full line in FIG. 5, when the rear backrest 23 is in the state of keeping the posture of a passenger, the area of the rear surface of the rear backrest 23 dividing the second rear space A2r is identical with the area of a face 23ra shown in FIG. 5 when viewed in the vehicle front-rear direction. When the front back rest 23 is in the state of having been moved as indicated by a two-dot chain line in FIG. 5, the area of the rear surface of the rear backrest 23 dividing the second rear space A2r is identical with the area of a face 23rb shown in FIG. 5 when viewed in the vehicle front-rear direction. The face 23rb is a part of the face 23ra. As shown in FIG. 5, a case where the front back rest 23 is in the state of keeping the posture of a passenger is different from a case where the rear backrest 23 is moved, in the area of the rear surface of the rear backrest 23 dividing the second rear space A2r when viewed in the vehicle front-rear direction.

Figure 6:
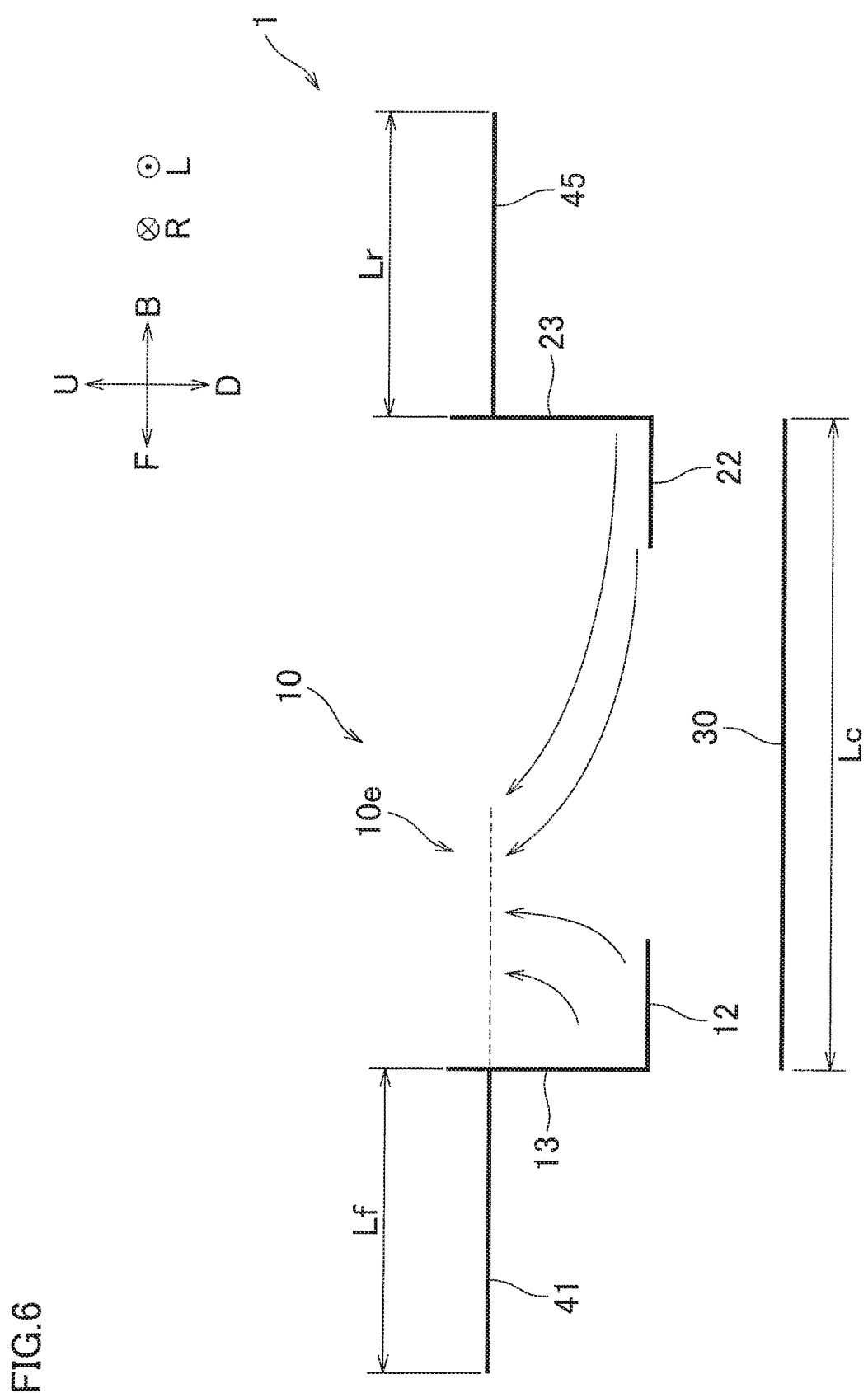
FIG. 6 is a side view which schematically shows the facing seats-type automated driving vehicle of FIG. 1, which has (e) a front luggage deck elongation structure.

As shown in FIG. 6, in (e) the front luggage deck elongation structure, at least one of the front seat 12, the front backrest 13, the rear seat 22, or the rear backrest 23 is arranged to be movable to a position where the front luggage deck 41 is elongated in the vehicle rearward direction. For example, in the front luggage deck elongation structure, at least one of the front seat 12, the front backrest 13, the rear seat 22, or the rear backrest 23 is arranged to be movable to a position indicated by a dotted line in FIG. 6.

Figure 7:
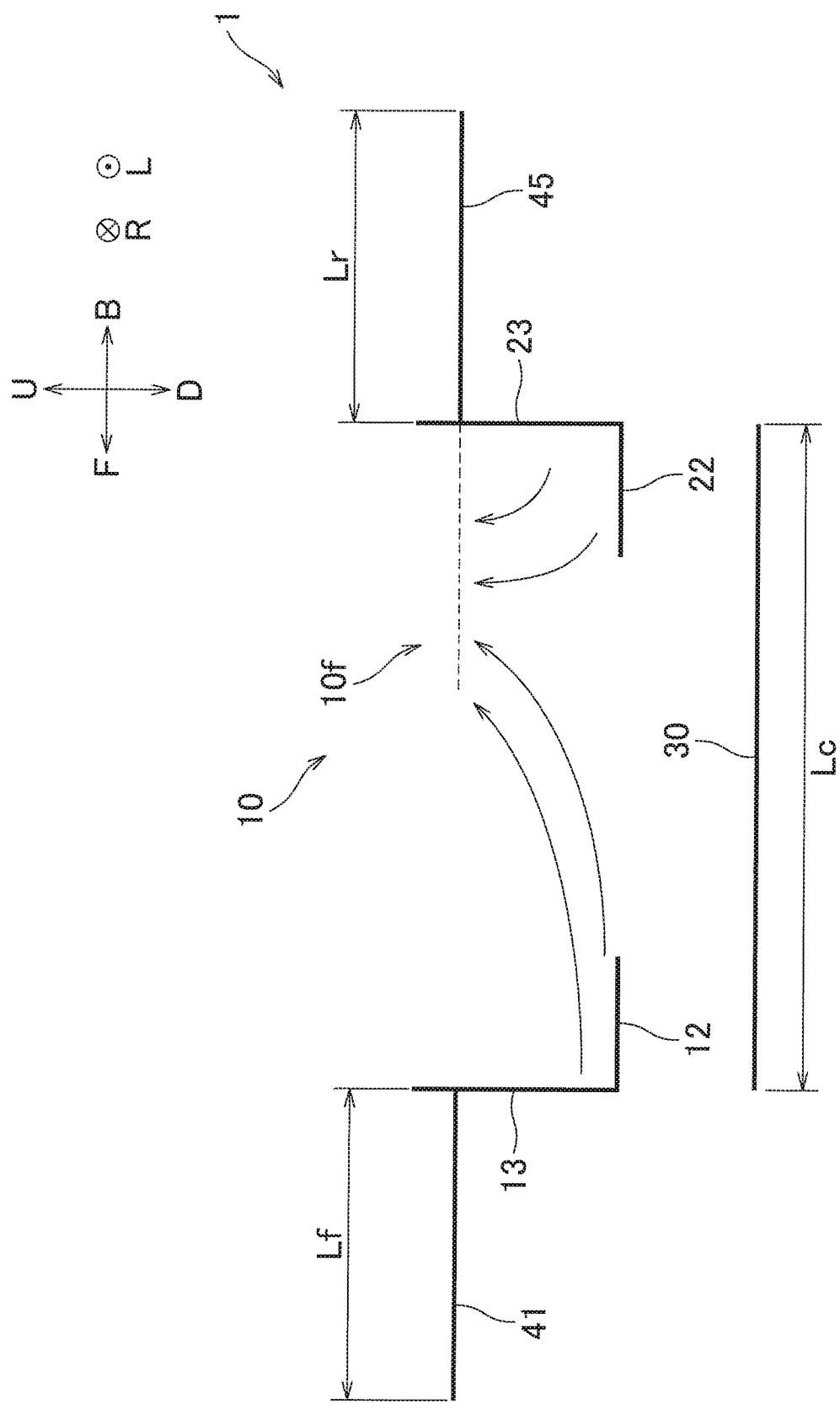
FIG. 7 is a side view which schematically shows the facing seats-type automated driving vehicle of FIG. 1, which has (f) a rear luggage deck elongation structure.

As shown in FIG. 7, in (f) the rear luggage deck elongation structure, at least one of the front seat 12, the front backrest 13, the rear seat 22, or the rear backrest 23 is arranged to be movable to a position where the rear luggage deck 45 is elongated in the vehicle forward direction. For example, in the rear luggage deck elongation structure, at least one of the front seat 12, the front backrest 13, the rear seat 22, or the rear backrest 23 is arranged to be movable to a position indicated by a dotted line in FIG. 7.

Figure 8:
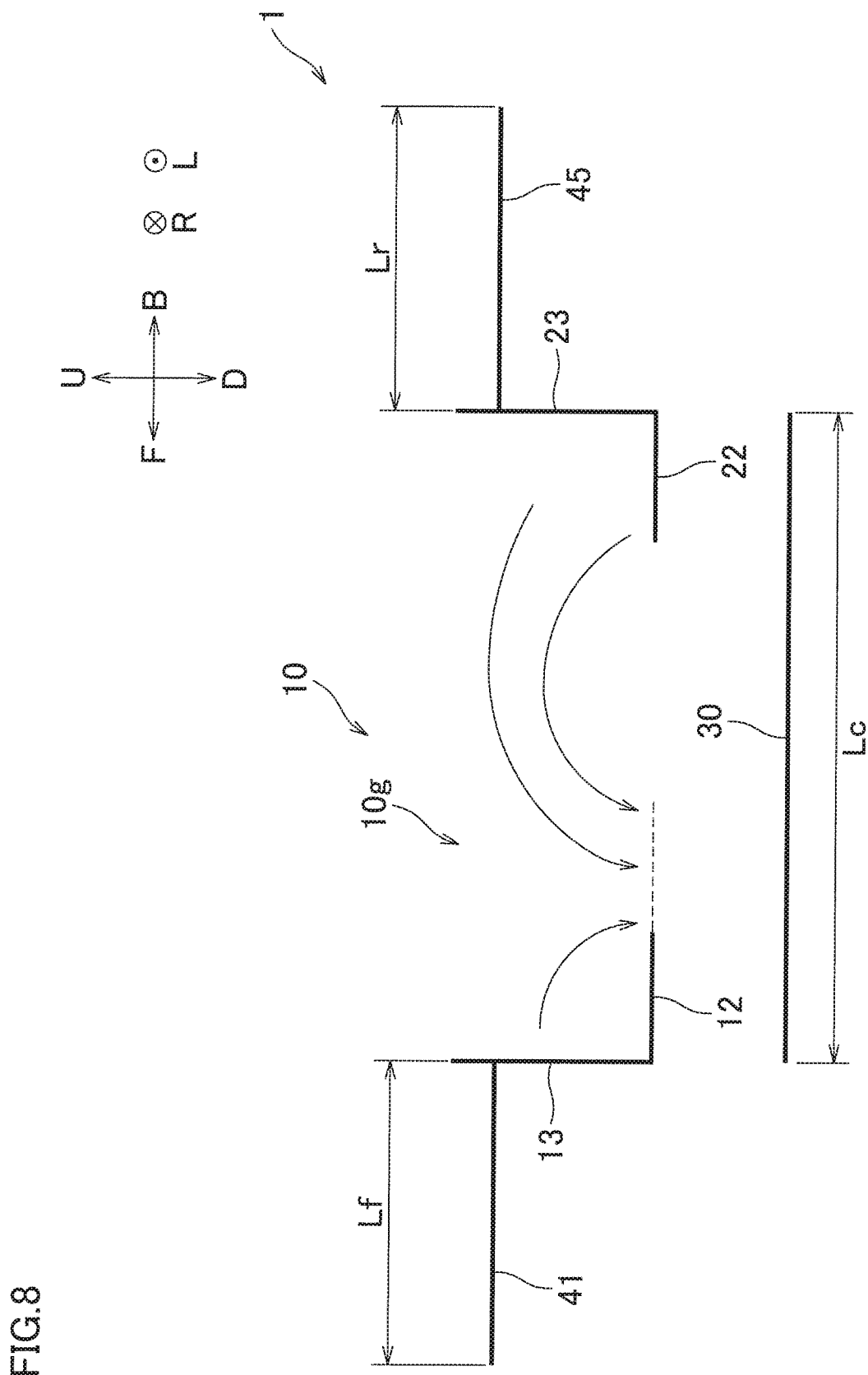
FIG. 8 is a side view which schematically shows the facing seats-type automated driving vehicle of FIG. 1, which has (g) a front seat elongation structure.

As shown in FIG. 8, in (g) the front seat elongation structure, at least one of the front backrest 13, the rear seat 22, or the rear backrest 23 is arranged to be movable to a position where the front seat 12 is elongated in the vehicle rearward direction. For example, in the front seat elongation structure, at least one of the front backrest 13, the rear seat 22, or the rear backrest 23 is arranged to be movable to a position indicated by a dotted line in FIG. 8.

Figure 9:
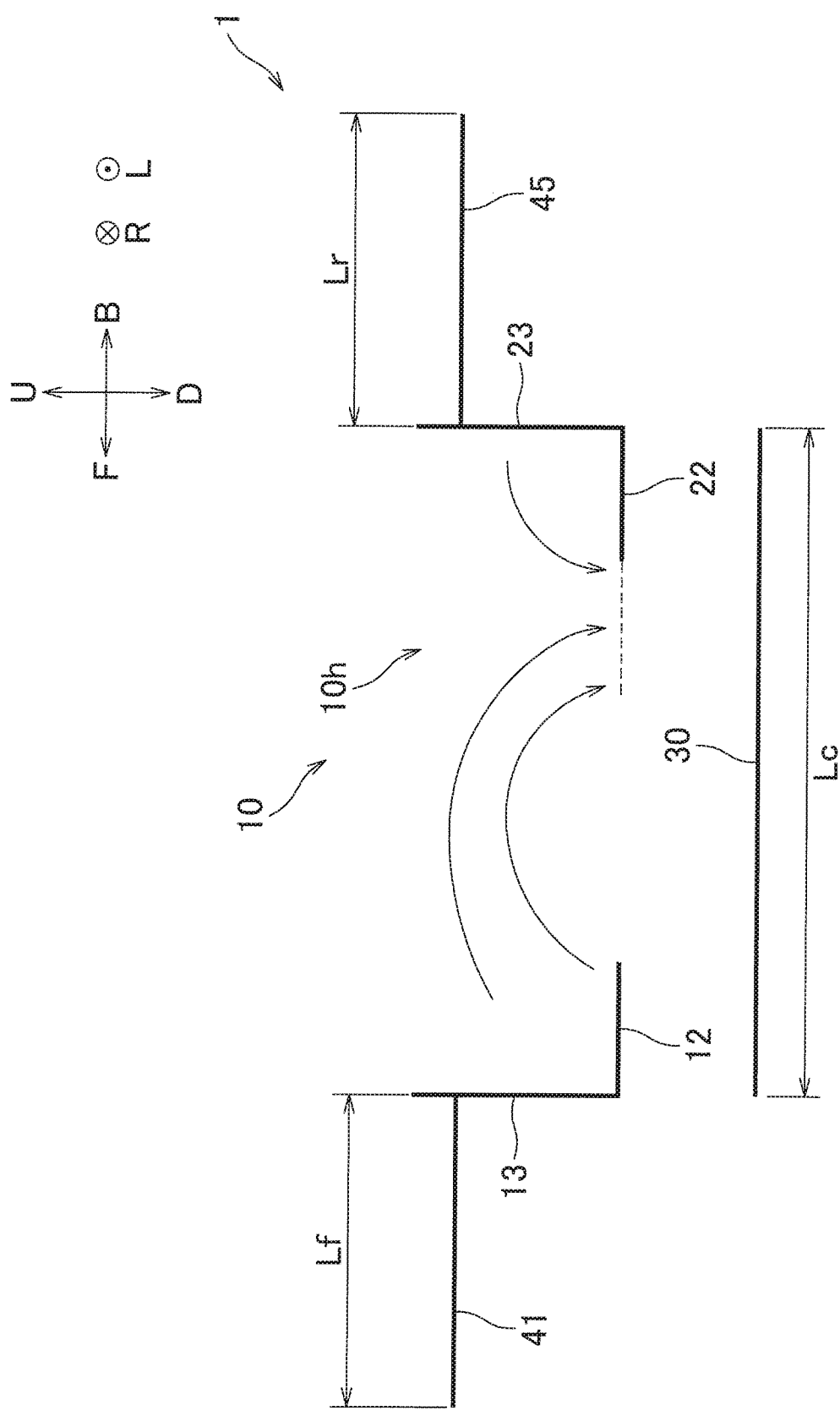
FIG. 9 is a side view which schematically shows the facing seats-type automated driving vehicle of FIG. 1, which has (h) a rear seat elongation structure.

As shown in FIG. 9, in (h) the rear seat elongation structure, at least one of the front seat 12, the front backrest 13, or the rear backrest 23 is arranged to be movable to a position where the rear seat 22 is elongated in the vehicle forward direction. For example, in the rear seat elongation structure, at least one of the front seat 12, the front backrest 13, or the rear backrest 23 is arranged to be movable to a position indicated by a dotted line in FIG. 9.

Because of these arrangements, the facing seats-type automated driving vehicle 1 of the present embodiment exerts the following effects.

The inventors of the subject application have conceived of arranging the lengths Lf and Lr of the front luggage deck 41 and the rear luggage deck 45 in the vehicle front-rear direction to be shorter than the length Lc of the floor deck 30 in the vehicle front-rear direction. In addition to this, the inventors of the subject application have conceived of arranging the heights Hf2 and Hr of the upper surfaces 41u and 45u of the front luggage deck 41 and the rear luggage deck 45 in the vehicle up-down direction to be higher than the height of the upper surface 30u of the floor deck 30 in the vehicle up-down direction. With these arrangements, it is possible to downsize the facing seats-type automated driving vehicle 1 even if plural passengers Of and Or are able to ride on the vehicle.

In addition to the above, the inventors of the subject application arrange the facing seats 10 to have at least one of the structures (a) to (h). In other words, the inventors of the subject application arrange (i) the front seat 12 or the front backrest 13 or (ii) the rear seat 22 or the rear backrest 23 to have a variable structure or an elongated structure.

For example, when the facing seats 10 have (a) the front seat variable structure 10a, the area of the bottom surface of the front seat 12 dividing the first front space A1f when viewed in the vehicle up-down direction is reduced either by moving the front seat 12 from a position where the passenger Of is seatable on the seat to a position where the upper surface of the front seat 12 faces the rear surface of the front backrest 13 or by detaching the front seat 12. In the first front space A1f, most or all of the space A1fs which includes no structure and is provided between the bottom surface of the front seat 12 in the state in which the passenger Of is seatable thereon and the front seat facing surface 30fa of the floor deck 30 is open in the vehicle upward direction. By utilizing this open space A1fs, a piece of luggage which is long in the vehicle up-down direction can be placed on the front seat facing surface 30fa which is part of the upper surface of the floor deck 30 facing the bottom surface of the front seat 12 in the state in which the passenger Of is seatable thereon. It is therefore possible to place more pieces of luggage which are long in the vehicle up-down direction on the floor deck 30.

In addition to the above, for example, when the facing seats 10 have (b) the rear seat variable structure 10b, the area of the bottom surface of the rear seat 22 dividing the first rear space A1r when viewed in the vehicle up-down direction is reduced either by moving the rear seat 22 from a position where the passenger Or is seatable on the seat to a position where the upper surface of the rear seat 22 faces the front surface of the rear backrest 23 or by detaching the rear seat 22. In the first rear space A1r, most or all of the space Airs which includes no structure and is provided between the bottom surface of the rear seat 22 in the state in which the passenger Or is seatable thereon and the rear seat facing surface 30ra of the floor deck 30 is open in the vehicle upward direction. By utilizing this open space Airs, a piece of luggage which is long in the vehicle up-down direction can be placed on the rear seat facing surface 30ra which is part of the upper surface of the floor deck 30 facing the bottom surface of the rear seat 22 in the state in which the passenger Or is seatable thereon. It is therefore possible to place more pieces of luggage which are long in the vehicle up-down direction on the floor deck 30.

In addition to the above, for example, when the facing seats 10 have (c) the front backrest variable structure 10c, the area of the front surface of the front backrest 13 dividing the second front space A2f when viewed in the vehicle front-rear direction is reduced either by moving the front backrest 13 from a position where the passenger Of is able to keep the posture to a position where the rear surface of the front backrest 13 faces the upper surface of the front seat 12 or by detaching the front backrest 13. In the second front space A2f, most or all of a space A2fs is open in the vehicle rearward direction. The space A2fs is forward of the front surface of the front backrest 13 in the state in which the passenger Of is able to keep the posture, and no structure is provided above the front luggage deck 41 in the space A2fs. By utilizing the open space A2fs, it is possible to place a piece of luggage which is long in the vehicle front-rear direction onto front luggage deck 41.

In addition to the above, for example, when the facing seats 10 have (d) the rear backrest variable structure 10d, the area of the rear surface of the rear backrest 23 dividing the second rear space A2r when viewed in the vehicle front-rear direction is reduced either by moving the rear backrest 23 from a position where the passenger Of is able to keep the posture to a position where the front surface of the rear backrest 23 faces the upper surface of the rear seat 22 or by detaching the rear backrest 23. Most or all of a space A2*rs* is open in the vehicle forward direction. The space A2*rs* is rearward of the rear surface of the rear backrest 23 in the state in which the passenger Or is able to keep the posture, and no structure is provided above the rear luggage deck 45 in the space A2*rs*. By utilizing the open space A2*rs*, it is possible to place a piece of luggage which is long in the vehicle front-rear direction onto the rear luggage deck 45.

In addition to the above, for example, when the facing seats 10 include (e) the front luggage deck elongation structure 10*e*, the area of the front luggage deck 41 is increased by moving at least one of the front seat 12, the front backrest 13, the rear seat 22, or the rear backrest 23 to a position where the front luggage deck 41 is elongated in the vehicle rearward direction. This makes it possible to place a larger piece of luggage or a larger number of pieces of luggage on the front luggage deck 41.

In addition to the above, for example, when the facing seats 10 include (f) the rear luggage deck elongation structure 10*f*, the area of the rear luggage deck 45 is increased by moving at least one of the front seat 12, the front backrest 13, the rear seat 22, or the rear backrest 23 to a position where the rear luggage deck 45 is elongated in the vehicle forward direction. This makes it possible to place a larger piece of luggage or a larger number of pieces of luggage on the rear luggage deck 45.

In addition to the above, for example, when the facing seats 10 include (g) the front seat elongation structure 10*g*, the area of the front seat 12 is increased by moving at least one of the front backrest 13, rear seat 22, or the rear backrest 23 to a position where the front seat 12 is elongated in the vehicle rearward direction. For example, the front backrest 13, the rear seat 22, or the rear backrest 23 may be detached and moved. Alternatively, for example, the front backrest may be swung from a position where the passenger is able to keep the posture to a position where the rear surface of the front backrest 13 faces the upper surface of the front seat 12. Because the area of the front seat 12 is increased, it becomes possible to place a larger piece of luggage or a larger number of pieces of luggage on the front seat 12.

In addition to the above, for example, when the facing seats 10 include (h) the rear seat elongation structure 10*h*, the area of the rear seat 22 is increased by moving at least one of the front backrest 13, the front seat 12, or the rear backrest 23 to a position where the rear seat 22 is elongated in the vehicle forward direction. For example, the front seat 12, the front backrest 13, or the rear backrest 23 may be detached and moved. Alternatively, for example, the rear backrest 23 may be swung from a position where the passenger is able to keep the posture to a position where the front surface of the rear backrest 23 faces the upper surface of the rear seat 22. Because the area of the rear seat 22 is increased, it becomes possible to place a larger piece of luggage or a larger number of pieces of luggage on the rear seat 22.

As described above, as the facing seats 10 are arranged to have at least one of the structures (a) to (h), it is possible to secure a larger space in which luggage is accommodated in the facing seats-type automated driving vehicle 1. In other words, variously shaped pieces of luggage and a larger number of pieces of luggage can be accommodated in the facing seats-type automated driving vehicle 1. It is therefore possible to cause the facing seats-type automated driving vehicle 1 of the present teaching to be able to conveniently accommodate both passengers and luggage and to be small in size at the same time.

Specific Example 1 of Embodiment

Figure 10:
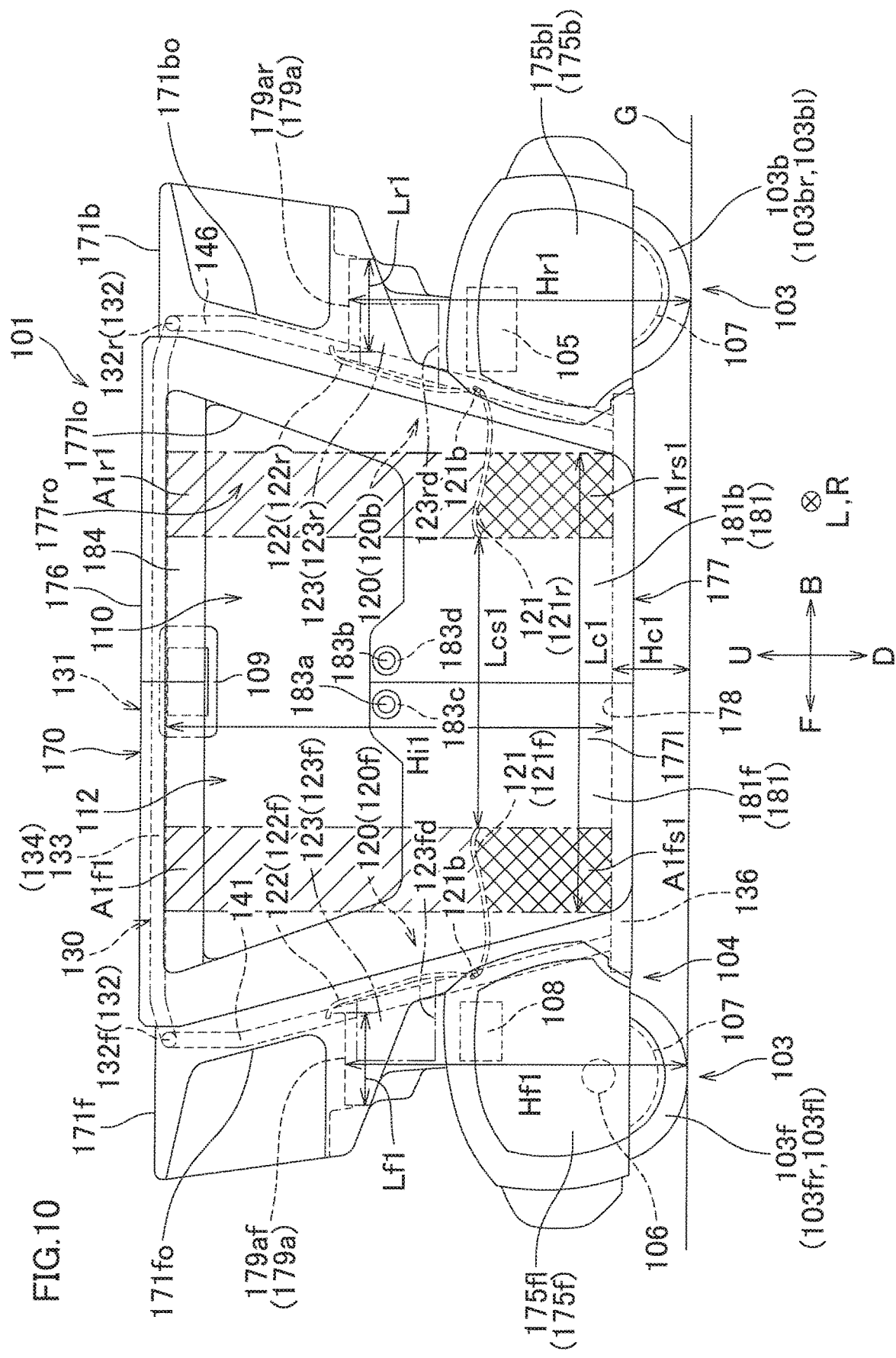
FIG. 10 is a side view of a facing seats-type automated driving vehicle of Specific Example 1.

A facing seats-type automated driving vehicle 101 of Specific Example 1 of the above-described embodiment of the present teaching will be described with reference to FIG. 10 to FIG. 13. It is noted that items identical with those in the embodiment of the present teaching having been described above are not explained again. Basically, the facing seats-type automated driving vehicle 101 of Specific Example 1 of the embodiment of the present teaching encompasses all features of the facing seats-type automated driving vehicle 1 of the embodiment of the present teaching described above. FIG. 10 shows a front seat 121*f* and a rear seat 121*r* that are in a seating state in which passengers Of and Or are seatable on the seats. Furthermore, FIG. 10 shows a front backrest 122*f* and a rear backrest 122*r* which are in a posture keeping state in which the passengers Of and Or are able to keep the posture. When the front backrest 122*f* is in the posture keeping state, the passenger is able to lean on the front backrest 122*f*. When the rear backrest 122*r* is in the posture keeping state, the passenger is able to lean on the rear backrest 122*r*.

Hereinafter, a front-rear direction is a vehicle front-rear direction unless otherwise specified. A forward direction in the vehicle front-rear direction is equivalent to the traveling direction of the facing seats-type automated driving vehicle 101 and a later-described facing seats-type automated driving vehicle 201. Hereinafter, a vehicle left-right direction is a left-right direction of the vehicle. The vehicle left-right direction is a left-right direction when the traveling direction of the facing seats-type automated driving vehicle 101, 201 is the forward direction. The left-right direction of the vehicle is identical with a vehicle width direction of the facing seats-type automated driving vehicle 101, 201. Hereinafter, a vehicle up-down direction is an up-down direction of the vehicle unless otherwise specified. An up-down direction of the vehicle is an up-down direction when the facing seats-type automated driving vehicle 101, 201 vertically stands up on a horizontal road surface. In each figure, arrows F, B, U, D, L, and R indicate forward, rearward, upward, downward, leftward, and rightward, respectively.

As shown in FIG. 10, the facing seats-type automated driving vehicle 101 includes four wheels 103, an automatic driving mechanism 104, facing seats 110, a floor cover (floor deck) 178, two tray portions (luggage decks) 179*a*, a vehicle body frame 130, and a vehicle body cover 170.

The four wheels 103 include two front wheels 103*f* and two rear wheels 103*b*. The two rear wheels 103*b* are provided rearward of the two front wheels 103*f*. The two front wheels 103*f* include a left front wheel 103*fl* and a right front wheel 103*fr*. The two rear wheels 103*b* include a left rear wheel 103*bl* and a right rear wheel 103*br*. The left front wheel 103*fl* and the left rear wheel 103*bl* are provided at a left portion of the vehicle, whereas the right front wheel 103*fr* and the right rear wheel 103*br* are provided at a right portion of the vehicle. The two front wheels 103*f* are provided so that the upper end of each of these wheels is below the lower end of the front seat 121*f* which is in the seating state. The two rear wheels 103*b* are provided so that the upper end of each of these wheels is below the lower end of the rear seat 121*r* which is in the seating state. The facing seats-type automated driving vehicle 101 runs as the four wheels 103 rotate. The traveling direction is forward in the vehicle front-rear direction. The traveling direction is a direction in which the facing seats-type automated driving vehicle 101 in normal use runs due to the rotation of the wheels 103. The traveling direction does not include a direction in which the facing seats-type automated driving vehicle 101 temporarily runs. By reverse rotation of the wheels 103, the traveling direction of the facing seats-type automated driving vehicle 101 can be changed to the opposite direction. In other words, the facing seats-type automated driving vehicle 101 is a bi-directional vehicle.

The automatic driving mechanism 104 includes a driving source 105, a steering mechanism 106, a brake mechanism 107, and an automatic driving controller 108. The automatic driving controller 108 is connected to the driving source 105, the steering mechanism 106, and the brake mechanism 107.

The driving source 105 applies driving force to at least one of the four wheels 103. The facing seats-type automated driving vehicle 101 runs as the four wheels 103 rotate. The driving source 105 includes a driving motor and a battery. The facing seats-type automated driving vehicle 101 is, for example, an electric car and the driving motor is an electric motor. The driving motor is connected to the battery. The battery supplies electric power for driving the facing seats-type automated driving vehicle 101 to the driving motor. The driving motor drives the two rear wheels 103b. The driving motor is able to rotate the two rear wheels 103b in a vehicle forward direction and a vehicle rearward direction. The driving source 105 is supported by the vehicle body frame 130. The driving source 105 is controlled based on a command output from the automatic driving controller 108.

The steering mechanism 106 steers at least one of the four wheels 103. As a result of the steering by the steering mechanism 106, the traveling direction of the facing seats-type automated driving vehicle 101 is changed in the vehicle left-right direction. The steering mechanism 106 steers the four wheels 103. The steering mechanism 106 is arranged to steer the four wheels 103 each at a predetermined steering angle relative to the vehicle front-rear direction. The four wheels 103 are swung in the vehicle left-right direction by the steering mechanism 106. The traveling direction of the facing seats-type automated driving vehicle 101 is determined by the orientations of the four wheels 103 which are swung in the vehicle left-right direction. The steering mechanism 106 is supported by the vehicle body frame 130. The steering mechanism 106 is controlled based on a command output from the automatic driving controller 108.

The brake mechanism 107 is constituted by four-disc brake devices. The four-disc brake devices are provided for the four wheels 103, respectively. The four-disc brake devices brake the four wheels 103, respectively. Each disc brake device includes a metal disc which rotates together with the wheel 103 and two pads which are provided to the right of and to the left of the disc in the vehicle left-right direction. The disc brake device brakes the wheel 103 by sandwiching the disc by the two pads from both sides. The brake mechanism 107 is supported by the vehicle body frame 130. The brake mechanism 107 is controlled based on a command output from the automatic driving controller 108.

The automatic driving controller 108 is supported by the vehicle body frame 130. The automatic driving controller 108 is arranged to be able to communicate with a control panel 109. The control panel 109 is provided in a cabin space 112. The cabin space 112 is a space in the vehicle internal portion in which a passenger is accommodated. The control panel 109 is a computer. The control panel 109 may be attachable and detachable to and from an inner cover 179 in the vehicle internal portion. The automatic driving controller 108 is arranged to receive a drive signal, a brake signal, and a steering signal from the control panel 109. The drive signal is a signal for driving the facing seats-type automated driving vehicle 101 by the driving source 105. The brake signal is a signal for braking the facing seats-type automated driving vehicle 101 by the brake mechanism 107. The steering signal is a signal for steering the facing seats-type automated driving vehicle 101 by the steering mechanism 106. The drive signal may be a signal generated based on an acceleration instruction input through the control panel 109. The brake signal may be a signal generated based on a deceleration instruction input through the control panel 109. The drive signal and the brake signal may be signals generated based on a target speed input through the control panel 109. The steering signal may be a signal generated based on a rotational angle instruction which is input through the control panel 109. The automatic driving controller 108 outputs instructions based on the drive signal, the brake signal, and the steering signal to the driving source 105, the steering mechanism 106, and the brake mechanism 107.

The automatic driving mechanism 104 is provided at least partially forward of the front end of the later-described front seat 121*f* in the seating state and at least partially rearward of the rear end of the later-described rear seat 121*r* in the seating state. The driving source 105 is provided at least partially forward of the rear end of the rear seat 121*r* in the seating state. The steering mechanism 106 is provided at least partially forward of the front end of the front seat 121*f* in the seating state. A part of the brake mechanism 107 is provided forward of the front end of the front seat 121*f* in the seating state, and another part of the brake mechanism 107 is provided forward of the rear end of the rear seat 121*r* in the seating state. The automatic driving controller 108 is provided forward of the front end of the front seat 121*f* in the seating state.

Figure 11:
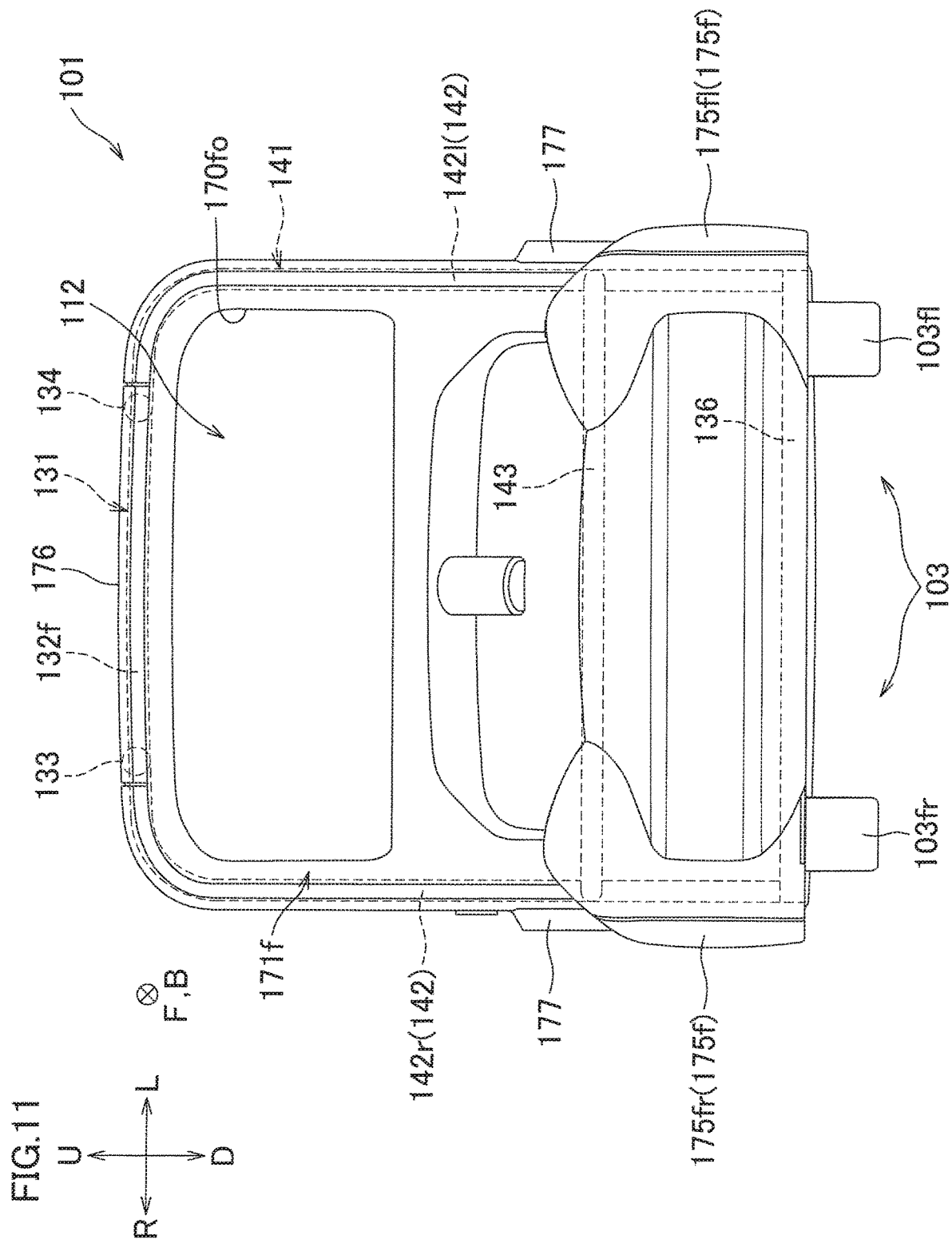
FIG. 11 is a front view of the facing seats-type automated driving vehicle of Specific Example 1.

As shown in FIG. 10 and FIG. 11, the vehicle body frame 130 includes a ceiling frame 131, a floor frame 136, a front H-shaped frame 141, and a rear H-shaped frame 146. The vehicle body frame 130 is, for example, made of metal. In the vehicle body frame 130, the shape of the front portion viewed rearward in the vehicle front-rear direction is substantially identical with the shape of the rear portion viewed forward in the vehicle front-rear direction.

The ceiling frame 131 includes a ceiling right frame 133 and a ceiling left frame 134 which are lined up in the vehicle left-right direction and two ceiling crosswise frames 132 which are lined up in the vehicle front-rear direction. The two ceiling crosswise frames 132 include a ceiling front crosswise frame 132*f* and a ceiling rear crosswise frame 132*r*. The ceiling front crosswise frame 132*f* is provided forward of the ceiling rear crosswise frame 132*r* in the vehicle front-rear direction. The ceiling front crosswise frame 132*f* connects front end portions of the ceiling right frame 133 and the ceiling left frame 134 with each other. The ceiling rear crosswise frame 132*r* connects rear end portion of the ceiling right frame 133 and the ceiling left frame 134 with each other. The front end portion and the rear end portion of the ceiling frame 131 are formed to be inclined downward. The front end portion of the ceiling frame 131 is connected to the front H-shaped frame 141. The rear end portion of the ceiling frame 131 is connected to the rear H-shaped frame 146.

The front H-shaped frame 141 includes two front pillars 142 lined up in the vehicle left-right direction and a front intermediate crosswise frame 143 having end portions in the vehicle left-right direction, which are connected to the two front pillars 142, respectively. The two front pillars 142 include a left front pillar 142l and a right front pillar 142r. The left front pillar 142l is provided leftward of the right front pillar 142r in the vehicle left-right direction. Although not illustrated, being similar to the front H-shaped frame 141, the rear H-shaped frame 146 includes two rear pillars lined up in the vehicle left-right direction and a rear intermediate crosswise frame having end portions in the vehicle left-right direction, which are connected to the two rear pillars.

The floor frame 136 is rectangular in shape, in which the sides in the vehicle left-right direction are longer than the sides in the vehicle front-rear direction. The floor frame 136 is provided directly below the ceiling frame 131. The floor frame 136 is connected to lower end portions of the two front pillars 142 of the front H-shaped frame 141. The floor frame 136 is connected to lower end portions of the two rear pillars of the rear H-shaped frame 146.

Figure 12:
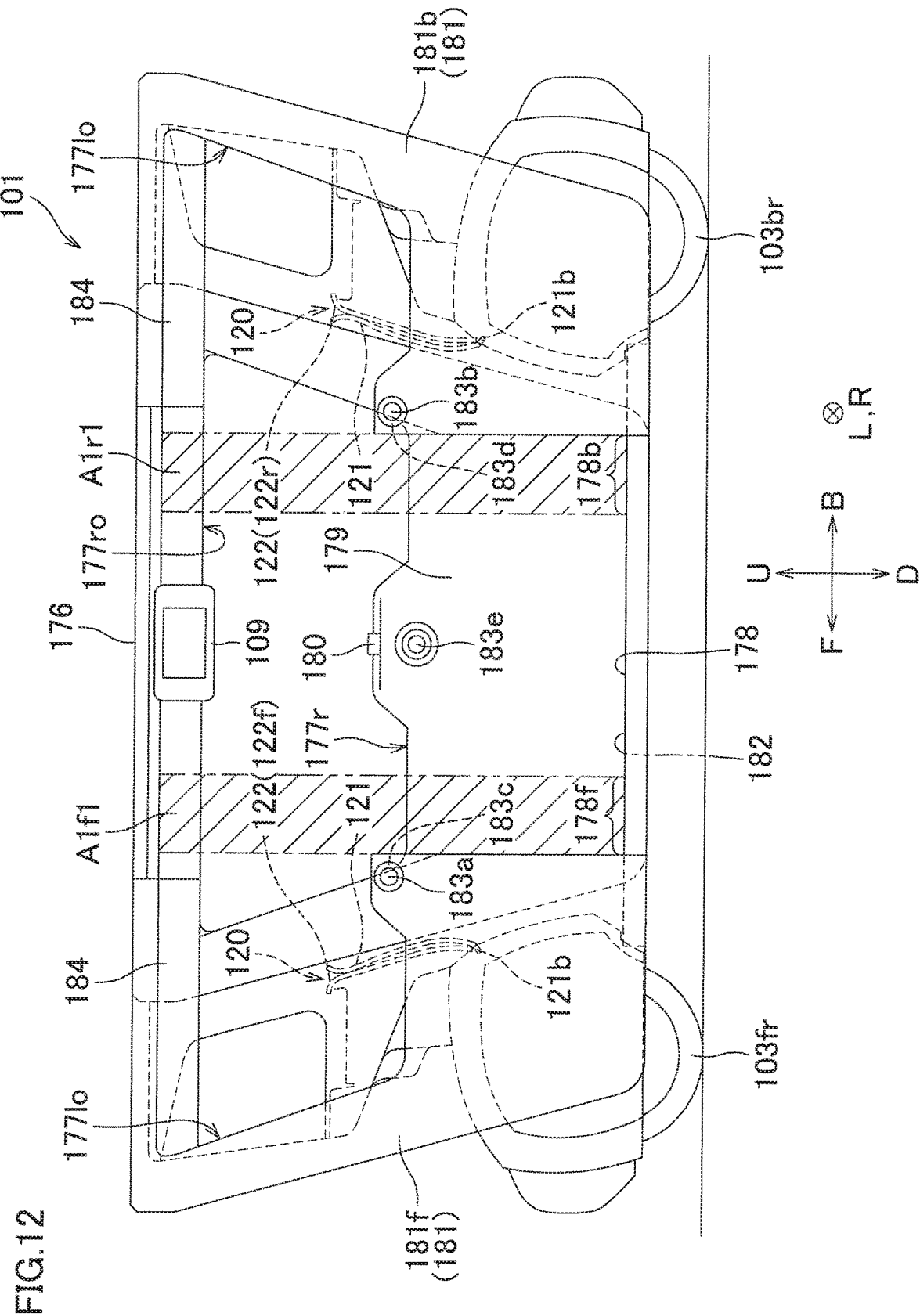
FIG. 12 is a side view of (a) a front seat variable structure and (b) a rear seat variable structure of the facing seats of Specific Example 1.
Figure 13:
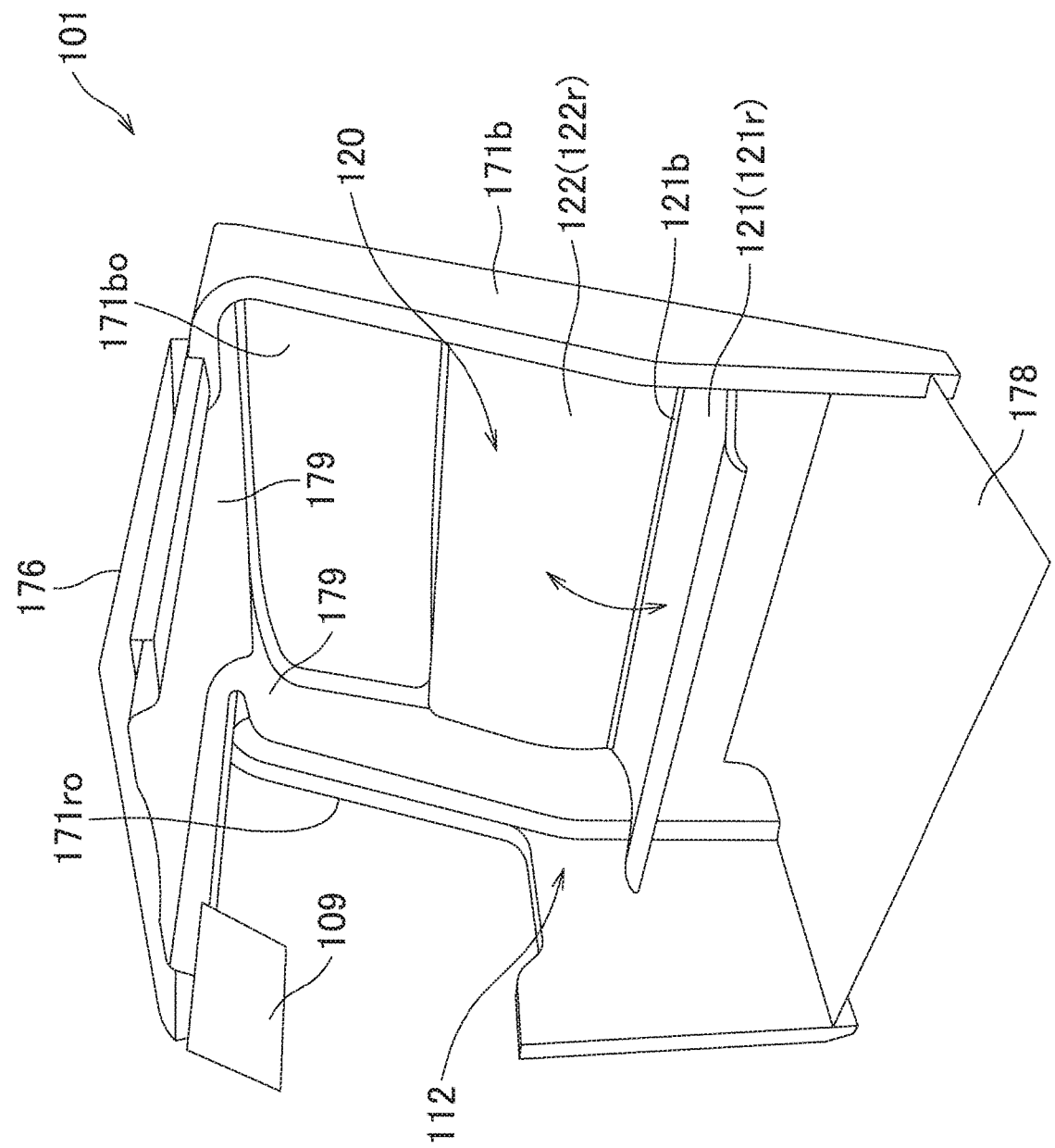
FIG. 13 is a perspective view of (b) the rear seat variable structure of the facing seats of Specific Example 1.

As shown in FIG. 10 to FIG. 12, the vehicle body cover 170 includes a front cover 171f, a rear cover 171b, two front wheel side covers 175f, two rear wheel side covers 175b, a roof cover 176, side covers 177, a floor cover 178, and an inner cover 179. The roof cover 176 is a roof portion of the present teaching. The floor cover 178 is a floor deck of the present teaching. The vehicle body cover 170 is, for example, made of synthetic resin. The vehicle body cover 170 is supported by the vehicle body frame 130. The vehicle body cover 170 covers the vehicle body frame 130. The vehicle body cover 170 covers an upper portion of the vehicle body frame 130 from the inside and outside of the vehicle. The vehicle body cover 170 covers a lower portion of the vehicle body frame 130 from the inside and outside of the vehicle. The front cover 171f covers the front H-shaped frame 141 from the front and rear in the vehicle front-rear direction. The rear cover 171b covers the rear H-shaped frame 146 from the front and rear in the vehicle front-rear direction. The front wheel side covers 175f cover the outer surfaces of the two front wheels 103f from the left and right in the vehicle left-right direction. The rear wheel side covers 175b cover the outer surfaces of the two rear wheels 103b from the left and right in the vehicle left-right direction. The roof cover 176 covers the ceiling frame 131 from above and below in the vehicle up-down direction. The floor cover 178 covers the upper surface of the floor frame 136 from above in the vehicle up-down direction. The side covers 177 include a right side cover 177r and a left side cover 177l.

The vehicle body cover 170 includes a doorway 182 which is provided at a left portion, a right portion, or both of these portions of the vehicle body cover 170 in the vehicle left-right direction. In FIG. 10, the vehicle body cover 170 has the doorway 182 provided at the left portion in the vehicle left-right direction.

As shown in FIG. 12, the front cover 171f is provided forward of the roof cover 176 and the side covers 177. The front cover 171f has a front cover window 171fo at an upper portion. The front cover window 171fo is provided above the front backrest 122f and the rear backrest 122r of the facing seats 110. The front cover window 171fo may be an open window which allows the cabin space 112 to always communicate with the external space. The front cover window 171fo may be a window which is openable and closable and allows the cabin space 112 to communicate with the external space when opened. The front cover window 171fo may be a fixed window which cannot be opened. When the front cover window 171fo is either a window which is openable and closable or a fixed window, a transparent glass, synthetic resin, a vinyl sheet, etc. is fitted to the front cover window 171fo.

The front cover 171f is partially provided above the two front wheels 103f. The front cover 171f is partially provided forward of the two front wheels 103f. The front cover 171f partially covers the front portion and the upper portion of each of the two front wheels 103f. The front cover 171f is connected to two front wheel side covers 175f.

The rear cover 171b is provided rearward of the roof cover 176 and the side covers 177. The rear cover 171b includes a rear cover window 171bo at an upper portion. The rear cover window 171bo is provided above the front backrest 122f and the rear backrest 122r of the facing seats 110. The rear cover window 171bo may be an open window which allows the cabin space 112 to always communicate with the external space. The rear cover window 171bo may be a window which is openable and closable and allows the cabin space 112 to communicate with the external space when opened. The rear cover window 171bo may be a fixed window which cannot be opened. When the rear cover window 171bo is either a window which is openable and closable or a fixed window, a transparent glass, synthetic resin, a vinyl sheet, etc. is fitted to the rear cover window 171bo.

The rear cover 171b is partially provided above the two rear wheels 103b. The rear cover 171b is partially provided rearward of the two rear wheels 103b. The rear cover 171b partially covers the rear portion and the upper portion of each of the two rear wheel 103b. The rear cover 171b is connected to two rear wheel side covers 175b.

As shown in FIG. 10 and FIG. 11, the two front wheel side covers 175f include a right front wheel side cover 175fr and a left front wheel side cover 175fl. The right front wheel side cover 175fr is provided to the right of the right front wheel 103fr. The left front wheel side cover 175fl is provided to the left of the left front wheel 103fl. The two front wheel side covers 175f partially cover the two front wheels 103f.

The two rear wheel side covers 175b include a right rear wheel side cover 176br and a left rear wheel side cover 176bl. The right rear wheel side cover 175br is provided to the right of the right rear wheel 103br. The left rear wheel side cover 175bl is provided to the left of the left rear wheel 103bl. The two rear wheel side covers 175b partially cover the two rear wheels 103b.

As shown in FIG. 10 and FIG. 12, the roof cover 176 is connected to the front cover 171f and is provided rearward of the front cover 171f. The roof cover 176 is connected to the rear cover 171b and is provided forward of the rear cover 171b. The roof cover 176 is connected to the side covers 177 and is provided above the side covers 177. The roof cover 176 is formed to be substantially flat.

The side covers 177 are connected to the front cover 171f and are provided rearward of the front cover 171f. The side covers 177 are connected to the rear cover 171b and are provided forward of the rear cover 171b. The side covers 177 are connected to the roof cover 176 and are provided below the roof cover 176. The side covers 177 include a right side cover 177r and a left side cover 177l.

As shown in FIG. 10 and FIG. 12, the right side cover 177r has a right window 177ro. The right window 177ro is provided at an upper portion of the right side cover 177r. The right window 177ro is provided above the front seat 121f and the rear seat 121r of the facing seats 110. The right window 177ro is an open window which allows the cabin space 112 to always communicate with the external space. The facing seats-type automated driving vehicle 101 has an emergency button 180 at a central portion in the front-rear direction of a lower frame of the right window 177ro of the right side cover 177r. The emergency button 180 is provided substantially on the boundary between the cabin space 112 and the external space of the vehicle. The emergency button 180 is operated by being pressed in the vehicle downward direction. The emergency button 180 may be pressed by a passenger inside the facing seats-type automated driving vehicle 101. Alternatively, the emergency button 180 may be pressed by a pedestrian, etc. who is in the external space of the facing seats-type automated driving vehicle 101 and inserts a hand through the right window 177ro. The facing seats-type automated driving vehicle 101 is stopped when the emergency button 180 is pressed.

The left side cover 177l includes a left window 177lo and a door 181. The facing seats-type automated driving vehicle 101 of Specific Example 1 is assumed to run in the left lane in the vehicle left-right direction of the road. The left window 177lo is provided at an upper portion of the left side cover 177l. The left window 177lo is provided above the front seat 121f and the rear seat 121r of the facing seats 110. The left window 177lo is an open window which allows the cabin space 112 to always communicate with the external space.

The door 181 is provided at a central portion in the vehicle left-right direction of the left side cover 177l. The door 181 includes a front door 181f and a rear door 181b. The front door 181f is provided at a front portion of the facing seats-type automated driving vehicle 101. The rear door 181b is provided at a rear portion of the facing seats-type automated driving vehicle 101. The front door 181f and the rear door 181b form a sliding door. As shown in FIG. 12, the front door 181f and the rear door 181b are arranged to be slid in the vehicle front-rear direction so as to open or close the doorway 182. The doorway 182 is a region indicated by two-dot chain lines in FIG. 12. The front door 181f and the rear door 181b are arranged so that, in a closed state, the rear end of the front door 181f is in contact with the front end of the rear door 181b (see FIG. 10). The front door 181f and the rear door 181b are arranged so that, in an open state (see FIG. 12), a passenger is allowed to get in or out from the cabin space 112 and luggage is allowed to be conveyed in and from the cabin space 112, through the doorway 182. When the closed state is switched to the open state, the front door 181f is slid forward. When the open state is switched to the closed state, the front door 181f is slid rearward. When the closed state is switched to the open state, the rear door 181b is slid rearward. When the open state is switched to the closed state, the rear door 181b is slid forward.

The facing seats-type automated driving vehicle 101 has four open buttons 183a, 183b, 183c, and 183d and one close button 183e. The open buttons 183a and 183b are provided on the outer surface of the vehicle. The open button 183a is provided on the outside surface of the front door 181f. The open buttons 183c and 183d are provided on a surface facing the cabin space 112. The open button 183c is provided on the inner surface of the front door 181f. The open button 183b is provided on the outside surface of the rear door 181b, which is outside the vehicle. The open button 183d is provided on the inner surface of the rear door 181b, which is in the vehicle internal portion. The close button 183e is provided on an inner cover 179 which is provided directly below the right window 170ro. When the open button 183a, 183b, 183c, or 183d is pressed, the front door 181f and the rear door 181b are switched to the open state. As the close button 183e is pressed, the front door 181f and the rear door 181b are switched to the closed state.

As shown in FIG. 10 and FIG. 12, the floor cover 178 is provided below the roof cover 176. The floor cover 178 constitutes a floor portion in the vehicle internal portion. A foot of a passenger, a wheelchair, and a piece of luggage are placed on the floor cover 178. The roof cover 176 is provided in such a way that the height Hi1 in the vehicle up-down direction between the lower surface of the roof cover 176 and the upper surface of the floor cover 178 is insufficient for an adult passenger to stand on the floor cover 178 in an upright state. The floor cover 178 is provided to allow a passenger seated on the facing seats 110 to place his/her feet on the same. The floor cover 178 has no level difference on its upper surface.

The inner cover 179 is provided below the roof cover 176. The inner cover 179 constitutes a wall portion in the vehicle internal portion. The inner cover 179 is provided above the floor cover 178 and is connected to the floor cover 178. The control panel 109 is provided on the inner cover 179 and directly above the right window 170ro.

The inner cover 179 includes two tray portions 179a. The two tray portions 179a include a front tray portion 179af and a rear tray portion 179ar. The front tray portion 179af is provided above the floor cover 178 and the front seat 121f. The front tray portion 179af is provided forward of the front backrest 122f and rearward of the front cover window 171fo. The rear tray portion 179ar is provided above the floor cover 178 and the rear seat 121r. The rear tray portion 179ar is provided rearward of the rear backrest 122r and forward of the rear cover window 171bo. The front tray portion 179af is a front luggage deck which constitutes a storage space in the vehicle internal portion above the upper surface. The rear tray portion 179ar is a rear luggage deck which constitutes a storage space in the vehicle internal portion above the upper surface. These storage spaces are spaces in the vehicle internal portion. A piece of luggage of a passenger, etc. can be placed on the two tray portions 179a.

The front tray portion 179af, the rear tray portion 179ar, and the floor cover 178 are arranged in such a way that the height Hf1 from the grounding surface G to the upper surface of the front tray portion 179af in the vehicle up-down direction and the height Hr1 from the grounding surface G to the upper surface of the rear tray portion 179ar in the vehicle up-down direction are higher than the height Hc1 from the grounding surface G to the upper surface of the floor cover 178 in the vehicle up-down direction. The front tray portion 179af and the rear tray portion 179ar are provided in such a way that the height Hf1 of the upper surface of the front tray portion 179af in the vehicle up-down direction is identical with the height Hr1 of the upper surface of the rear tray portion 179ar in the vehicle up-down direction. The length Lf1 of the front tray portion 179af in the vehicle front-rear direction is shorter than the length Lc1 of the floor cover 178 in the vehicle front-rear direction. The length Lr1 of the rear tray portion 179ar in the vehicle front-rear direction is shorter than the length Lc1 of the floor cover 178 in the vehicle front-rear direction. The total of the length Lf1 of the front tray portion 179af in the vehicle front-rear direction and the length Lr1 of the rear tray portion 179ar in the vehicle front-rear direction is shorter than the length Lc1 of the floor cover 178 in the vehicle front-rear direction. The automatic driving controller 108 of the automatic driving mechanism 104 is provided at a position above the floor cover 178 and below the lower end of the front tray portion 179af. The driving source 105 of the automatic driving mechanism 104 is provided above the floor cover 178 and below the lower end of the rear tray portion 179ar.

The facing seats 110 include a front seat assembly 120f and a rear seat assembly 120b. The front seat assembly 120f includes a front seat 121f and a front backrest 122f. The front seat 121f allows a passenger to be seated thereon. The front backrest 122f is provided to allow a passenger seated on the front seat 121f to keep the posture. A passenger seated on the front seat 121f leans his/her back on the front backrest 122f. The front seat assembly 120f is positioned so that the passenger faces the vehicle rearward direction when the passenger is seated. The rear seat assembly 120b includes a rear seat 121r and a rear backrest 122r. The rear seat 121r allows a passenger to be seated thereon. The rear backrest 122r allows the passenger to keep the posture. The rear seat assembly 120b is positioned so that the passenger faces the vehicle forward direction when the passenger is seated. The rear seat assembly 120b is positioned so that at least part of the front backrest 122f and at least part of the rear backrest 122r face each other.

The facing seats 110 are arranged so that the maximum number of passengers seatable thereon is four. The front seat assembly 120f is arranged so that the maximum number of passengers seatable thereon is two. The rear seat assembly 120b is arranged so that the maximum number of passengers seatable thereon is two.

As shown in FIG. 10, the facing seats 110 are arranged so that the length Lcs1 in the vehicle front-rear direction between the rear end of the front seat 121f in the seating state and the front end of the rear seat 121r in the seating state is shorter than the length Lf1+Lr1 which is the total of the lengths Lf1 and Lr1 of the two tray portions 179a in the vehicle front-rear direction.

Figure 19:
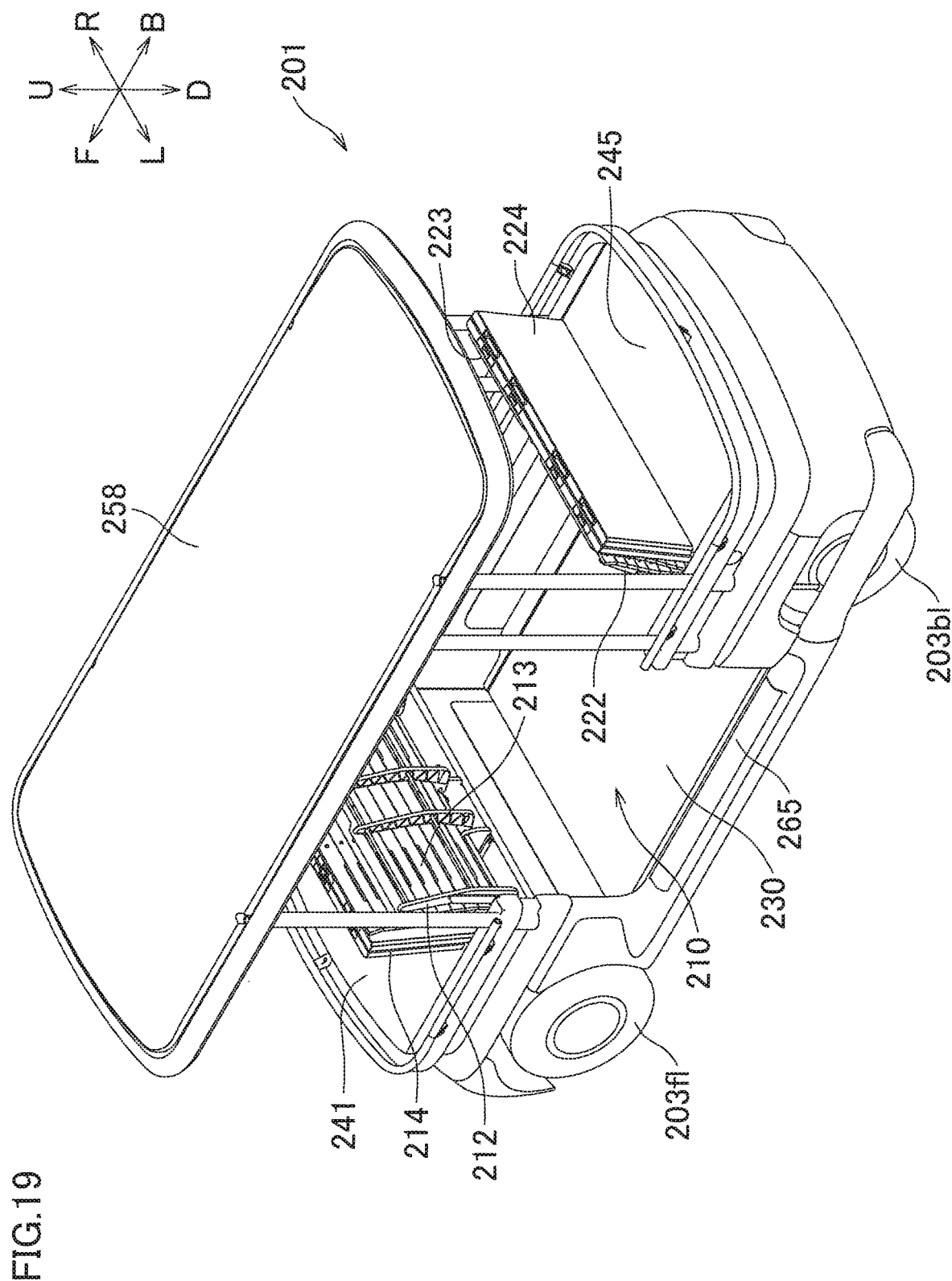
FIG. 19 is a rear view of (a) the front seat variable structure and (b) the rear seat variable structure of the facing seats of Specific Example 2.

The front seat 121f is swingable between a seating state and a storage state (non-seating state) relative to the front backrest 122f. The front seat 121f in the seating state is shown in FIG. 19. A passenger is allowed to be seated on the front seat 121f in this state. In the seating state, the front seat 121f is provided along the vehicle front-rear direction. The storage state of the front seat 121f is shown in FIG. 12. In the storage state, the front seat 121f is provided along the vehicle up-down direction. When the front seat 121f is in the storage state, the seat is stored so that a passenger cannot be seated on the seat. In the storage state, the front seat 121f faces the front backrest 122f in the posture keeping state. The front seat 121f is swingable in the vehicle front-rear direction and in the vehicle up-down direction about a rotational shaft 121b which is provided below the lower end of the front backrest 122f. The rotational shaft 121b which is the swing center of the front seat 121f is fixed to the vehicle body frame 130. The front seat 121f is manually swung. As indicated by an arrow in FIG. 13, the front seat 121f is swung in the vehicle forward direction and the vehicle upward direction from the seating state to the storage state. For example, the rotational shaft 121b which is the swing center of the front seat 121f includes an elastic member, and when the front seat 121f in the seating state is manually lifted up by a predetermined angle, the front seat 121f is switched to the storage state thanks to the elastic force of the elastic member. In the seating state and the storage state, the front seat 121f may be locked not to be swingable.

The rear seat 121r is swingable between a seating state and a storage state (non-seating state) relative to the rear backrest 122r. The rear seat 121r in the seating state is shown in FIG. 19. A passenger is allowed to be seated on the rear seat 121r in this state. In the seating state, the rear seat 121r is provided along the vehicle front-rear direction. The storage state of the rear seat 121r is shown in FIG. 12. In the storage state, the rear seat 121r is provided along the vehicle up-down direction. When the rear seat 121r is in the storage state, the seat is stored so that a passenger cannot be seated on the seat. In the storage state, the rear seat 121r faces the rear backrest 122r in the posture keeping state. The rear seat 121r is swingable in the vehicle front-rear direction and in the vehicle up-down direction about a rotational shaft 121b which is provided below the lower end of the rear backrest 122r. The rotational shaft 121b which is the swing center of the rear seat 121r is fixed to the vehicle body frame 130. The rear seat 121r is manually swung. The rear seat 121r is swung in the vehicle rearward direction and the vehicle upward direction from the seating state to the storage state. For example, the rotational shaft 121b which is the swing center of the rear seat 121r includes an elastic member, and when the rear seat 121r in the seating state is manually lifted up by a predetermined angle, the rear seat 121r is switched to the storage state thanks to the elastic force of the elastic member.

In the facing seats 110, each of the front seat 121f and the rear seat 121r has a variable structure. In other words, the facing seats 110 has (a) the front seat variable structure and (b) the rear seat variable structure.

As shown in FIG. 10, in (a) the front seat variable structure, the rear end of the front seat 121f in the seating state is provided rearward of the front end of the floor cover 178. In the front seat variable structure, the first front space A1f1 is divided in the vehicle up-down direction by the bottom surface of the front seat 121f in the seating state. The first front space A1f1 is a space directly above a front seat facing surface 178f which is part of the upper surface of the floor cover 178. The front seat facing surface 178f of the floor cover 178 is a part of the upper surface of the floor cover 178, which faces the bottom surface of the front seat 121f in the seating state. The first front space A1f1 is a space between the upper surface of the floor cover 178 and the lower surface of the roof cover 176. In the first front space A1f1, no structure is provided in a space A1fs1 between the bottom surface of the front seat 121f in the seating state and the upper surface of the floor cover 178. As described above, the front seat 121f is attached to be swingable in the vehicle front-rear direction and in the vehicle up-down direction about the rotational shaft 121b. On this account, the area of the bottom surface of the front seat 121f which divides the first front space A1f1 when viewed in the vehicle up-down direction is changeable. When the front seat 121f is in the seating state, as shown in FIG. 10, the area of the bottom surface of the front seat 121f dividing the first front space A1f1 is at the maximum when viewed in the vehicle up-down direction. Meanwhile, when the front seat 121f is in the storage state, as shown in FIG. 12, the area of the bottom surface of the front seat 121f dividing the first front space A1f1 is 0 when viewed in the vehicle up-down direction.

As shown in FIG. 10, in (b) the rear seat variable structure, the front end of the rear seat 121r in the seating state is provided forward of the rear end of the floor cover 178. In the rear seat variable structure, the first rear space A1r1 is divided in the vehicle up-down direction by the bottom surface of the rear seat 121r in the seating state. The first rear space A1r1 is a space directly above a rear seat facing surface 178b which is part of the upper surface of the floor cover 178. The rear seat facing surface 178b of the floor cover 178 is a part of the upper surface of the floor cover 178, which faces the rear seat 121r in the seating state. The first rear space A1r1 is a space between the upper surface of the floor cover 178 and the lower surface of the roof cover 176. In the first rear space A1r1, no structure is provided in a space A1rs1 between the bottom surface of the rear seat 121r in the seating state and the upper surface of the floor cover 178. As described above, the rear seat 121r is attached to be swingable in the vehicle front-rear direction and in the vehicle up-down direction about the rotational shaft 121b. On this account, the area of the bottom surface of the rear seat 121r which divides the first rear space A1r1 when viewed in the vehicle up-down direction is changeable. When the rear seat 121r is in the seating state, as shown in FIG. 10, the area of the bottom surface of the rear seat 121r dividing the first rear space A1r1 is at the maximum when viewed in the vehicle up-down direction. Meanwhile, when the rear seat 121r is in the storage state, as shown in FIG. 12, the area of the bottom surface of the rear seat 121r dividing the first rear space A1r1 is 0 when viewed in the vehicle up-down direction.

In addition to the effects of the facing seats-type automated driving vehicle 1 of the embodiment of the present teaching, the facing seats-type automated driving vehicle 101 of Specific Example 1 of the embodiment of the present teaching exerts the following effects.

The length Lcs1 in the vehicle front-rear direction between the rear end of the front seat 121f in a state in which a passenger is seatable on the seat and the front end of the rear seat 121r in a state of allowing a passenger to be seated on the seat is shorter than the length Lf1+Lr1 which is the total of the length Lf1 of the front tray portion 179af in the vehicle front-rear direction and the length Lr1 of the rear tray portion 179ar in the vehicle front-rear direction. In other words, the floor cover 178 is short in the vehicle front-rear direction. For this reason, plural passengers can ride on the vehicle 101 even if the vehicle 101 is small in size.

The facing seats 110 are constituted by combining (a) the front seat variable structure with (b) the rear seat variable structure. It is therefore possible to cause the vehicle 101 to be able to conveniently accommodate both passengers and luggage and to be small in size at the same time, as described above.

The upper surface of the front tray portion 179af is provided above the upper end of the front seat 121f which is in the state of allowing a passenger to be seated. It is therefore possible to enlarge the space directly below the front tray portion 179af. The automatic driving mechanism 104 can be accommodated in this enlarged space directly below the front tray portion 179af. On this account, as compared to a case where the upper surface of the front tray portion 179af is provided at the same height as or below the upper end of the front seat 121f which is in the state of allowing a passenger to be seated and the automatic driving mechanism 104 is accommodated in a space which is identical in volume with the automatic driving mechanism 104 and is provided directly below the front tray portion 179af, the front tray portion 179af can be shortened in the vehicle front-rear direction.

Furthermore, the upper surface of the rear tray portion 179ar is provided above the upper end of the rear seat 121r which is in the state of allowing a passenger to be seated. It is therefore possible to enlarge the space directly below the rear tray portion 179ar. The automatic driving mechanism 104 can be accommodated in this enlarged space directly below the rear tray portion 179ar. On this account, as compared to a case where the upper surface of the rear tray portion 179ar is provided at the same height as or below the upper end of the rear seat 121r which is in the state of allowing a passenger to be seated and the automatic driving mechanism 104 is accommodated in a space which is identical in volume with the automatic driving mechanism 104 and is provided directly below the rear tray portion 179ar, the rear tray portion 179ar can be shortened in the vehicle front-rear direction.

It is therefore possible to elongate the floor cover 178 in the vehicle front-rear direction while reducing the size of the vehicle 101.

The upper ends of the two front wheels 103f are provided below the lower end of the front seat 121f which is in the state of allowing a passenger to be seated. In other words, the two front wheels 103f are provided at low positions relative to the vehicle. It is therefore possible to enlarge the space directly below the front tray portion 179af even when the two front wheels 103f are provided directly above the front tray portion 179af. The automatic driving mechanism 104 can be accommodated in this enlarged space directly below the front tray portion 179af. On this account, as compared to a case where the upper ends of the two front wheels 103f are provided at the same height as or above the lower end of the front seat 121f and the automatic driving mechanism 104 is accommodated in a space which is identical in volume with the automatic driving mechanism 104 and is provided directly below the front tray portion 179af, the front tray portion 179af can be shortened in the vehicle front-rear direction.

The upper ends of the two rear wheels 103b may be provided above the lower end of the rear seat 121r which is in the state of allowing a passenger to be seated. In such a case, the two rear wheels 103b are provided at low positions relative to the vehicle. It is therefore possible to enlarge the space directly below the rear tray portion 179ar even when the two rear wheels 103b are provided directly above the rear tray portion 179ar. The automatic driving mechanism 104 can be accommodated in this enlarged space directly below the rear tray portion 179ar. On this account, as compared to a case where the upper ends of the two rear wheels 103b are provided at the same height as or above the lower end of the rear seat 121r and the automatic driving mechanism 104 is accommodated in a space which is identical in volume with the automatic driving mechanism 104 and is provided directly below the rear tray portion 179ar, the rear tray portion 179ar can be shortened in the vehicle front-rear direction. It is therefore possible to elongate the floor cover 178 in the vehicle front-rear direction while reducing the size of the vehicle 101.

The length Lf1+Lr1 which is the total of the length Lf1 of the front tray portion 179af in the vehicle front-rear direction and the length Lr1 of the rear tray portion 179ar in the vehicle front-rear direction is shorter than the length Lc1 of the floor cover 178 in the vehicle front-rear direction. On this account, provided that the length of the entire vehicle in the vehicle front-rear direction remains the same, a space above the upper surface of the floor cover 178 is large as compared to a case where the length Lf1+Lr1 which is the total of the length Lf1 of the front tray portion 179af in the vehicle front-rear direction and the length Lr1 of the rear tray portion 179ar in the vehicle front-rear direction is shorter than the length Lc1 of the floor cover 178 in the vehicle front-rear direction. It is therefore possible to downsize the vehicle 101 even when plural passengers are able to ride on the vehicle.

The facing seats-type automated driving vehicle 101 further includes the four wheels 103 and the automatic driving mechanism 104. The automatic driving mechanism 104 further includes the driving source 105, the steering mechanism 106, and the automatic driving controller 108. The driving source 105 applies driving force to at least one of the four wheels 103. The steering mechanism 106 steers at least one of the four wheels 103. The automatic driving controller 108 automatically controls the driving source 105 and the steering mechanism 106. The automatic driving mechanism 104 is at least partially provided in a space directly below the lower ends of the front tray portion 179*af* and the rear tray portion 179*ar*. It is therefore possible to acquire a wide space directly above the floor cover 178 while securing the height of the vehicle, as compared to a case where the entirety of the automatic driving mechanism 104 is provided directly below the floor cover 178.

The automatic driving mechanism 104 is provided at least partially forward of the front end of the front seat 121*f* in the later-described state of allowing a passenger to be seated and at least partially rearward of the rear end of the rear seat 121*r* in the state of allowing a passenger to be seated. It is therefore possible to obtain a large space in the vehicle front-rear direction of the floor cover 178, as compared to a case where the automatic driving mechanism 104 is provided at least partially in a space rearward of the front end of the front seat 121*f* and forward of the rear end of the rear seat 121*r*. Furthermore, it is possible to obtain a large space in the vehicle front-rear direction of the floor cover 178, as compared to a case where the automatic driving mechanism 104 is provided at least partially in a space forward of the rear end of the rear seat 121*r* and rearward of the front end of the front seat 121*f*.

The facing seats 110 may be arranged so that the maximum number of passengers seatable thereon is four. This makes it possible to reduce the internal capacity of the facing seats-type automated driving vehicle 101. The vehicle can therefore be downsized.

The vehicle further includes the roof cover 176 which is provided directly above the floor cover 178.

The roof cover 176 is provided in such a way that the height Hi1 in the vehicle up-down direction between the lower surface of the roof cover 176 and the upper surface of the floor cover 178 is insufficient for an adult passenger to stand on the floor cover 178 in an upright state. It is therefore possible to reduce the length of the facing seats-type automated driving vehicle 101 in the vehicle up-down direction. The vehicle can therefore be downsized.

Specific Example 2 of Embodiment

A facing seats-type automated driving vehicle 201 of Specific Example 2 of the above-described embodiment of the present teaching will be described with reference to FIG. 14 to FIG. 22. It is noted that items identical with those in the embodiment of the present teaching having been described above are not explained again. Basically, the facing seats-type automated driving vehicle 201 of Specific Example 2 of the embodiment of the present teaching encompasses all features of the facing seats-type automated driving vehicle 1 of the embodiment of the present teaching described above. FIG. 15 shows a front seat 212 and a rear seat 222 that are in a seating state in which passengers Of and Or are seatable on the seats. Furthermore, FIG. 15 shows a front backrest 213 and a rear backrest 223 which are in a posture keeping state in which the passengers Of and Or are able to keep the posture.

Figure 14:
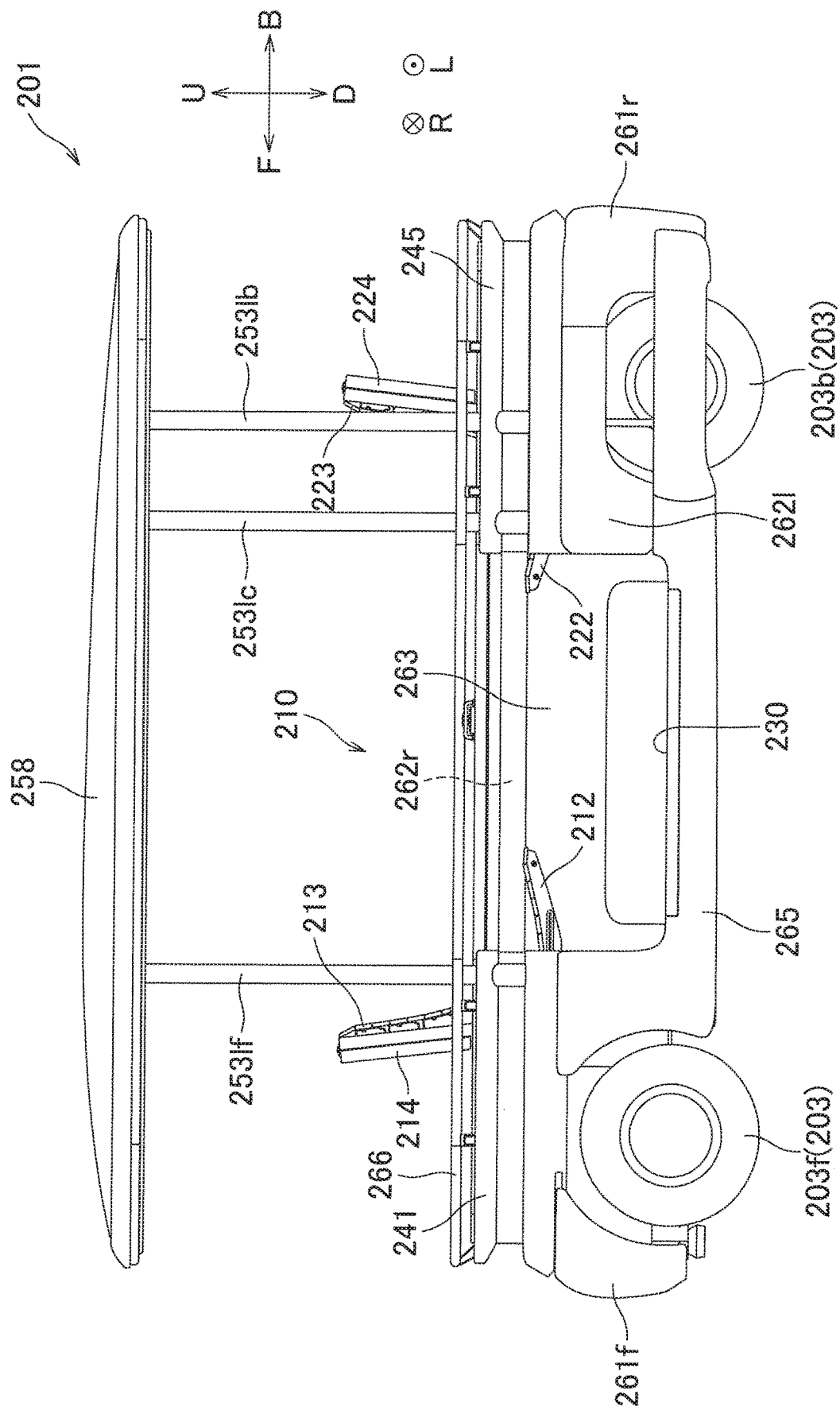
FIG. 14 is a side view of a facing seats-type automated driving vehicle of Specific Example 2.
Figure 15:
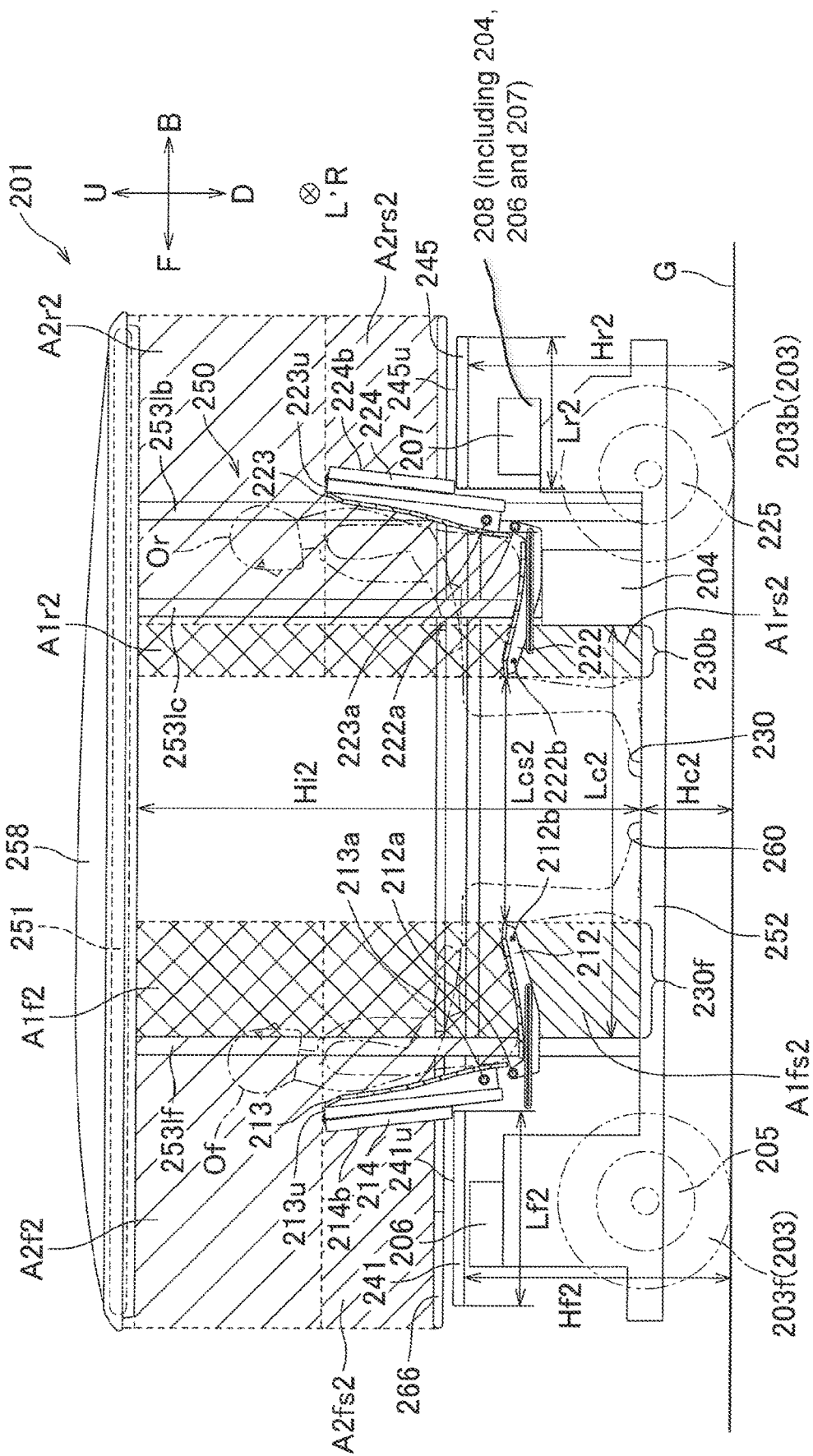
FIG. 15 is a side view showing a deck and facing seats of the facing seats-type automated driving vehicle of Specific Example 2.

As shown in FIG. 14 and FIG. 15, the facing seats-type automated driving vehicle 201 includes four wheels 203, an automatic driving mechanism 208, a roof portion 258, facing seats 210, a floor deck 230, a front luggage deck 241, a rear luggage deck 242, a vehicle body frame 250, and a vehicle body cover 260.

The four wheels 203 include two front wheels 203*f* and two rear wheels 203*b*. The two rear wheels 203*b* are provided rearward of the two front wheels 203*f*. The two front wheels 203*f* include a left front wheel 203*fl* and a right front wheel 203*fr*. The two rear wheels 203*b* include a left rear wheel 203*bl* and a right rear wheel 203*br*. The left front wheel 203*fl* and the left rear wheel 203*bl* are provided at a left portion of the vehicle, whereas the right front wheel 203*fr* and the right rear wheel 203*br* are provided at a right portion of the vehicle. The two front wheels 203*fl* and 203*fr* are provided so that the upper end of each of these wheels is below the lower end of the front seat 212 which is in the seating state. The two rear wheels 203*b* are provided so that the upper end of each of these wheels is below the lower end of the rear seat 222 which is in the seating state. The facing seats-type automated driving vehicle 201 runs as the four wheels 203 rotate. The traveling direction is forward in the vehicle front-rear direction. The traveling direction is a direction in which the facing seats-type automated driving vehicle 201 in normal use runs due to the rotation of the wheels 203. The traveling direction does not include a direction in which the facing seats-type automated driving vehicle 201 temporarily runs. The traveling direction of the facing seats-type automated driving vehicle 201 cannot be changed to rearward in the vehicle front-rear direction by reverse rotation of the wheels 203.

The automatic driving mechanism 208 includes a driving source 204, a brake mechanism 205, a steering mechanism 206, and an automatic driving controller 207. The automatic driving controller 207 is connected to the driving source 204, the steering mechanism 206, and the brake mechanism 205.

The driving source 204 applies driving force to at least one of the four wheels 203. The driving source 204 include a driving motor and a battery. The facing seats-type automated driving vehicle 201 is an electric car and the driving motor is an electric motor. The driving motor is connected to the battery. The battery supplies electric power for driving the facing seats-type automated driving vehicle 201 to the driving motor. The driving motor drives the two rear wheels 203*b*. The driving motor is able to rotate the two rear wheels 203*b* in a vehicle forward direction and a vehicle rearward direction. The driving source 204 is supported by the vehicle body frame 250. The driving source 204 is controlled based on a command output from the automatic driving controller 207.

The brake mechanism 205 is constituted by four disc brake devices. The four disc brake devices are provided for the four wheels 203, respectively. The four disc brake devices brake the four wheels 203, respectively. Each disc brake device includes a metal disc which rotates together with the wheel 203 and two pads which are provided to the right of and to the left of the disc in the vehicle left-right direction. The disc brake device brakes the wheel 203 by sandwiching the disc by the two pads from both sides. The brake mechanism 205 is supported by the vehicle body frame 250. The brake mechanism 205 is controlled based on a command output from the automatic driving controller 207.

The steering mechanism 206 steers at least one of the four wheels 203. As a result of the steering by the steering mechanism 206, the traveling direction of the facing seats-type automated driving vehicle 201 is changed in the vehicle left-right direction. The steering mechanism 206 steers the two front wheels 203*fl* and 203*fr*. The steering mechanism 206 is arranged to steer the left front wheel 203*fl* and the right front wheel 203*fr* each at a predetermined steering angle relative to the vehicle front-rear direction. The left front wheel 203*fl* and the right front wheel 203*fr* are swung in the vehicle left-right direction by the steering mechanism 206. The traveling direction of the facing seats-type automated driving vehicle 201 is determined by the orientations of the left front wheel 203*fl* and the right front wheel 203*fr* which are swung in the vehicle left-right direction. The steering mechanism 206 is supported by the vehicle body frame 250. The steering mechanism 206 is controlled based on a command output from the automatic driving controller 207.

The automatic driving controller 207 is supported by the vehicle body frame 250. The automatic driving controller 207 is arranged to be able to communicate with an unillustrated control panel. The control panel is provided inside the vehicle. The control panel is a computer. The control panel may be provided inside the vehicle in an attachable and detachable manner. The automatic driving controller 207 is arranged to receive a drive signal, a brake signal, and a steering signal from the control panel. The drive signal is a signal for driving the facing seats-type automated driving vehicle 201 by the driving source 204. The brake signal is a signal for braking the facing seats-type automated driving vehicle 201 by the brake mechanism 205. The steering signal is a signal for steering the facing seats-type automated driving vehicle 201 by the steering mechanism 206. The drive signal may be a signal generated based on an acceleration instruction input through the control panel. The brake signal may be a signal generated based on a deceleration instruction input through the control panel. The drive signal and the brake signal may be signals generated based on a target speed input through the control panel. The steering signal may be a signal generated based on a rotational angle instruction which is input through the control panel. The automatic driving controller 207 outputs instructions based on the drive signal, the brake signal, and the steering signal to the driving source 204, the brake mechanism 205, and the steering mechanism 206.

The automatic driving mechanism 208 is provided at least partially forward of the front end of the later-described front seat 212 in the seating state and at least partially rearward of the rear end of the later-described rear seat 222 in the seating state. The steering mechanism 206 is provided at least partially forward of the front end of the front seat 212. A part of the brake mechanism 205 is provided forward of the front end of the front seat 212 in the seating state, and another part of the brake mechanism 205 is provided rearward of the rear end of the rear seat 222 in the seating state. The automatic driving controller 207 is provided rearward of the rear end of the rear seat 222. The driving source 204 shown in FIG. 15 includes a battery, and the battery is provided rearward of the front end of the front seat 212 and forward of the rear end of the rear seat 222. The driving source 204 may be provided at least partially rearward of the rear end of the rear seat 222.

Figure 17:
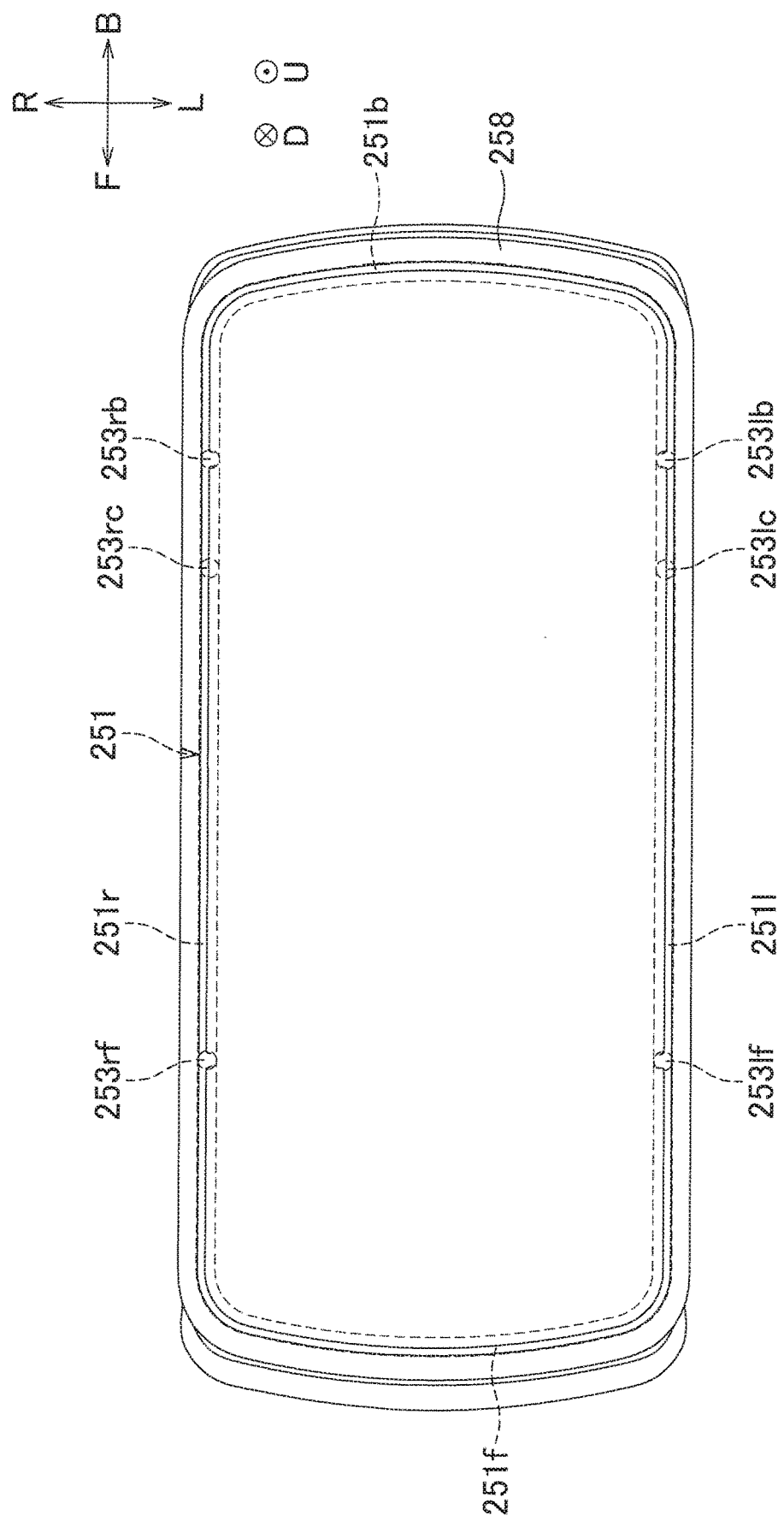
FIG. 17 is a top view of the facing seats-type automated driving vehicle of Specific Example 2.

As shown in FIG. 15 and FIG. 17, the vehicle body frame 250 is provided at least partially between the front ends of the two front wheels 203*fl* and 203*fr* and the rear ends of the two rear wheels 203*b*. The vehicle body frame 250 includes a ceiling frame 251, a floor frame 252, and pillar frames 253. The vehicle body frame 250 is, for example, made of metal. FIG. 15 schematically illustrates the vehicle body frame 250.

The ceiling frame 251 includes two ceiling transverse frames 251*f* and 251*b*, a ceiling right frame 251*r*, and a ceiling left frame 251l. The two ceiling transverse frames 251*f* and 251*b* include a ceiling front frame 251*f* and a ceiling rear frame 251*b*. The ceiling front frame 251*f* and the ceiling rear frame 251*b* are provided to be lined up in the vehicle front-rear direction. The ceiling front frame 251*f* is provided forward of the ceiling rear frame 251*b*. Each of the ceiling front frame 251*f* and the ceiling rear frame 251*b* is provided along the vehicle left-right direction. The ceiling front frame 251*f* and the ceiling rear frame 251*b* are provided to be parallel to each other. The ceiling right frame 251*r* connects right portions of the two ceiling transverse frames 251*f* and 251*b* in the vehicle left-right direction. The ceiling left frame 251l connects left portions of the two ceiling transverse frames 251*f* and 251*b* in the vehicle left-right direction. The ceiling right frame 251*r* and the ceiling left frame 251l are provided to be parallel to each other. The two ceiling transverse frames 251*f* and 251*b*, the ceiling right frame 251*r*, and the ceiling left frame 251l may be integrally formed. The ceiling right frame 251*r* is connected to later-described three right pillar frames 253*rf*, 253*rc*, and 253*rb*. The ceiling left frame 251l is connected to later-described three left pillar frames 2531*f*, 2531*c*, and 2531*b*. The ceiling frame 251 is provided directly below the roof portion 258 to support the roof portion 258. In other words, the roof portion 258 is provided directly above the floor deck 230 in the vehicle up-down direction. When viewed in the vehicle up-down direction, the roof portion 258 is more or less rectangular in shape so that the sides in the vehicle left-right direction are shorter than the sides in the vehicle front-rear direction, and has a front end portion and a rear end portion which are curved in shape. When viewed in the vehicle up-down direction, the roof portion 258 is arranged such that each side in the vehicle left-right direction is longer than the ceiling frame 251 and each side in the vehicle front-rear direction is longer than the ceiling frame 251. The roof portion 258 is provided in such a way that the height Hi2 in the vehicle up-down direction between the lower surface of the roof portion 258 and the upper surface of the floor deck 230 is insufficient for adult passengers Of and Or to stand on the floor deck 230 in an upright state.

The pillar frames 253 include the three right pillar frames 253*rf*, 253*rc*, and 253*rb* and the three left pillar frames 2531*f*, 2531*c*, and 2531*b*. The three right pillar frames 253*rf*, 253*rc*, and 253*rb* are provided at a right end portion of the vehicle. The three left pillar frames 2531*f*, 2531*c*, and 2531*b* are provided at a left end portion of the vehicle. The three right pillar frames 253*rf*, 253*rc*, and 253*rb* are lined up in the vehicle left-right direction. The three right pillar frames 253*rf*, 253*rc*, and 253*rb* are lined up in the vehicle up-down direction. The right pillar frame 253*rf* is provided forward of the right pillar frame 253*rc*. The right pillar frame 253*rc* is provided forward of the right pillar frame 253*rb*. The three left pillar frames 2531*f*, 2531*c*, and 2531*b* are lined up in the vehicle left-right direction. The three left pillar frames 2531*f*, 2531*c*, and 2531*b* are lined up in the vehicle up-down direction. The left pillar frame 2531*f* is provided forward of the left pillar frame 2531*c*. The left pillar frame 2531*c* is provided forward of the left pillar frame 2531*b*. The three right pillar frames 253*rf*, 253*rc*, and 253*rb* and the left pillar frames 2531*f*, 2531*c*, and 2531*b* are provided in parallel. The upper end portions of the three right pillar frames 253*rf*, 253*rc*, and 253*rb* are connected to the ceiling right frame 251*r*. The upper ends of the three left pillar frames 2531*f*, 2531*c*, and 2531*b* are connected to the ceiling left frame 251l. The lower end portions of the three right pillar frames 253*rf*, 253*rc*, and 253*rb* and the three left pillar frames 2531*f*, 2531*c*, and 2531*b* are connected to the floor frame 252.

The floor frame 252 is rectangular in shape, in which the sides in the vehicle left-right direction are longer than the sides in the vehicle front-rear direction. The floor frame 252 is provided directly below the ceiling frame 251. The lower end portions of the three right pillar frames 253rf, 253rc, and 253rb and the three left pillar frames 253lf, 253lc, and 253lb are connected to the floor frame 252. The floor frame 252 is provided directly below the floor deck 230 to support the floor deck 230.

Figure 16:
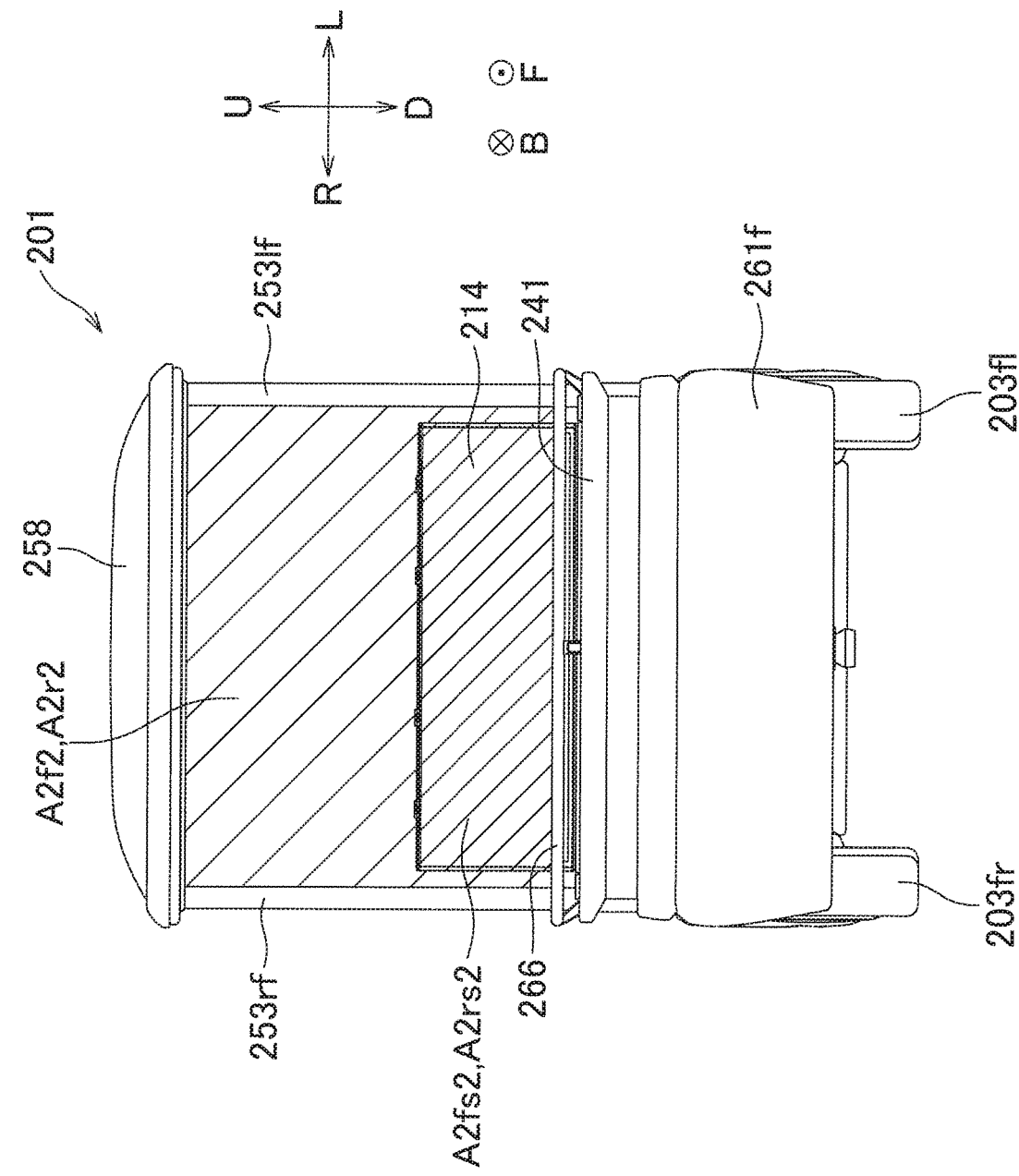
FIG. 16 is a front view of the facing seats-type automated driving vehicle of Specific Example 2.

As shown in FIG. 14, FIG. 16, and FIG. 17, the vehicle body cover 260 includes a front cover 261f, a rear cover 261b, a side cover 262, an inner cover 263, the floor deck 230, the front luggage deck 241, and a rear luggage deck 245. The vehicle body cover 260 is, for example, made of synthetic resin. The vehicle body cover 260 may be partially made of wood. The vehicle body cover 260 is supported by the vehicle body frame 250. The vehicle body cover 260 partially covers the vehicle body frame 250.

The front cover 261f covers a front end portion of the floor frame 252 from the front. The rear cover 261b covers a rear end portion of the floor frame 252 from the rear. The floor deck 230 covers an upper portion of the floor frame 252 from the vehicle internal portion. The inner cover 263 covers the three right pillar frames 253rf, 253rc, and 253rb and the three left pillar frames 253lf, 253lc, and 253lb from the vehicle internal portion.

The side cover 262 covers a right side cover 262r and the three right pillar frames 253rf, 253rc, and 253rb from the right. The side cover 262 covers the left side cover 262l and the three left pillar frames 253lf, 253lc, and 253lb from the left. The left side cover 262l has a doorway 265. The doorway 265 is provided at a vehicle left portion to allow a passenger to get in and out from the vehicle internal portion.

The front luggage deck 241 covers a front end portion of the floor frame 252 from above. Above the floor frame 252 and below the lower end of the front luggage deck 241, the steering mechanism 206 of the automatic driving mechanism 208 is provided. The rear luggage deck 245 covers a rear end portion of the floor frame 252 from above. Above the floor frame 252 and below the lower end of the rear luggage deck 245, the automatic driving controller 207 of the automatic driving mechanism 208 is provided.

In the front luggage deck 241, its upper surface 241u is provided above the upper end of the front seat 212. In the front luggage deck 241, its upper surface 241u is provided below the upper end of the front back rest 213. In the rear luggage deck 245, its upper surface 245u is provided above the upper end of the rear seat 222. In the rear luggage deck 245, its upper surface 245u is provided below the upper end of the rear backrest 223.

As shown in FIG. 15, the front luggage deck 241 and the rear luggage deck 245 are provided so that the height Hf2 in the vehicle up-down direction of the upper surface 241u of the front luggage deck 241 is identical with the height Hr2 in the vehicle up-down direction of the upper surface 245u of the rear luggage deck 245. The total of the length Lf2 of the front luggage deck 241 in the vehicle front-rear direction and the length Lr2 of the rear luggage deck 245 in the vehicle front-rear direction is shorter than the length Lc2 of the floor deck 230 in the vehicle front-rear direction.

A pipe fence 266 is continuously provided at the front edge, the left edge, and the right edge of the upper surface 241u of the front luggage deck 241, the upper edge of the right side cover 262r, and the rear edge, the left edge, and the right edge of the upper surface 245u of the rear luggage deck 245. The fence 266 is able to suppress luggage on the front luggage deck 241 and the rear luggage deck 245 from moving in the vehicle left-right direction and the vehicle front-rear direction.

The facing seats 210 include a front seat assembly 211 and a rear seat assembly 221. The front seat assembly 211 includes a front seat 212 and a front back rest 213. The front seat 212 allows a passenger to be seated thereon. The front backrest 213 is provided to allow a passenger seated on the front seat 212 to keep the posture. A passenger seated on the front seat 212 leans his/her back on the front backrest 213. The front seat assembly 211 is positioned so that the passenger faces the vehicle rearward direction when the passenger is seated. The rear seat assembly 221 includes a rear seat 222 and a rear backrest 223. The rear seat 222 allows a passenger to be seated thereon. The rear backrest 223 allows the passenger to keep the posture. The rear seat assembly 221 is positioned so that the passenger faces the vehicle forward direction when the passenger is seated. The rear seat assembly 221 is positioned so that at least part of the front backrest 213 and at least part of the rear backrest 223 face each other.

The facing seats 210 are arranged so that the maximum number of passengers seatable thereon is four. The front seat assembly 211 is arranged so that the maximum number of passengers seatable thereon is two. The rear seat assembly 221 is arranged so that the maximum number of passengers seatable thereon is two.

The facing seats 210 are arranged so that the length Lcs2 in the vehicle front-rear direction between the rear end of the front seat 212 in the seating state and the front end of the rear seat 222 in the seating state is shorter than the total of the length Lf2 in the vehicle front-rear direction of the front luggage deck 241 and the length Lr2 in the vehicle front-rear direction of the rear luggage deck 245.

Figure 18:
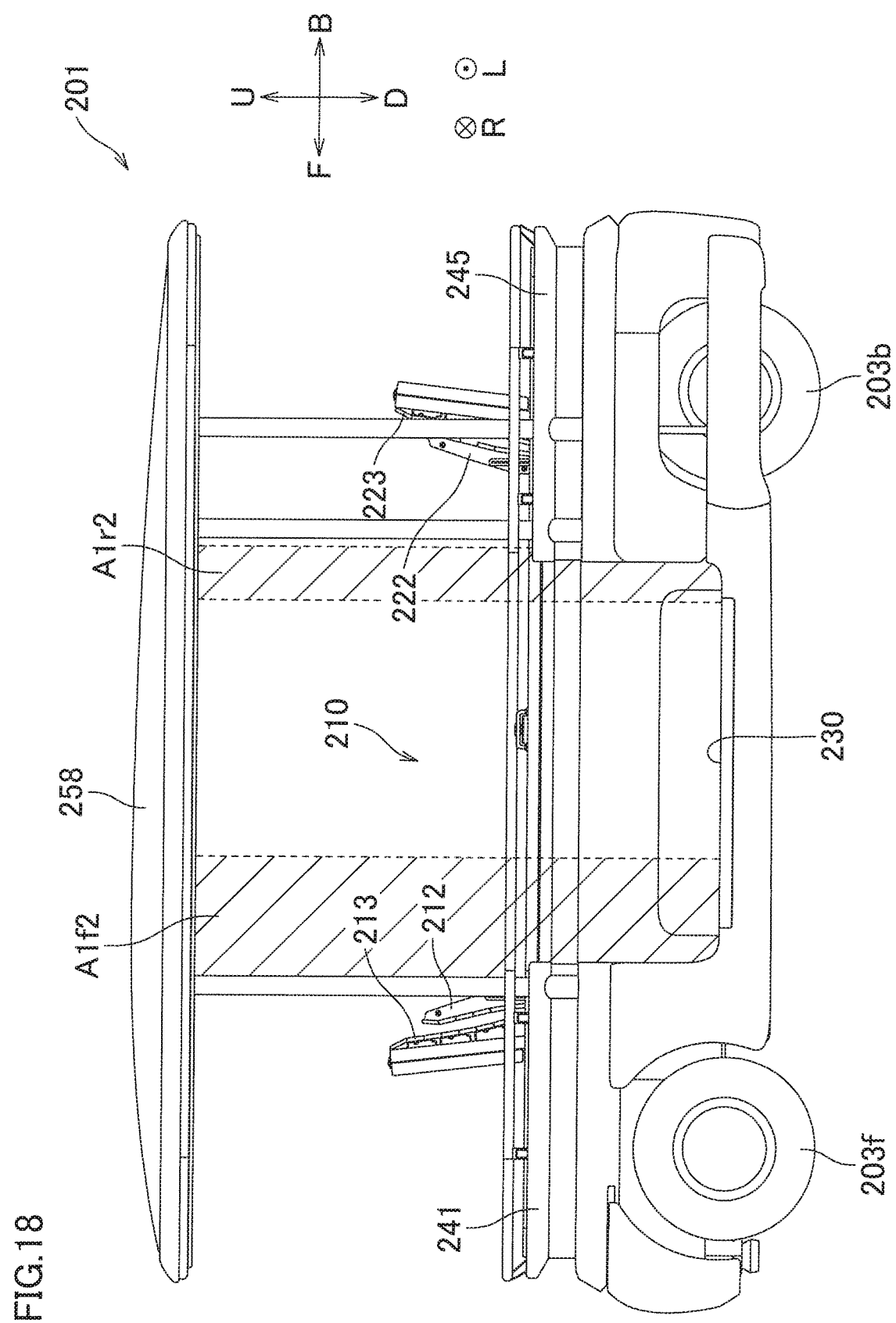
FIG. 18 is a side view of (a) a front seat variable structure and (b) a rear seat variable structure of the facing seats of Specific Example 2.

The front seat 212 is swingable between a seating state and a storage state (non-seating state) relative to the front backrest 213. In the seating state shown in FIG. 15, the front seat 212 is inclined upward, downward, and then upward in the vehicle up-down direction, in the forward direction from the rear end of the front seat 212 in the vehicle front-rear direction. This allows the passenger Of to be deeply seated on the front seat 212. The storage state of the front seat 212 is shown in FIG. 18. In the storage state, the front seat 212 is provided along the vehicle up-down direction. When the front seat 212 is in the storage state, the seat is stored so that a passenger cannot be seated on the seat. In the storage state, the front seat 212 faces the front backrest 213 in the posture keeping state. The front seat 212 is swingable in the vehicle front-rear direction and in the vehicle up-down direction about a swing shaft 212a which is provided below the lower end of the front backrest 213. The swing shaft 212a is fixed to the vehicle body frame 250. The front seat 212 is manually swung. The front seat 212 is swung in the vehicle forward direction and the vehicle upward direction from the seating state to the storage state. For example, the swing shaft 212a includes an elastic member, and when the front seat 212 in the seating state is manually lifted up by a predetermined angle, the front seat 212 is switched to the storage state thanks to the elastic force of the elastic member. In the seating state and the storage state, the front seat 212 may be locked not to be swingable.

The rear seat 222 is swingable between a seating state and a storage state (non-seating state) relative to the rear backrest 223. In the seating state shown in FIG. 15, the rear seat 222 is inclined upward, downward, and then upward in the vehicle up-down direction, in the rearward direction from the rear end of the rear seat 222 in the vehicle front-rear direction. This allows the passenger Or to be deeply seated on the rear seat 222. The storage state of the rear seat 222 is shown in FIG. 18. In the storage state, the rear seat 222 is provided along the vehicle up-down direction. When the rear seat 222 is in the storage state, the seat is stored so that a passenger cannot be seated on the seat. In the storage state, the rear seat 222 faces the rear backrest 223 in the posture keeping state. The rear seat 222 is swingable in the vehicle front-rear direction and in the vehicle up-down direction about a swing shaft 222*a* which is provided below the lower end of the rear backrest 223. The swing shaft 222*a* is fixed to the vehicle body frame 250. The rear seat 222 is manually swung. The rear seat 222 is swung in the vehicle rearward direction and the vehicle upward direction from the seating state to the storage state. For example, the swing shaft 222*a* includes an elastic member, and when the rear seat 222 in the seating state is manually lifted up by a predetermined angle, the rear seat 222 is switched to the storage state thanks to the elastic force of the elastic member. In the seating state and the storage state, the rear seat 222 may be locked not to be swingable.

Figure 20:
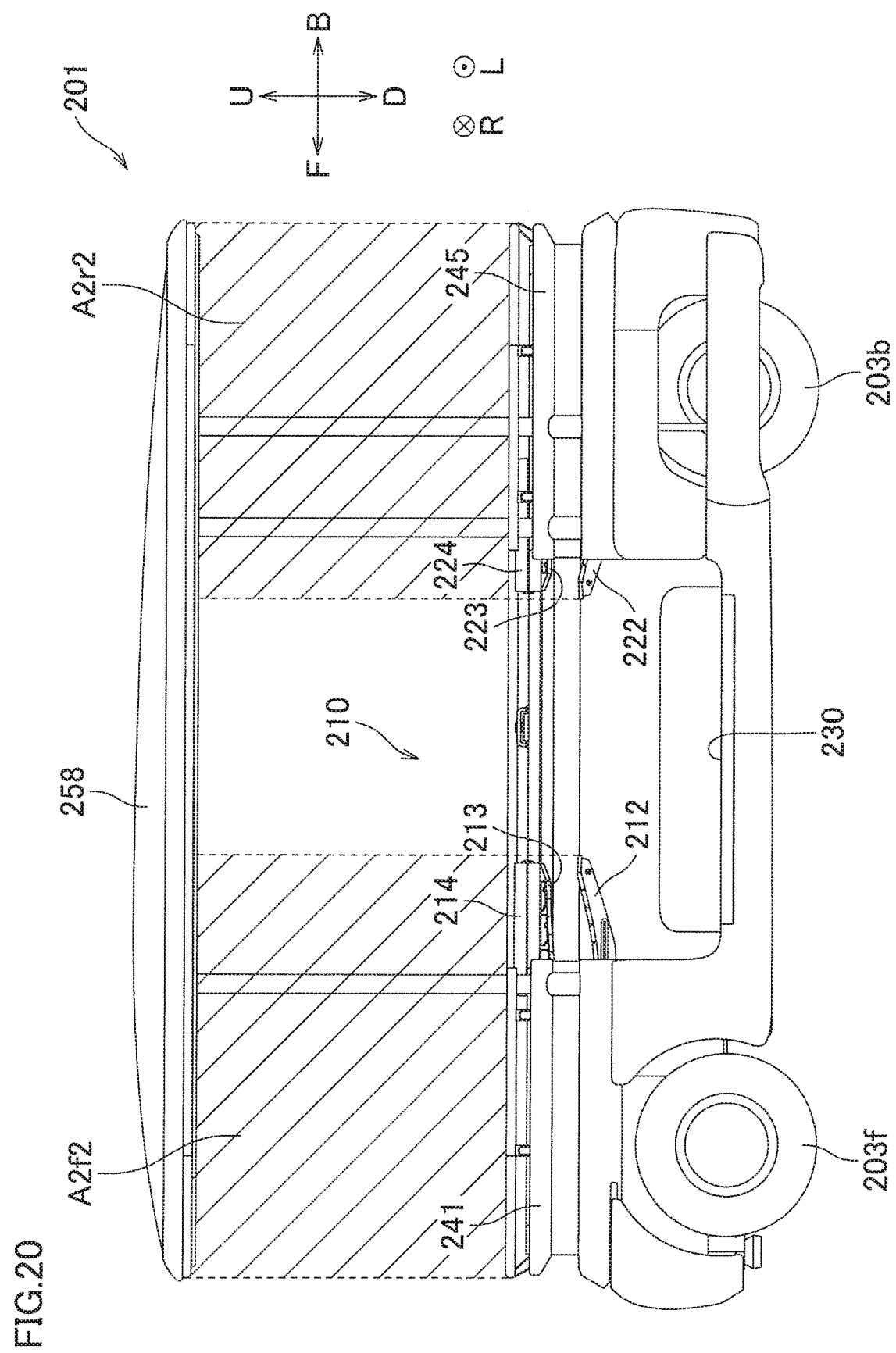
FIG. 20 is a side view of (c) a front backrest variable structure and (d) a rear backrest variable structure of the facing seats of Specific Example 2.
Figure 21:
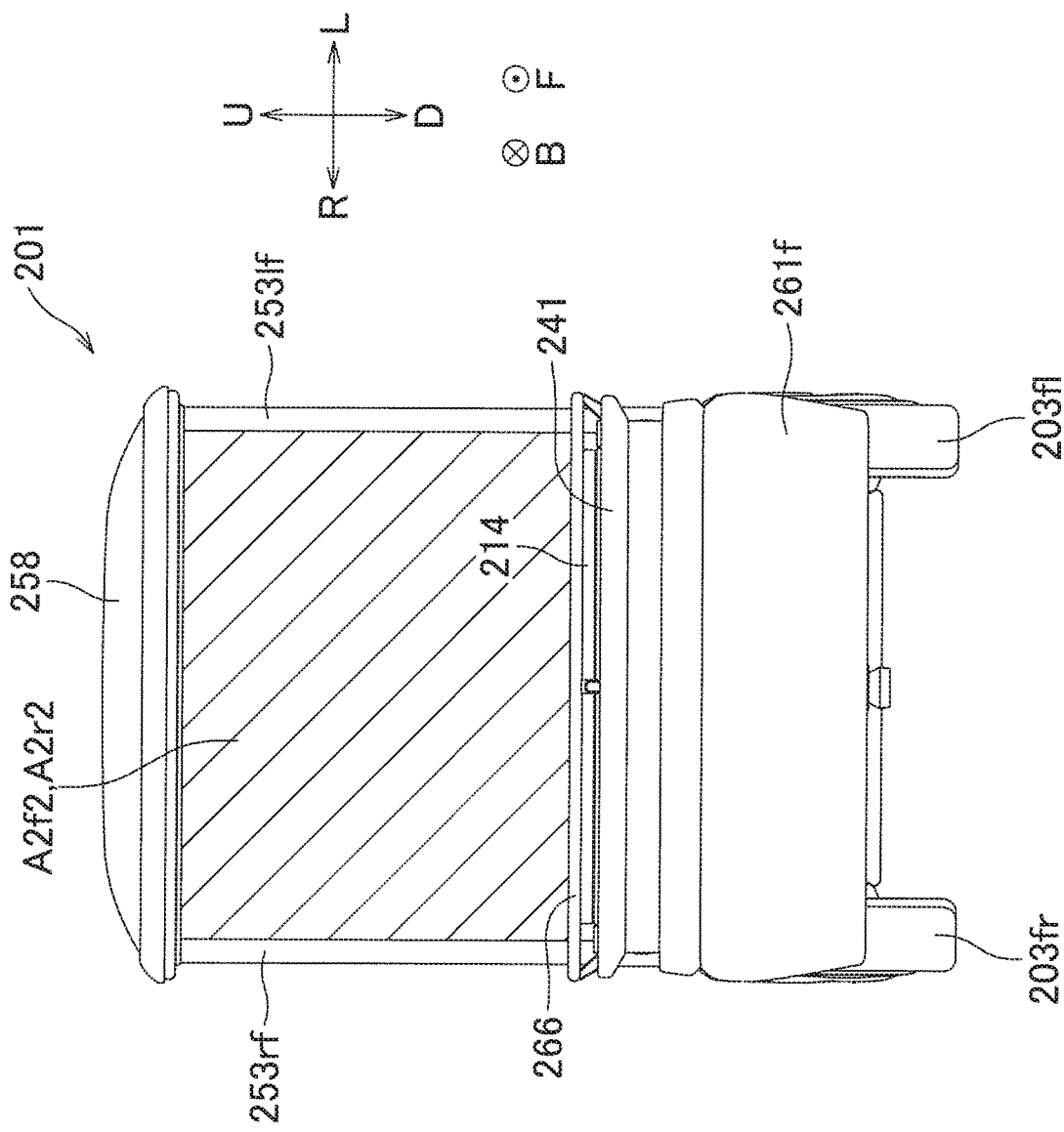
FIG. 21 is a front view of (e) a front luggage deck elongation structure and (f) a rear luggage deck elongation structure of the facing seats of Specific Example 2.

The front backrest 213 is swingable between a posture keeping state and a storage state (non-posture keeping state) relative to the front seat 212. In the posture keeping state in which the passenger Of is able to keep the posture, the front backrest 213 is provided along the vehicle up-down direction. The front backrest 213 is tilted upward in the vehicle up-down direction and forward in the vehicle front-rear direction. The front backrest 213 therefore supports the back of the passenger Of stretching his/her back, and hence the passenger Of seated on the front seat 212 is able to keep his/her posture. The storage state of the front backrest 213 is shown in FIG. 20. When the front backrest 213 is in the storage state, the front backrest 213 and the front seat 212 in the seating state are arranged to face each other. The front backrest 213 is swingable in the vehicle front-rear direction and in the vehicle up-down direction about a swing shaft 213*a* which is provided above the upper end of the front seat 212. The swing shaft 213*a* is fixed to the vehicle body frame 250. The front backrest 213 is manually swung. The front backrest 213 is swung in the vehicle rearward direction and the vehicle downward direction from the posture keeping state to the storage state. For example, the swing shaft 213*a* has an elastic member, and when the front backrest 213 in the storage state is manually lifted up by a predetermined angle, the front backrest 213 is switched to the posture keeping state thanks to the elastic force of the elastic member. In the posture keeping state and the storage state, the front backrest 213 may be locked not to be swingable.

A front elongation member 214 is attached to the upper end of the front backrest 213 to be swingable in the vehicle front-rear direction and in the vehicle up-down direction. The front elongation member 214 is provided in front of the front backrest 213 in the posture keeping state. The front elongation member 214 may be locked at a position where the front elongation member 214 is swung to be directly above the front backrest 213. In this state, the front elongation member 214 is positioned to elongate the front backrest 213 in the vehicle upward direction. At this position, the front elongation member 214 is able to support the head of the passenger Of seated on the front seat 212.

The rear backrest 223 is swingable between a posture keeping state and a storage state (non-posture keeping state) relative to the rear seat 222. In the posture keeping state in which the passenger Or is able to keep the posture, the rear backrest 223 is provided along the vehicle up-down direction. The rear backrest 223 is tilted upward in the vehicle up-down direction and rearward in the vehicle front-rear direction. The rear backrest 223 therefore supports the back of the passenger Or stretching his/her back, and hence the passenger Or seated on the rear seat 222 is able to keep his/her posture. The storage state of the rear backrest 223 is shown in FIG. 20. When the rear backrest 223 is in the storage state, the rear backrest 223 and the rear seat 222 in the seating state are arranged to face each other. The rear backrest 223 is swingable in the vehicle front-rear direction and in the vehicle up-down direction about a swing shaft 223*a* which is provided above the upper end of the rear seat 222. The swing shaft 223*a* is fixed to the vehicle body frame 250. The rear backrest 223 is manually swung. The rear backrest 223 is swung in the vehicle forward direction and the vehicle downward direction from the posture keeping state to the storage state. For example, the swing shaft 223*a* has an elastic member, and when the rear backrest 223 in the storage state is manually lifted up by a predetermined angle, the rear backrest 223 is switched to the posture keeping state thanks to the elastic force of the elastic member. In the posture keeping state and the storage state, the rear backrest 223 may be locked not to be swingable.

A rear elongation member 224 is attached to the upper end of the rear backrest 223 to be swingable in the vehicle front-rear direction and in the vehicle up-down direction. The rear elongation member 224 is provided behind the rear backrest 223 in the posture keeping state. The rear elongation member 224 may be locked at a position where the rear elongation member 224 is swung to be directly above the rear backrest 223. In this state, the rear elongation member 224 is positioned to elongate the rear backrest 223 in the vehicle up-down direction. At this position, the rear elongation member 224 is able to support the head of the passenger Of seated on the rear seat 222.

The facing seats 210 have at least one of (a) a front seat variable structure, (b) a rear seat variable structure, (c) a front backrest variable structure, (d) a rear backrest variable structure, (e) a front luggage deck elongation structure, and (f) a rear luggage deck elongation structure.

With reference to FIG. 15, FIG. 18, and FIG. 19, the following will describe (a) the front seat variable structure and (b) the rear seat variable structure of the facing seats 210.

In (a) the front seat variable structure, the rear end of the front seat 212 in the seating state is provided rearward of the front end of the floor deck 230. In the front seat variable structure, the first front space A1/2 is divided in the vehicle up-down direction by the bottom surface of the front seat 212 in the seating state. The first front space A1/2 is a space directly above a front seat facing surface 230*f* which is part of the upper surface of the floor deck 230. The front seat facing surface 230*f* of the floor deck 230 is a part of the upper surface of the floor deck 230, which faces the bottom surface of the front seat 212 in the seating state. The first front space A1/2 is a space between the upper surface of the floor deck 230 and the lower surface of the roof portion 258. In the first front space A1/2, no structure is provided in a space A1*fs*2 between the bottom surface of the front seat 212 in the seating state and the upper surface of the floor deck 230. As described above, the front seat 212 is swingable in the vehicle front-rear direction and in the vehicle up-down direction about the swing shaft 212*a*. On this account, when viewed in the vehicle up-down direction, the area of the bottom surface of the front seat 212 which divides the first front space A1/2 is changeable (see FIG. 15 and FIG. 18). When the front seat 212 is in the seating state, the area of the bottom surface of the front seat 212 which divides the first front space A1*f*2 is maximum when viewed in the vehicle up-down direction. Meanwhile, when the front seat 212 is in the storage state, the area of the bottom surface of the front seat 212 dividing the first front space A1*f*2 is minimum when viewed in the vehicle up-down direction.

In (b) the rear seat variable structure, the front end of the rear seat 222 in the seating state is provided forward of the rear end of the floor deck 230. In the rear seat variable structure, the first rear space A1*r*2 is divided in the vehicle up-down direction by the bottom surface of the rear seat 222 in the seating state. The first rear space A1*r*2 is a space directly above a rear seat facing surface 230*b* which is part of the upper surface of the floor deck 230. The rear seat facing surface 230*b* of the floor deck 230 is a part of the upper surface of the floor deck 230, which faces the bottom surface of the rear seat 222 in the seating state. The first rear space A1*r*2 is a space between the upper surface of the floor deck 230 and the lower surface of the roof portion 258. In the first rear space A1*r*2, no structure is provided in a space A1*rs*2 between the bottom surface of the rear seat 222 in the seating state and the upper surface of the floor deck 230. As described above, the rear seat 222 is swingable in the vehicle front-rear direction and in the vehicle up-down direction about the swing shaft 222*a*. On this account, when viewed in the vehicle up-down direction, the area of the bottom surface of the rear seat 222 dividing the first rear space A1*r*2 is changeable (see FIG. 15 and FIG. 18). When the rear seat 222 is in the seating state, the area of the bottom surface of the rear seat 222 which divides the first rear space A1*r*2 is maximum when viewed in the vehicle up-down direction. Meanwhile, when the rear seat 222 is in the storage state, the area of the bottom surface of the rear seat 222 dividing the first front space A1*r*2 is minimum when viewed in the vehicle up-down direction.

With reference to FIG. 15, FIG. 16, FIG. 18, FIG. 20, and FIG. 21, the following will describe (c) the front backrest variable structure and (d) the rear backrest variable structure of the facing seats 210.

In (c) the front backrest variable structure, the upper end of the front backrest 213 in the posture keeping state is provided above the upper surface 241*u* of the front luggage deck 241. The front surface of the front backrest 213 in the posture keeping state divides a second front space A2*f*2 in the vehicle front-rear direction. The second front space A2*f*2 is a space above the front seat 212 in the seating state and above the front luggage deck 241. The second front space A2*f*2 is a space between the upper surface of the front seat 212 and the upper surface 241*u* of the front luggage deck 241 and the lower surface of the roof portion 258. In the second front space A2*f*2, no structure is provided in a space which is forward of the front surface of the front backrest 213 in the posture keeping state and above the front luggage deck 241. As described above, the front backrest 213 is swingable in the vehicle front-rear direction and in the vehicle up-down direction about the swing shaft 213*a*. On this account, when viewed in the vehicle front-rear direction, the area of the front surface of the front backrest 213 which divides the second front space A2*f*2 is changeable (see FIG. 15, FIG. 16, FIG. 18, FIG. 20, and FIG. 21). When the front backrest 213 is in the posture keeping state, the area of the front surface of the front backrest 213 which divides the second front space A2*f*2 is maximum when viewed in the vehicle up-down direction. When the front backrest 213 is in the storage state, the area of the front surface of the front backrest 213 which divides the second front space A2*f*2 is minimum when viewed in the vehicle front-rear direction.

In (d) the rear backrest variable structure, the upper end of the rear backrest 223 in the posture keeping state is provided above the upper surface 245*u* of the rear luggage deck 245. The rear surface of the rear backrest 223 in the posture keeping state divides a second rear space A2*r*2 in the vehicle front-rear direction. The second rear space A2*r*2 is a space above the rear seat 222 in the seating state and above the rear luggage deck 245. The second rear space A2*r*2 is a space between the upper surface of the rear seat 222 and the upper surface 245*u* of the rear luggage deck 245 and the lower surface of the roof portion 258. In the second rear space A2*r*2, no structure is provided in a space which is rearward of the rear surface of the rear backrest 223 in the posture keeping state and above the rear luggage deck 245. As described above, the rear backrest 223 is swingable in the vehicle front-rear direction and in the vehicle up-down direction about the swing shaft 223*a*. On this account, when viewed in the vehicle front-rear direction, the area of the rear surface of the rear backrest 223 which divides the second rear space A2*r*2 is changeable (see, FIG. 15, FIG. 18, FIG. 20, and FIG. 21). When the rear backrest 223 is in the posture keeping state, the area of the rear surface of the rear backrest 223 which divides the second rear space A2*r*2 is maximum when viewed in the vehicle up-down direction. When the rear backrest 223 is in the storage state, the area of the rear surface of the rear backrest 223 which divides the second rear space A2*r*2 is minimum when viewed in the vehicle front-rear direction.

Figure 22:
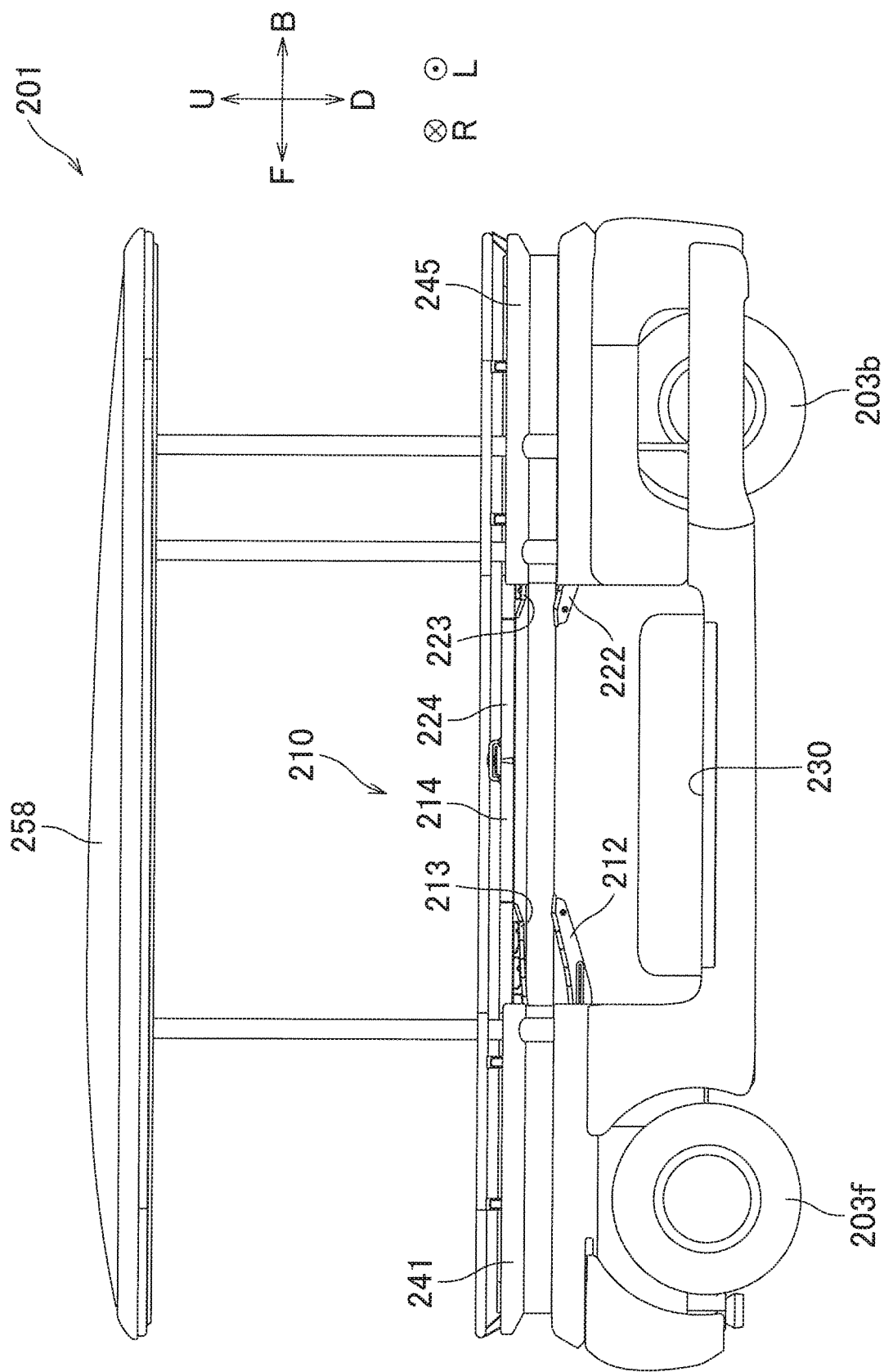
FIG. 22 is a side view of (e) the front luggage deck elongation structure and (f) the rear luggage deck elongation structure of the facing seats of Specific Example 2.

With reference to FIG. 20 and FIG. 22, (e) the front luggage deck elongation structure and (f) the rear luggage deck elongation structure of the facing seats 210 will be described.

In (e) the front luggage deck elongation structure, the front backrest 213 is movable to a position where the front luggage deck 241 is elongated in the vehicle rearward direction. The upper end of the front backrest 213 in the storage state is provided at the same height as the upper surface 241*u* of the front luggage deck 241. The front backrest 213 in the storage state is therefore provided at a position where the front luggage deck 241 is elongated in the vehicle rearward direction.

When the front backrest 213 is in the storage state, the front elongation member 214 is swingable relative to the front backrest 213. The front elongation member 214 is swingable to a position where the upper surface of the front elongation member 214 is at the same height as the upper surface 241*u* of the front luggage deck 241. The front elongation member 214 is locked at the position where the front elongation member 214 is at the same height as the upper surface 241*u* of the front luggage deck 241. The front backrest 213 and the front elongation member 214 can be provided at positions where the front luggage deck 241 is elongated in the vehicle rearward direction. On this account, in the front luggage deck elongation structure of this specific example, the front backrest 213 and the front elongation member 214 are movable to the positions where the front luggage deck 241 is elongated in the vehicle rearward direction.

In (f) the rear luggage deck elongation structure, the rear backrest 223 is movable to a position where the rear luggage deck 245 is elongated in the vehicle forward direction. In this specific example, the upper end of the rear backrest 223 in the storage state is provided at the same height as the upper surface 245*u* of the rear luggage deck 245. The rear backrest 223 in the storage state is therefore provided at a position where the rear luggage deck 245 is elongated in the vehicle forward direction.

When the rear backrest 223 is in the storage state, the rear elongation member 224 is swingable relative to the rear backrest 223. The rear elongation member 224 is swingable to a position where the upper surface of the rear elongation member 224 is at the same height as the upper surface 245u of the rear luggage deck 245. The rear elongation member 224 is locked at the position where the rear elongation member 224 is at the same height as the upper surface 245u of the rear luggage deck 245. The rear backrest 223 and the rear elongation member 224 can be provided at positions where the rear luggage deck 245 is elongated in the vehicle forward direction. On this account, in the rear luggage deck elongation structure of this specific example, the rear backrest 223 and the rear elongation member 224 are movable to the positions where the rear luggage deck 245 is elongated in the vehicle forward direction.

In this specific example, the front luggage deck 241 and the rear luggage deck 245 are identical in height in the vehicle up-down direction. For this reason, the upper surfaces of the front backrest 213 and the front elongation member 214 provided at positions where the front luggage deck 241 is elongated in the vehicle rearward direction are identical in height with the upper surfaces of the rear backrest 223 and the rear elongation member 224 provided at positions where the rear luggage deck 245 is elongated in the vehicle forward direction. In this case, the front luggage deck 241, the front backrest 213, the front elongation member 214, the rear elongation member 224, the rear backrest 223, and the rear luggage deck 245 are lined up in this order in the vehicle rearward direction.

In addition to the effects of the facing seats-type automated driving vehicle 1 of the embodiment of the present teaching, the facing seats-type automated driving vehicle 201 of Specific Example 2 of the embodiment of the present teaching exerts the following effects.

The length Lcs2 in the vehicle front-rear direction between the rear end of the front seat 212 in the state in which the passenger Of is seatable thereon and the front end of the rear seat 222 in the state in which the passenger Or is seatable thereon is shorter than the length Lf2+Lr2 which is the total of the length of the front luggage deck 241 and the length of the rear luggage deck 245 in the vehicle front-rear direction. In other words, the floor deck 230 is short in the vehicle front-rear direction. It is therefore possible to downsize the vehicle even if plural passengers are able to ride on the vehicle.

The facing seats 210 are constructed by combining (a) the front seat variable structure, (b) the rear seat variable structure, (c) the front backrest variable structure, (d) the rear backrest variable structure, (e) the front luggage deck elongation structure, and (f) the rear luggage deck elongation structure. It is therefore possible to cause the vehicle to be able to conveniently accommodate both passengers and luggage and to be small in size at the same time, as described above.

The front luggage deck 241 is provided so that its upper end is positioned above the upper end of the front seat 212, and the rear luggage deck 245 is provided so that its upper end is positioned above the upper end of the rear seat 222. According to this arrangement, because the upper surface 241u of the front luggage deck 241 is provided above the upper end of the front seat 212, a space directly below the front luggage deck 241 is enlarged. The automatic driving mechanism 208 can be accommodated in this enlarged space directly below the front luggage deck 241. On this account, as compared to a case where the upper surface 241u of the front luggage deck 241 is provided at the same height as or below the upper end of the front seat 212 which is in the state of allowing a passenger to be seated and the automatic driving mechanism is accommodated in a space which is identical in volume with the automatic driving mechanism 208 and is provided directly below the front luggage deck 241, the front luggage deck 241 can be shortened in the vehicle front-rear direction. In addition to the above, because the upper surface 245u of the rear luggage deck 245 is provided above the upper end of the rear seat 222, a space directly below the rear luggage deck 245 is enlarged. The automatic driving mechanism 208 can be accommodated in this enlarged space directly below the rear luggage deck 245. On this account, as compared to a case where the upper surface 245u of the rear luggage deck 245 is provided at the same height as or below the upper end of the rear seat 222 which is in the state of allowing a passenger to be seated and the automatic driving mechanism is accommodated in a space which is identical in volume with the automatic driving mechanism 208 and is provided directly below the rear luggage deck 245, the rear luggage deck 245 can be shortened in the vehicle front-rear direction. It is therefore possible to elongate the floor deck 230 in the vehicle front-rear direction while reducing the size of the vehicle.

The two front wheels 203fl and 203fr are arranged such that the upper ends thereof are provided below the lower end of the front seat 212 in the state of allowing a passenger to be seated, and the two rear wheels 203b are arranged such that the upper ends thereof are provided below the lower end of the rear seat 222 in the state of allowing a passenger to be seated. When the upper ends of the two front wheels 203fl and 203fr are provided below the lower end of the front seat 212, the two front wheels 203fl and 203fr are provided at low positions relative to the vehicle. It is therefore possible to enlarge the space directly below the front luggage deck 241 even when the two front wheels 203fl and 203fr are provided directly above the front luggage deck 241. The automatic driving mechanism 208 can be accommodated in a front part of the enlarged space below the front luggage deck 241. On this account, as compared to a case where the upper ends of the two front wheels 203fl and 203fr are provided at the same height as or above the lower end of the front seat 212 and the automatic driving mechanism is accommodated in a space which is identical in volume with the automatic driving mechanism and is provided directly below the front luggage deck 241, the front luggage deck 241 can be shortened in the vehicle front-rear direction. When the upper ends of the two rear wheels 203b are provided above the lower end of the rear seat 222 which is in the state of allowing a passenger to be seated, the rear wheels 203b are provided at low positions relative to the vehicle. It is therefore possible to enlarge the space directly below the rear luggage deck 245 even when the two rear wheels 203b are provided directly above the rear luggage deck 245. The automatic driving mechanism 208 can be accommodated in a rear part of the enlarged space below the rear luggage deck 245. On this account, as compared to a case where the upper ends of the two rear wheels 203b are provided at the same height as or above the lower end of the rear seat 222 and the automatic driving mechanism is accommodated in a space which is identical in volume with the automatic driving mechanism and is provided directly below the rear luggage deck 245, the rear luggage deck 245 can be shortened in the vehicle front-rear direction. It is therefore possible to elongate the floor deck 230 in the vehicle front-rear direction while reducing the size of the vehicle.

The total of the length Lf2 of the front luggage deck 241 in the vehicle front-rear direction and the length Lr2 of the rear luggage deck 245 in the vehicle front-rear direction is shorter than the length Lc2 of the floor deck in the vehicle front-rear direction. According to this arrangement, provided that the length of the entire vehicle in the vehicle front-rear direction remains the same, a space above the upper surface of the floor deck 230 is large as compared to a case where the length which is the total of the length Lf2 of the front luggage deck 241 in the vehicle front-rear direction and the length Lr2 of the rear luggage deck 245 in the vehicle front-rear direction is shorter than the length Lc2 of the floor deck 230 in the vehicle front-rear direction. It is therefore possible to downsize the vehicle even if plural passengers are able to ride on the vehicle.

The upper surface 241u of the front luggage deck 241 is identical in height with the upper surface 245u of the rear luggage deck 245 in the vehicle up-down direction. With this arrangement, there is no difference in height between the front luggage deck 241 and the rear luggage deck 245 in the vehicle up-down direction. For this reason, when the facing seats 210 have (c) the front backrest variable structure, (d) the rear backrest variable structure, (e) the front luggage deck elongation structure, and (f) the rear luggage deck elongation structure, it is possible to load a piece of luggage which is long in the vehicle front-rear direction, across the front luggage deck 241 and the rear luggage deck 245.

The facing seats-type automated driving vehicle 201 further includes the four wheels 203 and the automatic driving mechanism 208. The automatic driving mechanism 208 further includes the driving source 204, the steering mechanism 206, and the automatic driving controller 207. The driving source 204 applies driving force to at least one of the four wheels 203. The steering mechanism 206 steers at least one of the four wheels 203. The automatic driving controller 207 automatically controls the driving source 204 and the steering mechanism 206. The automatic driving mechanism 208 is provided at least partially below the lower end of the front luggage deck 241 and at least partially below the lower end of the rear luggage deck 245. The automatic driving mechanism 208 is at least partially accommodated in a space below the lower ends of the front luggage deck 241 and the rear luggage deck 245. As compared to a case where the entirety of the automatic driving mechanism 208 is provided directly below the floor deck 230, it is possible to secure a large space above the upper surface of the floor deck 230, while maintaining the height of the vehicle.

The automatic driving mechanism 208 is provided at least partially in a space rearward of the rear end of the rear seat 222. In this case, it is possible to obtain a large space in the vehicle front-rear direction of the floor deck 230, as compared to a case where the automatic driving mechanism 208 is provided at least partially in a space forward of the rear end of the rear seat 222 and rearward of the front end of the front seat 212.

The maximum number of passengers seatable on the facing seats 210 is four. This arrangement makes it possible to reduce the capacity of the vehicle internal portion of the facing seats-type automated driving vehicle 201. The vehicle can therefore be downsized.

The roof portion 258 is provided in such a way that the height Hi2 in the vehicle up-down direction between the lower surface of the roof portion 258 and the upper surface of the floor deck 230 is insufficient for adult passengers to stand on the floor deck 230 in the upright state. This arrangement makes it possible to reduce the length in the vehicle up-down direction of the facing seats-type automated driving vehicle 201. The vehicle can therefore be downsized.

The present teaching is not limited to the above-described embodiment, and various changes can be made within the scope of the claims. The following describes modifications of the embodiment of the present teaching.

In Specific Examples 1 and 2 of the present teaching, the facing seats 110, 201 of the facing seats-type automated driving vehicle 101, 201 are arranged so that the maximum number of seatable passengers is four. The facing seats of the facing seats-type automated driving vehicle of the present teaching may be differently arranged, as long as the maximum number of seatable passengers is two or more and six or less.

In Specific Example 2 of the present teaching, the traveling direction of the facing seats-type automated driving vehicle 201 is the forward direction in the vehicle front-rear direction. The traveling direction of the facing seats-type automated driving vehicle 201 is a direction in which the facing seats-type automated driving vehicle 201 in normal use runs, and the traveling direction does not include a direction in which the vehicle temporarily runs. The facing seats automatic driving vehicle of the present teaching may be a bi-directional vehicle which is able to change the traveling direction to the rearward direction in the vehicle front-rear direction and run.

In Specific Examples 1 and 2 of the present teaching, the doorway 65, 278 of the facing seats-type automated driving vehicle 101, 201 is provided at the vehicle left portion. Alternatively, the doorway of the facing seats-type automated driving vehicle of the present teaching may be provided at the vehicle right portion.

In Specific Examples 1 and 2 of the present teaching, the driving source 105, 204 drives the two rear wheels $3br$ and $3b1$, $203br$ and $203b1$. Alternatively, the driving source of the present teaching may drive the two front wheels. Alternatively, the driving source of the present teaching may drive all four wheels. Alternatively, the driving source of the present teaching may drive at least one of the wheels. In the specific examples of the present teaching, the driving source is a driving motor including an electric motor and a battery. Alternatively, the driving source of the present teaching may be an engine using gasoline, etc.

In Specific Examples 1 and 2 of the present teaching, the brake mechanism 107, 205 is constituted by the disc brake device. Alternatively, the brake mechanism of the present teaching may be a combination of a regenerative brake using a driving motor and the disc brake device. Alternatively, the brake mechanism of the present teaching may be constituted by a drum brake device, etc.

In Specific Examples 1 and 2 of the present teaching, the steering mechanism 106, 206 steers the two front wheels $103f$, $203f$ to control the traveling direction of the facing seats-type automated driving vehicle 101, 201. Alternatively, the steering mechanism of the present teaching may steer the two rear wheels to control the traveling direction of the facing seats-type automated driving vehicle. Alternatively, the steering mechanism of the present teaching may steer all four wheels to control the traveling direction of the facing seats-type automated driving vehicle. Alternatively, the steering mechanism of the present teaching may steer at least one of the wheels to control the traveling direction of the facing seats-type automated driving vehicle.

In Specific Examples 1 and 2 of the present teaching, the steering mechanism 106, 206 is controlled by the automatic driving controller 108, 207. Alternatively, the steering mechanism of the present teaching may include a steering wheel, and the mechanism may be controllable by a passenger operating the steering wheel. The steering wheel may be formed of a circular member and rotationally operated by a passenger, or may be formed of a lever and tilted by a passenger to input the direction. The facing seats-type automated driving vehicle of the present teaching may be switchable between an automatic driving mode and a manual driving mode. In the automatic driving mode, the steering mechanism is controlled by the automatic driving controller. In the manual driving mode, the steering mechanism is controlled by a passenger operating the steering wheel. The steering mechanism may include an attachable and detachable steering wheel. The steering wheel may be attached when the vehicle is driven in the manual driving mode, and the steering wheel may be detached when the vehicle is driven in the automatic driving mode.

In Specific Examples 1 and 2 of the present teaching, the driving source 105, 204 and the brake mechanism 107, 205 are controlled by the automatic driving controller 108, 207. Alternatively, the facing seats-type automated driving vehicle of the present teaching may include an accelerator pedal, a brake pedal, and a clutch pedal. The driving source may be controllable by a passenger operating the accelerator pedal or the clutch pedal. The clutch pedal may be omitted. The brake mechanism may be controllable by a passenger operating the brake pedal. The facing seats-type automated driving vehicle of the present teaching may be switchable between an automatic driving mode and a manual driving mode. In the automatic driving mode, the running of the facing seats-type automated driving vehicle is controlled by the automatic driving controller. In the manual driving mode, the running of the facing seats-type automated driving vehicle is controlled by a passenger operating the accelerator pedal and the brake pedal.

In Specific Example 2 of the present teaching, the front elongation member 214 is attached to the front backrest 213. Furthermore, the rear elongation member 224 is attached to the rear backrest 223. However, the front elongation member may not be attached to the front backrest of the facing seats-type automated driving vehicle of the present teaching. The rear elongation member may not be attached to the rear backrest of the facing seats-type automated driving vehicle of the present teaching.

In Specific Example 2 of the present teaching, when the front backrest 213 is in the storage state, the upper end of the front backrest 213 is provided to be identical in height with the upper surface of the front luggage deck 241. Furthermore, when the rear backrest 223 is in the storage state, the upper end of the rear backrest 223 is provided at the same height as the upper surface of the rear luggage deck 245. Alternatively, in the facing seats-type automated driving vehicle of the present teaching, when the front backrest is not in the state of keeping the posture of a passenger, the upper end of the front backrest may be provided below the upper surface of the front luggage deck. Furthermore, when the rear backrest is not in the state of keeping the posture of a passenger, the upper end of the rear backrest may be provided below the upper surface of the rear luggage deck.

In Specific Example 1 of the present teaching, the front tray portion 179*af* is arranged such that its upper surface is provided above the upper end of the front seat 121*f*. The rear tray portion 179*ar* is arranged such that its upper surface is provided above the upper end of the rear seat 121*r*. In Specific Example 2 of the present teaching, the front luggage deck 241 is arranged such that its upper surface 241*u* is provided above the upper end of the front seat 212. In the rear luggage deck 245, its upper surface 245*u* is provided above the upper end of the rear seat 222. Alternatively, the upper surface of the front luggage deck of the facing seats-type automated driving vehicle of the present teaching may be provided at the same height as or lower than the upper end of the front seat. The upper surface of the rear luggage deck of the facing seats-type automated driving vehicle of the present teaching may be provided at the same height as or lower than the upper end of the rear seat.

Figure 23:
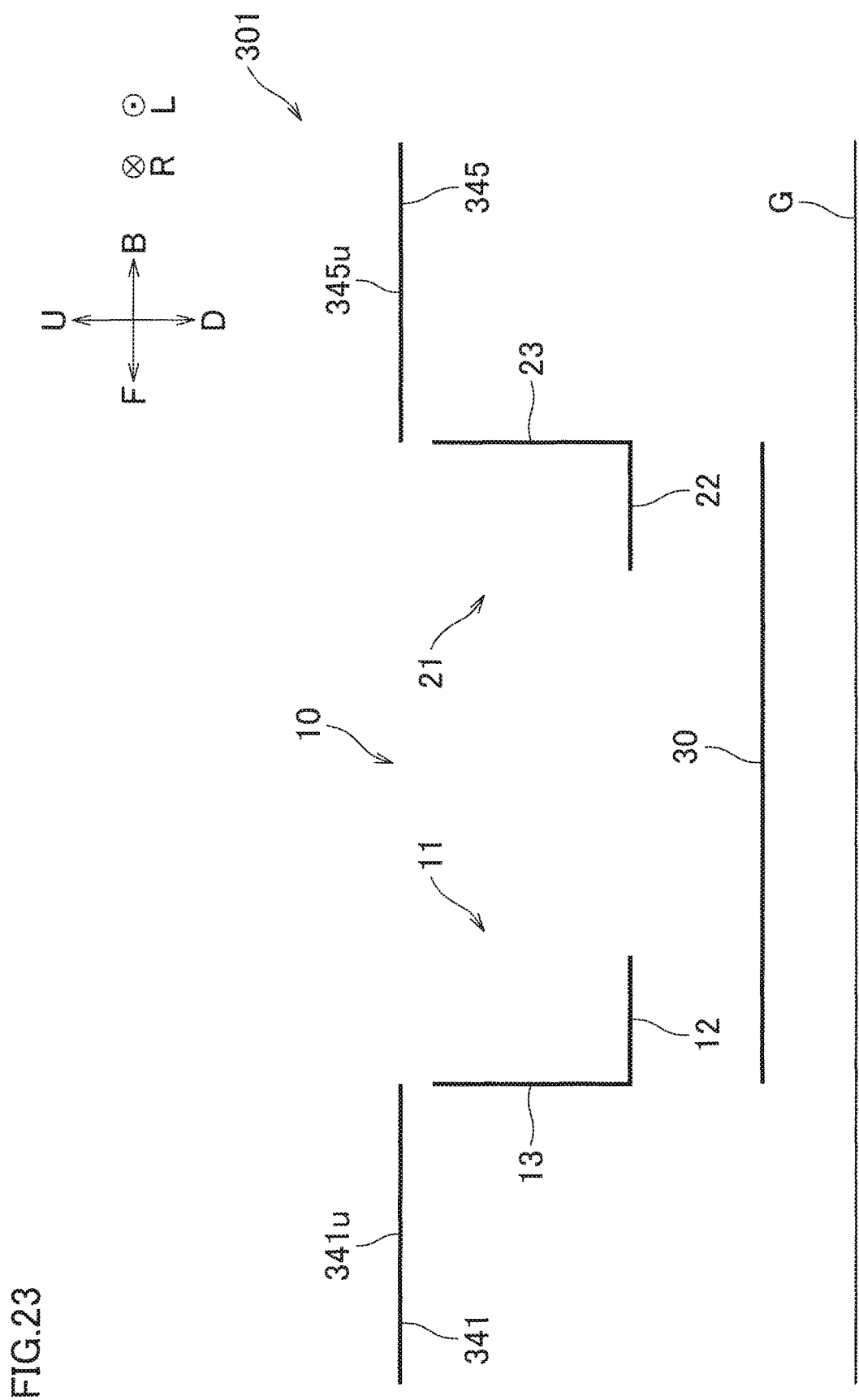
FIG. 23 is a side view which schematically shows a modification of the facing seats-type automated driving vehicle of the present teaching.

In Specific Example 1 of the present teaching, the front tray portion 179*af* is arranged such that its upper surface is provided below the upper end of the front backrest 122*f*. In the rear tray portion 179*ar*, its upper surface is provided below the upper end of the rear backrest 122*r*. In Specific Example 2 of the present teaching, the front luggage deck 241 is arranged such that its upper surface is provided below the upper end of the front backrest 213. In the rear luggage deck 245, its upper surface is provided below the upper end of the rear backrest 223. Alternatively, the upper surface of the front luggage deck of the facing seats-type automated driving vehicle of the present teaching may be provided above the upper end of the front backrest. In the rear luggage deck, its upper surface may be provided above the upper end of the rear backrest. For example, as in a facing seats-type automated driving vehicle 301 of a modification shown in FIG. 23, the upper surface of a front luggage deck 341*u* may be provided above the upper end of a front backrest 13. Furthermore, in a rear luggage deck 345, its upper surface 345*u* may be provided above the upper end of a rear backrest 23. According to this arrangement, because the upper surface of the front luggage deck is provided above the upper end of the front backrest, a space directly below the front luggage deck is enlarged. The automatic driving mechanism can be accommodated in a front part of the enlarged space below the front luggage deck. The front luggage deck is therefore shortened in the vehicle front-rear direction as compared to a case where the upper surface of the front luggage deck is identical in height with or lower than the upper end of the front backrest. Because the upper surface of the rear luggage deck is provided above the upper end of the rear backrest, a space below the rear luggage deck is enlarged. The automatic driving mechanism can be accommodated in a rear part of the enlarged space below the rear luggage deck. The rear luggage deck is therefore shortened in the vehicle front-rear direction as compared to a case where the upper surface of the rear luggage deck is identical in height with or lower than the upper end of the rear backrest. It is therefore possible to elongate the floor deck in the vehicle front-rear direction while reducing the size of the vehicle.

In Specific Example 2 of the present teaching, above the floor frame 252 and below the lower end of the rear luggage deck 245, the automatic driving controller 207 of the automatic driving mechanism 208 is provided. In the front seat assembly of the facing seats-type automated driving vehicle of the present teaching, furthermore, the automatic driving mechanism may be provided below the lower end of the front luggage deck.

In Specific Examples 1 and 2 of the present teaching, the front seat assembly 120*f*, 211 includes the front backrest 122*f*, 213. The rear seat assembly 120*b*, 221 includes the rear backrest 122*r*, 223. Alternatively, the front seat assembly of the facing seats-type automated driving vehicle of the present teaching may not include the front backrest. The rear seat assembly of the facing seats-type automated driving vehicle of the present teaching may not include the rear backrest.

In Specific Examples 1 and 2 of the present teaching, the front seat 121*f*, 212 and the rear seat 121*r*, 222 are arranged to be swingable. Alternatively, in the facing seats-type automated driving vehicle of the present teaching, the front seat and the rear seat may be arranged to be detachable and attachable. In Specific Example 2 of the present teaching, the front backrest 213 and the rear backrest 223 are arranged to be swingable. Alternatively, in the facing seats-type automated driving vehicle of the present teaching, the front backrest and the rear backrest may be arranged to be detachable and attachable. The front seat and the rear seat of the facing seats-type automated driving vehicle of the present teaching may be fixed.

In Specific Example 2 of the present teaching, the front backrest 213 and the rear backrest 223 are arranged to be swingable. Alternatively, the front backrest and the rear backrest of the facing seats-type automated driving vehicle of the present teaching may be fixed.

In Specific Example 1 of the present teaching, the facing seats 110 are arranged so that the length in the vehicle front-rear direction between the rear end of the front seat 121*f* in the state of allowing a passenger to be seated and the front end of the rear seat 121*r* in the state of allowing a passenger to be seated is shorter than the total of the lengths of the two tray portions 179*a* in the vehicle front-rear direction. In Specific Example 2 of the present teaching, the facing seats 210 are arranged so that the length Lcs2 in the vehicle front-rear direction between the rear end of the front seat 212 in the state in which the passenger Of is seatable thereon and the front end of the rear seat 222 in the state in which the passenger Or is seatable thereon is shorter than the total of the length Lf2 in the vehicle front-rear direction of the front luggage deck 241 and the length Lr2 in the vehicle front-rear direction of the rear luggage deck 245. Alternatively, the facing seats of the facing seats-type automated driving vehicle of the present teaching are arranged so that the length in the vehicle front-rear direction between the rear end of the front seat in the state of allowing a passenger to be seated and the front end of the rear seat in the state of allowing a passenger to be seated may be identical with or longer than the total of the length in the vehicle front-rear direction of the front luggage deck and the length in the vehicle front-rear direction of the rear luggage deck.

In Specific Example 2 of the present teaching, the pipe fence 266 is provided at the outer edges of the upper surfaces of the front luggage deck 241, the right side cover 262*r*, and the rear luggage deck 245. Alternatively, no fence may be provided in the facing seats-type automated driving vehicle of the present teaching.

In Specific Examples 1 and 2 of the present teaching, the front end of the front seat 121*f*, 212 is provided forward of the front end of the floor deck 178, 230. In Specific Examples 1 and 2 of the present teaching, the rear end of the rear seat 121*r*, 222 is provided rearward of the rear end of the floor deck 178, 230. Alternatively, the front end of the front seat of the present teaching may be provided at the same position as or rearward of the front end of the floor deck in the vehicle front-rear direction. The rear end of the rear seat of the present teaching may be provided at the same position as or rearward of the rear end of the floor deck in the vehicle front-rear direction.

Figure 24:
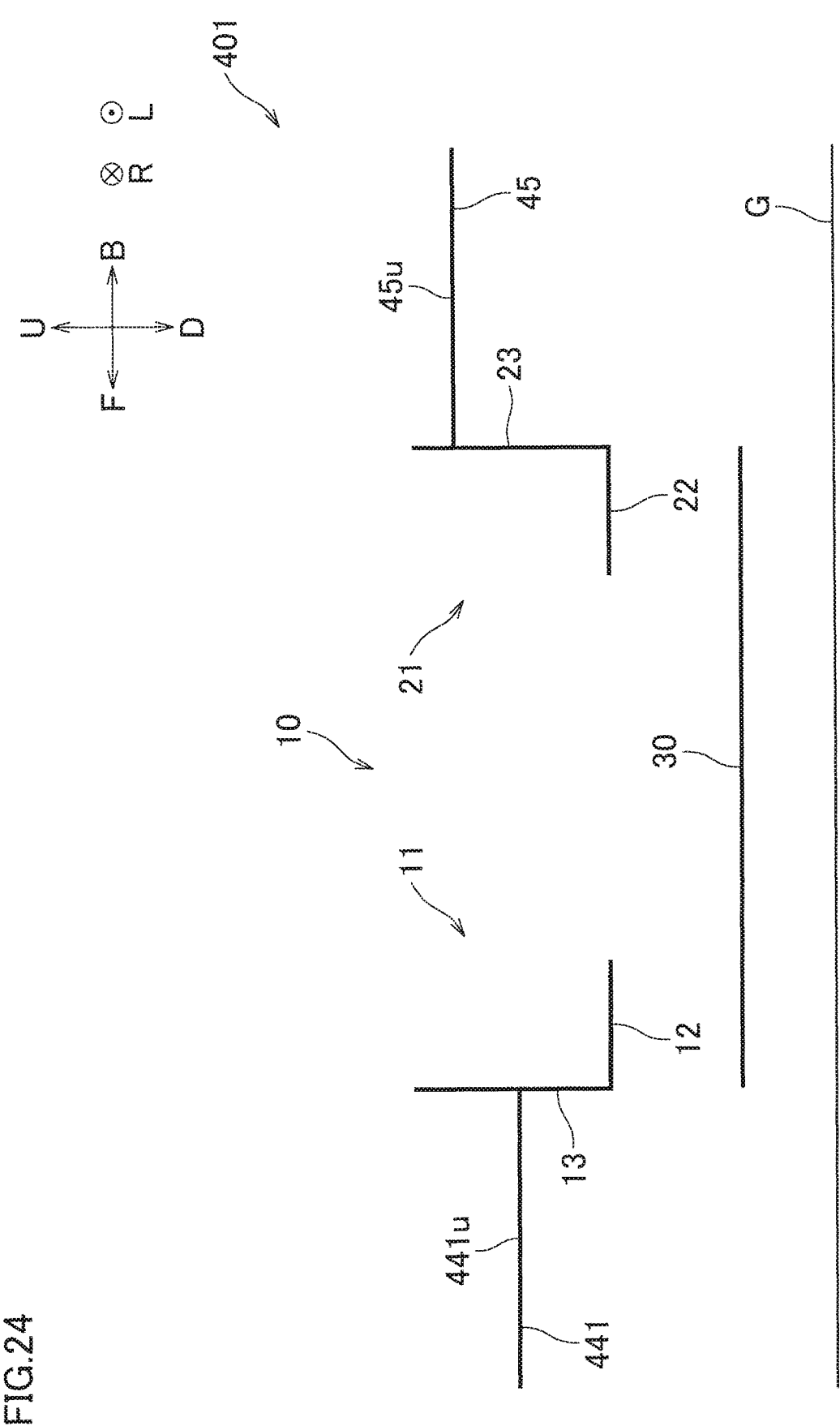
FIG. 24 is a side view which schematically shows a modification of the facing seats-type automated driving vehicle of the present teaching.
Figure 25:
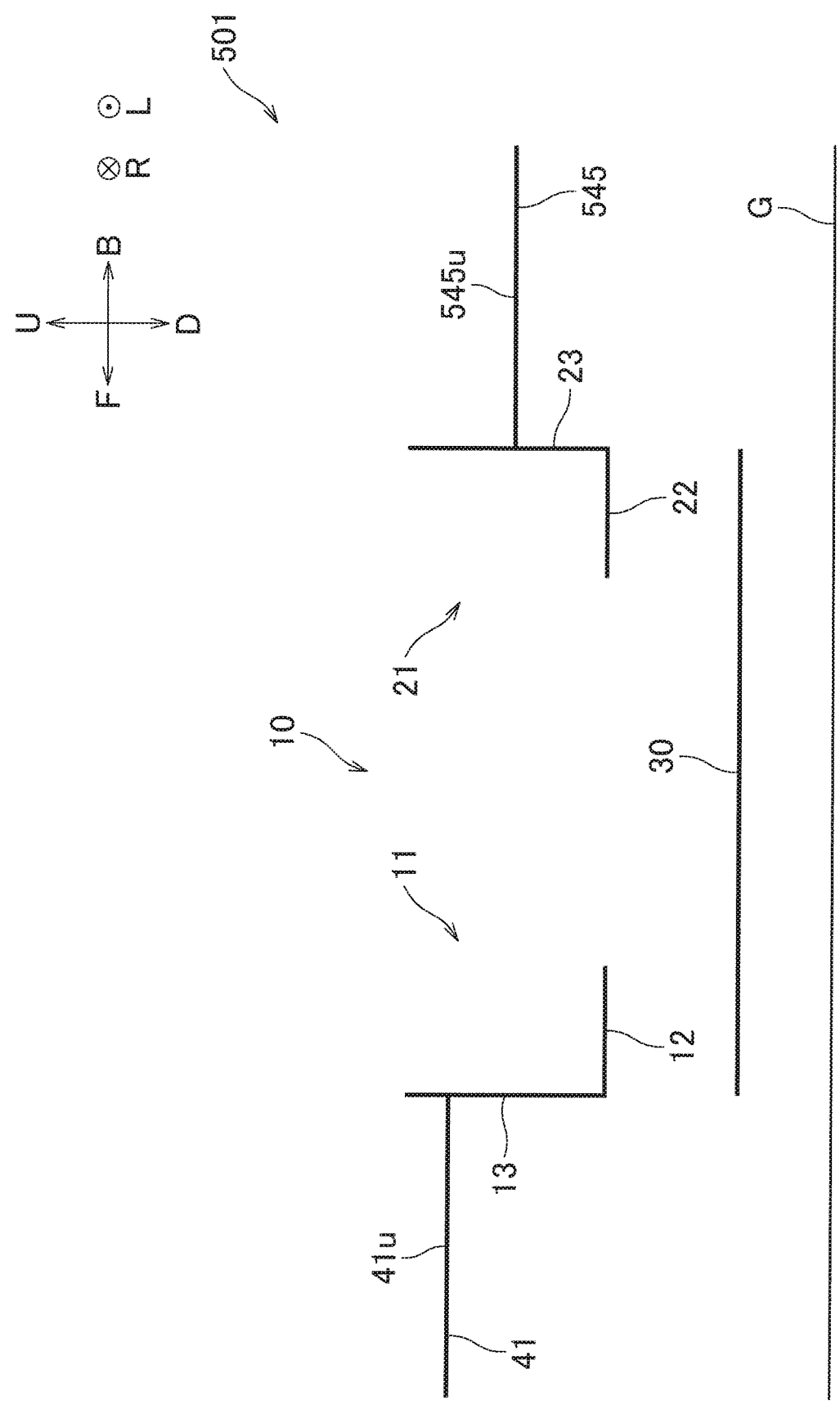
FIG. 25 is a side view which schematically shows a modification of the facing seats-type automated driving vehicle of the present teaching.

In Specific Example 1 of the present teaching, the two tray portions 179*a* are provided so that the upper surfaces thereof are identical in height in the vehicle up-down direction. In Specific Example 2 of the present teaching, the front luggage deck 241 and the rear luggage deck 245 are provided so that the height Hf2 in the vehicle up-down direction of the upper surface of the front luggage deck 241 is identical with the height Hr2 in the vehicle up-down direction of the upper surface of the rear luggage deck 245. Alternatively, in the facing seats-type automated driving vehicle of the present teaching, the front luggage deck and the rear luggage deck may not be provided so that the height in the vehicle up-down direction of the upper surface of the front luggage deck is identical with the height in the vehicle up-down direction of the upper surface of the rear luggage deck. For example, as in a facing seats-type automated driving vehicle 401 of a modification shown in FIG. 24, a front luggage deck 441 and a rear luggage deck 45 may be provided so that an upper surface 441*u* of the front luggage deck 441 is lower in height than an upper surface 45*u* of the rear luggage deck 45 in the vehicle up-down direction. For example, as in a facing seats-type automated driving vehicle 501 of a modification shown in FIG. 25, a front luggage deck 41 and a rear luggage deck 545 may be provided so that an upper surface 545*u* of the rear luggage deck 545 is lower in height than an upper surface 41*u* of the front luggage deck 41 in the vehicle up-down direction.

In Specific Example 1 of the present teaching, the facing seats 110 include (a) the front seat variable structure and (b) the rear seat variable structure. Alternatively, the facing seats-type automated driving vehicle of Specific Example 1 of the present teaching may further include (c) the front backrest variable structure and (d) the rear backrest variable structure. With reference to FIG. 10, the following will describe a facing seats-type automated driving vehicle 101 in which facing seats 110 further includes (c) the front backrest variable structure and (d) the rear backrest variable structure.

As shown in FIG. 10, the facing seats-type automated driving vehicle 101 may include two storage spaces 123. The two storage spaces 123 include a front storage space 123*f* and a rear storage space 123*r*. The front storage space 123*f* is constituted by a front luggage deck 123*fd*. In the vehicle front-rear direction, the front luggage deck 123*fd* is provided partially forward of the front end of a front backrest 122*f* of a front seat 121*f*. The front luggage deck 123*fd* is provided below a front tray portion 179*af* in the vehicle up-down direction. The rear storage space 123*r* is constituted by a rear luggage deck 123*rd*. The rear luggage deck 123*rd* is provided partially rearward of the rear end of a rear backrest 122*r* of a rear seat 121*r* in the vehicle front-rear direction. The rear luggage deck 123*rd* is provided below a rear tray portion 179*ar* in the vehicle up-down direction.

The front backrest 122*f* and the rear backrest 122*r* may be arranged to be able to open and close the two storage spaces 123. For example, the front backrest 122*f* and the rear backrest 122*r* may be swingable between a posture keeping state and a storage state (non-posture keeping state) relative to the front seat 121*f* and the rear seat 121*r*. When the front backrest 122*f* and the rear backrest 122*r* are in the storage state, the front backrest 122*f* and the rear backrest 122*r* are swung so that the front backrest 122*f* and the rear backrest 122*r* face the front seat 121*f* and the rear seat 121*r*, respectively. When the front backrest 122*f* and the rear backrest 122*r* are in the storage state, the storage spaces 123*f* and 123*r* are open. When the front backrest 122*f* and the rear backrest 122*r* in the storage state are swung to be in the posture keeping state, the storage spaces 123*f* and 123*r* are closed. Alternatively, for example, the front backrest 122*f* and the rear backrest 122*r* are formed to be attachable and detachable, so as to be detachable from the posture keeping state to a detached state (non-posture keeping state). When the front backrest 122*f* and the rear backrest 122*r* are in the detached state, the front backrest 122*f* and the rear backrest 122*r* are detached and the storage spaces 123*f* and 123*r* are open. When the front backrest 122*f* and the rear backrest 122*r* are in the posture keeping state, the front backrest 122*f* and the rear backrest 122*r* are attached and the storage spaces 123*f* and 123*r* are closed.

In other words, when viewed in the vehicle front-rear direction, the area of the front backrest 122*f* and the area of the rear backrest 122*r* are changeable. Furthermore, for example, the area of the front backrest 122*f* and the area of the rear backrest 122*r* when viewed in the vehicle front-rear direction are changeable between the posture keeping state and the storage state. When the front backrest 122*f* and the rear backrest 122*r* are in the posture keeping state, the area of the front backrest 122*f* and the area of the rear backrest 122*r* are maximum when viewed in the vehicle front-rear direction. When the front backrest 122*f* and the rear backrest 122*r* are in the storage state or the detached state, the area of the front backrest 122*f* and the area of the rear backrest 122*r* when viewed in the vehicle front-rear direction are small as compared to the case where the front backrest 122*f* and the rear backrest 122*r* are in the posture keeping state. In other words, the front backrest 122*f* and the rear backrest 122*r* are changeable between a closed state in which the front storage space 123*f* and the rear storage space 123*r* are closed and an open state in which the front storage space 123*f* and the rear storage space 123*r* are open. When the front backrest 122*f* and the rear backrest 122*r* are in the storage state or the detached state, the front storage space 123*f* and the rear storage space 123*r* are open and luggage can be placed on the front luggage deck 123*fd* and the rear luggage deck 123*rd*.

In Specific Examples 1 and 2 of the present teaching, the front seat 121*f*, 212 in the state in which a passenger is seatable thereon is swung in the vehicle forward direction and in the vehicle upward direction. In Specific Examples 1 and 2 of the present teaching, the rear seat 121*r*, 222 in the state in which a passenger is seatable thereon is swung in the vehicle rearward direction and in the vehicle upward direction.

However, when the facing seats of the present teaching have the front seat variable structure, the front seat in the state in which a passenger is seatable thereon may be swung in the vehicle forward direction and in the vehicle downward direction. When the facing seats of the present teaching have the rear seat variable structure, the rear seat in the state in which a passenger is seatable thereon may be swung in the vehicle rearward direction and in the vehicle downward direction.

In Specific Examples 1 and 2 of the present teaching, the front backrest 122*f*, 213 in the state in which a passenger is able to keep the posture is swung in the vehicle rearward direction and in the vehicle downward direction. In Specific Examples 1 and 2 of the present teaching, the rear backrest 121*r*, 223 in the state in which a passenger is able to keep the posture is swung in the vehicle forward direction and in the vehicle downward direction. However, when the facing seats of the present teaching have the front backrest variable structure, the front backrest in the state in which a passenger is able to keep the posture may be swung in the vehicle forward direction and in the vehicle downward direction. When the upper end portion of the front backrest is swingably supported, the front backrest in the state in which a passenger is able to keep the posture may be swung in the vehicle rearward direction and in the vehicle upward direction or swung in the vehicle forward direction and the vehicle upward direction. When the facing seats of the present teaching have the rear backrest variable structure, the rear backrest in the state in which a passenger is able to keep the posture may be swung in the vehicle rearward direction and in the vehicle downward direction. When the upper end portion of the rear backrest is swingably supported, the rear backrest in the state in which a passenger is able to keep the posture may be swung in the vehicle forward direction and in the vehicle upward direction or swung in the vehicle rearward direction and the vehicle upward direction.

In Specific Examples 1 and 2 of the present teaching, the front seat 121*f*, 212 is almost entirely movable from the state in which a passenger is seatable thereon. In Specific Examples 1 and 2 of the present teaching, the rear seat 121*r*, 222 is almost entirely movable from the state in which a passenger is seatable thereon. In this connection, when the facing seats of the present teaching have the front seat variable structure, the front seat may be only partially movable from the state in which a passenger is able to keep the posture. For example, the front portion of the front seat may be fixed, and only the rear portion of the front seat may be swingable in the vehicle front-rear direction and in the vehicle up-down direction. When the facing seats of the present teaching have the rear seat variable structure, the rear seat may be at least partially movable from the state in which a passenger is able to keep the posture. For example, the rear portion of the rear seat may be fixed, and only the front portion of the rear seat may be swingable in the vehicle front-rear direction and in the vehicle up-down direction.

In Specific Examples 1 and 2 of the present teaching, the front backrest 122*f*, 213 is almost entirely movable from the state in which a passenger is able to keep the posture. In Specific Examples 1 and 2 of the present teaching, the rear backrest 121*r*, 223 is almost entirely movable from the state in which a passenger is able to keep the posture. When the facing seats of the present teaching have the front backrest variable structure, the front backrest in the state in which a passenger is able to keep the posture may be at least partially movable. For example, the lower portion of the front backrest may be fixed, and only the upper portion of the front backrest may be swingable in the vehicle front-rear direction and in the vehicle up-down direction. When the facing seats of the present teaching have the rear backrest variable structure, the rear backrest in the state in which a passenger is able to keep the posture may be at least partially movable. For example, the lower portion of the rear backrest may be fixed, and only the upper portion of the rear backrest may be swingable in the vehicle front-rear direction and in the vehicle up-down direction.

In Specific Example 2 of the present teaching, the facing seats 210 have at least one of (a) the front seat variable structure, (b) the rear seat variable structure, (c) the front backrest variable structure, (d) the rear backrest variable structure, (e) the front luggage deck elongation structure, and (f) the rear luggage deck elongation structure. Alternatively, in the facing seats-type automated driving vehicle of the present teaching, the facing seats may have (a) the front seat variable structure or (b) the rear seat variable structure, (c) the front backrest variable structure or (d) the rear backrest variable structure, and (e) the front luggage deck elongation structure or (f) the rear luggage deck elongation structure.

In the facing seats-type automated driving vehicle of the present teaching, the facing seats may have one or two of the structures (a) to (h). When the facing seats have one or two of the structures (a) to (h), it is possible to cause the vehicle to be able to conveniently accommodate both passengers and luggage and to be small in size at the same time. For example, in the facing seats-type automated driving vehicle of the present teaching, the facing seats may include only (a)

the front seat variable structure, only (b) the rear seat variable structure, or only (a) the front seat variable structure and (b) the rear seat variable structure. Furthermore, in the facing seats-type automated driving vehicle of the present teaching, the facing seats may include only (c) the front backrest variable structure, only (d) the rear backrest variable structure, or only (c) the front backrest variable structure and (d) the rear backrest variable structure. Furthermore, in the facing seats-type automated driving vehicle of the present teaching, the facing seats may include only (e) the front luggage deck elongation structure, only (f) rear luggage deck elongation structure, or only (e) the front luggage deck elongation structure and (f) the rear luggage deck elongation structure. Furthermore, in the facing seats-type automated driving vehicle of the present teaching, the facing seats may include only (g) the front seat elongation structure, only (h) the rear seat elongation structure, or only (g) the front seat elongation structure and (h) the rear seat elongation structure.

In the facing seats-type automated driving vehicle of the present teaching, the facing seats may have two to four of the structures (a) to (h) in combination. When the facing seats have two to four of the structures (a) to (h), it is possible to cause the vehicle to be able to further conveniently accommodate both passengers and luggage and to be small in size at the same time. For example, in the facing seats-type automated driving vehicle of the present teaching, in regard to (a) the front seat variable structure, (b) the rear seat variable structure, (c) the front backrest variable structure, and (d) the rear backrest variable structure, the facing seats may include the structures {(a), (b), or ((a) and (b))} and {(c), (d), or ((c) and (d))}. Alternatively, in the facing seats-type automated driving vehicle of the present teaching, in regard to (a) the front seat variable structure, (b) the rear seat variable structure, (e) the front luggage deck elongation structure, and (f) the rear luggage deck elongation structure, the facing seats may include the structures {(a), (b), or ((a) and (b))} and {(e), (f), or ((e) and (f))}. Alternatively, in the facing seats-type automated driving vehicle of the present teaching, in regard to (a) the front seat variable structure, (b) the rear seat variable structure, (g) the front seat elongation structure, and (h) the rear seat elongation structure, the facing seats may include the structures {(a), (b), or ((a) and (b))} and {(h), (g), or ((g) and (h))}. Alternatively, in the facing seats-type automated driving vehicle of the present teaching, in regard to (c) the front backrest variable structure, (d) the rear backrest variable structure, (e) the front luggage deck elongation structure, and (f) the rear luggage deck elongation structure, the facing seats may include the structures {(c), (d), or ((c) and (d))} and {(e), (f), or ((e) and (f)}. Furthermore, in the facing seats-type automated driving vehicle of the present teaching, in regard to (c) the front backrest variable structure, (d) the rear backrest variable structure, (g) the front seat elongation structure, and (h) the rear seat elongation structure, the facing seats may include the structures {(c), (d), or ((c) and (d))} and {(g), (h), or ((g) and (h))}. Furthermore, in the facing seats-type automated driving vehicle of the present teaching, in regard to (e) the front luggage deck elongation structure, (f) the rear luggage deck elongation structure, (g) the front seat elongation structure, and (h) the rear seat elongation structure, the facing seats may include the structures {(e), (f), or ((e) and (f))} and {(g), (h), or ((g) and (h))}.

In the facing seats-type automated driving vehicle of the present teaching, the facing seats may have three to six of the structures (a) to (h) in combination. When the facing seats have three to six of the structures (a) to (h), it is possible to cause the vehicle to be able to further conveniently accommodate both passengers and luggage and to be small in size at the same time. Furthermore, in the facing seats-type automated driving vehicle of the present teaching, in regard to (a) the front seat variable structure, (b) the rear seat variable structure, (c) the front backrest variable structure, (d) the rear backrest variable structure, (g) the front seat elongation structure, and (h) the rear seat elongation structure the facing seats may include the structures {(a), (b), or ((a) and (b))}, {(c), (d), or ((c) and (d))}, and {(g), (h), or ((g) and (h))}. Furthermore, in the facing seats-type automated driving vehicle of the present teaching, in regard to (a) the front seat variable structure, (b) the rear seat variable structure, (e) the front luggage deck elongation structure, (f) the rear luggage deck elongation structure, (g) the front seat elongation structure, and (h) the rear seat elongation structure the facing seats may include the structures {(a), (b), or ((a) and (b))}, {(e), (f), or ((e) and (f))}, and {(g), (h), or ((g) and (h))}. Furthermore, in the facing seats-type automated driving vehicle of the present teaching, in regard to (c) the front backrest variable structure, (d) the rear backrest variable structure, (e) the front luggage deck elongation structure, (f) the rear luggage deck elongation structure, (g) the front seat elongation structure, and (h) the rear seat elongation structure the facing seats may include the facing seats may include the structures {(c), (d), or ((c) and (d))}, {(e), (f), or ((e) and (f))}, and {(g), (h), or ((g) and (h))}.

In the facing seats-type automated driving vehicle of the present teaching, the facing seats may have four to eight of the structures (a) to (h) in combination. When the facing seats have four to eight of the structures (a) to (h), it is possible to cause the vehicle to be able to further conveniently accommodate both passengers and luggage and to be small in size at the same time. Furthermore, in the facing seats-type automated driving vehicle of the present teaching, in regard to (a) the front seat variable structure, (b) the rear seat variable structure, (c) the front backrest variable structure, (d) the rear backrest variable structure, (e) the front luggage deck elongation structure, (f) the rear luggage deck elongation structure, (g) the front seat elongation structure, and (h) the rear seat elongation structure the facing seats may include the structures {(a), (b), or ((a) and (b))}, {(c), (d), or ((c) and (d))}, {(e), (f), or ((e) and (f))}, and {(g), (h), or ((g) and (h))}.

REFERENCE SIGNS LIST 1, 101, 201 facing seats-type automated driving vehicle
103 203 wheel
103*fl*, 103*fr*, 203*fl*, 203*fr* front wheel
3*bl*, 3*br*, 203*bl*, 203*br* rear wheel
104, 208 automatic driving mechanism
10, 110, 210 facing seat
10*a* front seat variable structure
10*b* rear seat variable structure
10*c* front backrest variable structure
10*d* rear backrest variable structure
10*e* front luggage deck elongation structure
10*f* rear luggage deck elongation structure
10*g* front seat elongation structure
10*h* rear seat elongation structure
11, 120*f*, 211 front seat assembly
121*f*, 12 front seat
12*r* rear end of front seat
13, 122*f* front backrest
13*u* upper end of front backrest
21, 120*b*, 221 rear seat assembly 22, 121r, 122 rear seat
22f front end of rear seat
23, 122r, 223 rear backrest
23u upper end of rear backrest
30, 178, 230 floor deck
30f front end of floor deck
30r rear end of floor deck
40, 179a luggage deck
41, 179af, 241 front luggage deck
41f front end of front luggage deck
41u upper surface of front luggage deck
45, 179ar, 245 rear luggage deck
45r rear end of rear luggage deck
45u, 245u upper surface of rear luggage deck
58, 176, 258 roof portion

The invention claimed is:

1. A facing seats-type automated driving vehicle, comprising:
   facing seats including:
   a front seat assembly which includes at least a front seat for a first passenger to be seated thereon and a front backrest for the first passenger to keep posture, the front seat assembly being disposed to cause the seated first passenger to face a rearward direction of the vehicle; and
   a rear seat assembly which includes at least a rear seat for a second passenger to be seated thereon and a rear backrest for the second passenger to keep posture, the rear seat assembly being disposed to cause the seated second passenger to face a forward direction of the vehicle, and to cause the front backrest and the rear backrest to at least partially face each other;
   a floor deck which has no level difference on an upper surface thereof and is provided to allow the first and second passengers seated on the facing seats to rest their feet; and
   a luggage deck for at least one piece of luggage to be placed thereon, the luggage deck including
   a front luggage deck disposed forward of a front end of the floor deck in the forward direction of the vehicle, and
   a rear luggage deck disposed rearward of a rear end of the floor deck in the rearward direction of the vehicle, wherein
   the floor deck and the luggage deck are so arranged that each of the front luggage deck and the rear luggage deck is shorter than the floor deck in a front-rear direction of the vehicle, and
   each of an upper surface of the front luggage deck and an upper surface of the rear luggage deck is higher than an upper surface of the floor deck in an up-down direction of the vehicle;
   wherein,
   the facing seats-type automated driving vehicle is free of a driver's seat that is a seat designated for a driver who performs manual driving of the vehicle to be seated thereon;
   a first front space is provided directly above a front seat facing surface, which is part of the upper surface of the floor deck and which faces a bottom surface of the front seat in a state of allowing the first passenger to be seated thereon;
   a first rear space is provided directly above a rear seat facing surface, which is part of the upper surface of the floor deck and which faces a bottom surface of the rear seat in a state of allowing the second passenger to be seated thereon;
   a second front space is provided directly above the front seat in the state of allowing the first passenger to be seated thereon and above the front luggage deck;
   a second rear space is provided directly above the rear seat in the state of allowing the second passenger to be seated thereon and above the rear luggage deck;
   the facing seats include at least one of:
   (a) a front seat variable structure in which
      in the state of allowing the first passenger to be seated thereon,
         a rear end of the front seat is disposed rearward of the front end of the floor deck,
         the first front space is divided in the up-down direction of the vehicle by the bottom surface of the front seat, the first front space including a space in which no structure is provided between the bottom surface of the front seat in the state of allowing the first passenger to be seated thereon and the front seat facing surface, and
         the front seat is arranged so that an area of the bottom surface of the front seat dividing the first front space when viewed in the up-down direction of the vehicle is changeable;
   (b) a rear seat variable structure in which
      in the state of allowing the second passenger to be seated thereon,
         a front end of the rear seat is disposed forward of the rear end of the floor deck,
         the first rear space is divided in the vehicle up-down direction by the bottom surface of the rear seat, the first rear space including a space in which no structure is provided between the bottom surface of the rear seat in the state of allowing the second passenger to be seated thereon and the rear seat facing surface, and
         the rear seat is arranged so that an area of the bottom surface of the rear seat dividing the first rear space when viewed in the up-down direction of the vehicle is changeable;
   (c) a front backrest variable structure in which
      an upper end of the front backrest in a state of keeping posture of a passenger is provided above the upper surface of the front luggage deck,
      the second front space is divided in the front-rear direction of the vehicle by a front surface of the front backrest, the second front space including a space which is forward of a front surface of the front backrest in the state of keeping posture of a passenger, is above the front luggage deck, and has no structure, and
      the front backrest is arranged so that an area of the front surface of the front backrest dividing the second front space when viewed in the front-rear direction of the vehicle is changeable;
   (d) a rear backrest variable structure in which
      an upper end of the rear backrest in the state of keeping posture of a passenger is provided above the upper surface of the rear luggage deck,
      the second rear space is divided in the front-rear direction of the vehicle by a rear surface of the rear backrest, the second rear space including a space which is rearward of a rear surface of the rear backrest in the state of keeping posture of a passenger, is above the rear luggage deck, and has no structure, and
      the rear backrest is arranged so that an area of the rear surface of the rear backrest dividing the second rear space when viewed in the front-rear direction of the vehicle is changeable;
- (e) a front luggage deck elongation structure in which at least one of the front seat, the front backrest, the rear seat, and the rear backrest is movable to cause the front luggage deck to elongate rearward;
- (f) a rear luggage deck elongation structure in which at least one of the front seat, the front backrest, the rear seat, and the rear backrest is movable to cause the rear luggage deck to elongate forward;
- (g) a front seat elongation structure in which at least one of the front backrest, the rear seat, and the rear backrest is movable to cause the front seat to elongate rearward; and
- (h) a rear seat elongation structure in which at least one of the front seat, the front backrest, and the rear backrest is movable to cause the rear seat to elongate forward; and the front seat assembly and the rear seat assembly are so configured that each of the front seat and the rear seat is movable into a stored state, by which the entire first front space and the entire first rear space are cleared to allow unobstructed access to the upper surface of the floor deck that has no level difference.

2. The facing seats-type automated driving vehicle according to claim 1, wherein, the facing seats are arranged so that, in the front-rear direction of vehicle, a length between the rear end of the front seat in the state of allowing the first passenger to be seated thereon and the front end of the rear seat in the state of allowing the second passenger to be seated thereon, is shorter than a total length of the front luggage deck and the rear luggage deck.

3. The facing seats-type automated driving vehicle according to claim 1, wherein, the facing seats are arranged to include only the front seat variable structure, only the rear seat variable structure, or both the front seat variable structure and the rear seat variable structure, among the front seat variable structure and the rear seat variable structure.

4. The facing seats-type automated driving vehicle according to claim 3, wherein, the facing seats are arranged to further include only the front backrest variable structure, only the rear backrest variable structure, or both the front backrest variable structure and the rear backrest variable structure, among the front backrest variable structure and the rear backrest variable structure.

5. The facing seats-type automated driving vehicle according to claim 3, wherein, the facing seats are arranged to further include only the front luggage deck elongation structure, only the rear luggage deck elongation structure, or both the front luggage deck elongation structure and the rear luggage deck elongation structure, among the front luggage deck elongation structure and the rear luggage deck elongation structure.

6. The facing seats-type automated driving vehicle according to claim 3, wherein, the facing seats are arranged to further include only the front seat elongation structure, only the rear seat elongation structure, or both the front seat elongation structure and the rear seat elongation structure, among the front seat elongation structure and the rear seat elongation structure.

7. The facing seats-type automated driving vehicle according to claim 1, wherein, the facing seats are arranged to include only the front backrest variable structure, only the rear backrest variable structure, or both the front backrest variable structure and the rear backrest variable structure, among the front backrest variable structure and the rear backrest variable structure.

8. The facing seats-type automated driving vehicle according to claim 7, wherein, the facing seats are arranged to include only the front luggage deck elongation structure, only the rear luggage deck elongation structure, or both the front luggage deck elongation structure and the rear luggage deck elongation structure, among the front luggage deck elongation structure and the rear luggage deck elongation structure.

9. The facing seats-type automated driving vehicle according to claim 7, wherein, the facing seats are arranged to further include only the front seat elongation structure, only the rear seat elongation structure, or both the front seat elongation structure and the rear seat elongation structure, among the front seat elongation structure and the rear seat elongation structure.

10. The facing seats-type automated driving vehicle according to claim 1, wherein, the facing seats are arranged to include only the front luggage deck elongation structure, only the rear luggage deck elongation structure, or both the front luggage deck elongation structure and the rear luggage deck elongation structure, among the front luggage deck elongation structure and the rear luggage deck elongation structure.

11. The facing seats-type automated driving vehicle according to claim 10, wherein, the facing seats are arranged to further include only the front seat elongation structure, only the rear seat elongation structure, or both the front seat elongation structure and the rear seat elongation structure, among the front seat elongation structure and the rear seat elongation structure.

12. The facing seats-type automated driving vehicle according to claim 1, wherein, the facing seats are arranged to further include only the front seat elongation structure, only the rear seat elongation structure, or both the front seat elongation structure and the rear seat elongation structure, among the front seat elongation structure and the rear seat elongation structure.

13. The facing seats-type automated driving vehicle according to claim 3, wherein,
- (i) the upper surface of the front luggage deck is provided above the upper end of the front backrest in the state of keeping posture of the first passenger, and the upper surface of the rear luggage deck is provided at a same height as or lower than the upper end of the front backrest in the state of keeping posture of the second passenger,
- (ii) the upper surface of the front luggage deck is provided at a same height as or below the upper end of the front backrest in the state of keeping posture of the first passenger, and the upper surface of the rear luggage deck is provided above the upper end of the rear backrest in the state of keeping posture of the second passenger, or
- (iii) the upper surface of the front luggage deck is provided above the upper end of the front backrest in the state of keeping posture of the first passenger, and the upper surface of the rear luggage deck is provided above the upper end of the rear backrest in the state of keeping posture of the second passenger.

14. The facing seats-type automated driving vehicle according to claim 4, wherein,
- (i) when the rear surface of the front backrest is arranged to face the upper surface of the front seat in the state of allowing the first passenger to be seated thereon in the up-down direction of the vehicle, so that the area of the front surface of the front backrest dividing the second front space is minimized when viewed in the front-rear direction of the vehicle, the upper end of the front backrest is provided at a same height as or below the upper surface of the front luggage deck, and when the front surface of the rear backrest is arranged to face the upper surface of the rear seat in the state of allowing the second passenger to be seated thereon in the up-down direction of the vehicle, so that the area of the rear surface of the rear backrest dividing the second rear space is minimized when viewed in the front-rear direction of the vehicle, the upper end of the rear backrest is provided above the upper surface of the rear luggage deck, (ii) when the rear surface of the front backrest is arranged to face the upper surface of the front seat in the state of allowing the first passenger to be seated thereon in the up-down direction of the vehicle, so that the area of the front surface of the front backrest dividing the second front space is minimized when viewed in the vehicle front-rear direction of the vehicle, the upper end of the front backrest is provided above the upper surface of the front luggage deck, and when the front surface of the rear backrest is arranged to face the upper surface of the rear seat in the state of allowing the second passenger to be seated thereon in the up-down direction of the vehicle, so that the area of the rear surface of the rear backrest dividing the second rear space is minimized when viewed in the vehicle front-rear direction of the vehicle, the upper end of the rear backrest is provided at a same height as or below the upper surface of the rear luggage deck, or (iii) when the rear surface of the front backrest is arranged to face the upper surface of the front seat in the state of allowing the first passenger to be seated thereon in the up-down direction of the vehicle, so that the area of the front surface of the front backrest dividing the second front space in the vehicle front-rear direction is minimized when viewed in the front-rear direction of the vehicle, the upper end of the front backrest is provided at a same height as or below the upper surface of the front luggage deck, and when the front surface of the rear backrest is arranged to face the upper surface of the rear seat in the state of allowing the second passenger to be seated thereon in the up-down direction of the vehicle, so that the area of the rear surface of the rear backrest dividing the second rear space is minimized when viewed in the vehicle front-rear direction of the vehicle, the upper end of the rear backrest is provided at a same height as or below the upper surface of the rear luggage deck.

15. The facing seats-type automated driving vehicle according to claim 1, wherein, (i) the upper surface of the front luggage deck is provided above an upper end of the front seat in the state of allowing the first passenger to be seated thereon, and the upper surface of the rear luggage deck is provided at a same height as or below an upper end of the rear seat in the state of allowing the second passenger to be seated thereon, (ii) the upper surface of the front luggage deck is provided at a same height as or below the upper end of the front seat in the state of allowing the first passenger to be seated thereon, and the upper surface of the rear luggage deck is provided above the upper end of the rear seat in the state of allowing the second passenger to be seated thereon, or (iii) the upper surface of the front luggage deck is provided above the upper end of the front seat in the state of allowing the first passenger to be seated thereon, and the upper surface of the rear luggage deck is provided above the upper end of the rear seat in the state of allowing the second passenger to be seated thereon.

16. The facing seats-type automated driving vehicle according to claim 1, further comprising four wheels including two front wheels and two rear wheels which are behind the two front wheels in the front-rear direction of the vehicle, wherein, (i) upper ends of the two front wheels are provided below a lower end of the front seat in the state of allowing the first passenger to be seated thereon, and upper ends of the two rear wheels are provided at a same height as or above a lower end of the rear seat in the state of allowing the second passenger to be seated thereon, (ii) the upper ends of the two front wheels are provided at a same height as or above the lower end of the front seat in the state of allowing the first passenger to be seated thereon, and the upper ends of the two rear wheels are provided below the lower end of the rear seat in the state of allowing the second passenger to be seated thereon, or (iii) the upper ends of the two front wheels are provided below the lower end of the front seat in the state of allowing the first passenger to be seated thereon, and the upper ends of the two rear wheels are provided below the lower end of the rear seat in the state of allowing the second passenger to be seated thereon.

17. The facing seats-type automated driving vehicle according to claim 1, wherein, in the front-rear direction of the vehicle, a total of a length of the front luggage deck and a length of the rear luggage deck is shorter than a length of the floor deck.

18. The facing seats-type automated driving vehicle according to claim 1, wherein, in the up-down direction of the vehicle, a height of the upper surface of the front luggage deck is identical to a height of the upper surface of the rear luggage deck.

19. The facing seats-type automated driving vehicle according to claim 1, further comprising:

four wheels including two front wheels and two rear wheels which are behind the two front wheels in the front-rear direction of the vehicle; and an automatic driving mechanism including:
a driving source configured to apply driving force to at least one of the four wheels;
a steering mechanism configured to steer at least one of the four wheels; and
an automatic driving controller which automatically controls the driving source and the steering mechanism, wherein, (i) the automatic driving mechanism is at least partially provided directly below a lower end of the front luggage deck, and the automatic driving mechanism is not provided directly below a lower end of the rear luggage deck, (ii) the automatic driving mechanism is at least partially provided directly below the lower end of the rear luggage deck, and the automatic driving mechanism is not provided directly below the lower end of the front luggage deck, or (iii) the automatic driving mechanism is at least partially provided directly below the lower end of the front luggage deck and the lower end of the rear luggage deck.

20. The facing seats-type automated driving vehicle according to claim 19, wherein,
  (i) the automatic driving mechanism is at least partially provided forward of a front end of the front seat in the state of allowing the first passenger to be seated thereon, and the automatic driving mechanism is not provided rearward of a rear end of the rear seat in the state of allowing the second passenger to be seated thereon,
  (ii) the automatic driving mechanism is at least partially provided rearward of the rear end of the rear seat in the state of allowing the second passenger to be seated thereon, and the automatic driving mechanism is not provided forward of the front end of the front seat in the state of allowing the first passenger to be seated thereon, or
  (iii) the automatic driving mechanism is at least partially provided forward of the front end of the front seat in the state of allowing the first passenger to be seated thereon, and rearward of the rear end of the rear seat in the state of allowing the second passenger to be seated thereon.

21. The facing seats-type automated driving vehicle according to claim 1, wherein, a maximum number of passengers seatable on the facing seats is no more than six.

22. The facing seats-type automated driving vehicle according to claim 1, further comprising a roof portion which is provided directly above the floor deck, wherein,
  the roof portion is positioned so that, in the up-down direction of a vehicle, a space between a lower surface of the roof portion and the upper surface of the floor deck is insufficient for an adult of an average height to stand on the floor deck in an upright state.

* * * * *